(12) United States Patent
Ishihara et al.

(10) Patent No.: US 10,801,917 B2
(45) Date of Patent: Oct. 13, 2020

(54) FUEL VAPOR PROCESSING DEVICE

(71) Applicant: DENSO CORPORATION, Kariya, Aichi-pref. (JP)

(72) Inventors: Keiichirou Ishihara, Kariya (JP); Yuichiro Miura, Kariya (JP); Ryoyu Kishi, Kariya (JP); Tomohiro Itoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 196 days.

(21) Appl. No.: 16/037,329

(22) Filed: Jul. 17, 2018

(65) Prior Publication Data

US 2019/0041292 A1  Feb. 7, 2019

(30) Foreign Application Priority Data

Aug. 3, 2017 (JP) ................................ 2017-150572
Dec. 21, 2017 (JP) ................................ 2017-245430

(51) Int. Cl.
| | |
|---|---|
| *G01M 3/28* | (2006.01) |
| *G01M 3/32* | (2006.01) |
| *B60K 15/035* | (2006.01) |
| *F02M 25/08* | (2006.01) |
| *G01M 3/02* | (2006.01) |

(52) U.S. Cl.
CPC ..... *G01M 3/2876* (2013.01); *B60K 15/03504* (2013.01); *B60K 15/03519* (2013.01); *F02M 25/0818* (2013.01); *G01M 3/025* (2013.01); *G01M 3/3263* (2013.01); *F02M 25/0836* (2013.01)

(58) Field of Classification Search
CPC ...... G01M 3/025; G01M 3/26; G01M 3/2876; G01M 3/3263; B60K 15/03504; F02M 25/0818; F02M 25/0809
See application file for complete search history.

(56) References Cited

U.S. PATENT DOCUMENTS

| | | | |
|---|---|---|---|
| 5,890,474 A | 4/1999 | Schnaibel et al. | |
| 6,761,154 B2* | 7/2004 | Takagi | F02M 25/0818 123/198 D |
| 8,549,896 B2* | 10/2013 | Kobayashi | F01C 21/10 418/228 |
| 8,850,873 B2* | 10/2014 | Itoh | F02M 25/089 73/47 |

(Continued)

*Primary Examiner* — Nathaniel J Kolb
(74) *Attorney, Agent, or Firm* — Nixon & Vanderhye P.C.

(57) ABSTRACT

A fuel vapor processing device includes a canister, a first purge pipe that forms a first purge path that communicatively connects the inside of the canister and the inside of a fuel tank, a pressure pipe that forms a pressure detection path configured to communicatively connect a first switching valve and a pump, the first switching valve, a sealing valve disposed in the first purge pipe and configured to isolate the inside of the canister from the inside of the fuel tank, a differential pressure sensor, and an ECU. The differential pressure sensor is capable of detecting a difference between a pressure of the first purge path and a pressure of the pressure detection path. The ECU determines presence or absence of a fuel vapor leak while controlling the first switching valve, the pump, and the sealing valve based on a signal output from the differential pressure sensor.

14 Claims, 29 Drawing Sheets

(56) References Cited

U.S. PATENT DOCUMENTS

| | | | |
|---|---|---|---|
| 2003/0226549 A1* | 12/2003 | Takagi | F02M 25/0818 |
| | | | 123/520 |
| 2004/0000187 A1 | 1/2004 | Kobayashi et al. | |
| 2005/0211228 A1* | 9/2005 | Amano | F02M 25/0827 |
| | | | 123/520 |
| 2006/0031000 A1* | 2/2006 | Amano | F02M 25/0818 |
| | | | 701/114 |
| 2011/0138885 A1* | 6/2011 | Kobayashi | F01C 21/10 |
| | | | 73/40.7 |
| 2013/0014563 A1* | 1/2013 | Itoh | F02M 25/0818 |
| | | | 73/47 |
| 2014/0182360 A1* | 7/2014 | Horiba | G01M 3/2876 |
| | | | 73/40.5 R |

* cited by examiner

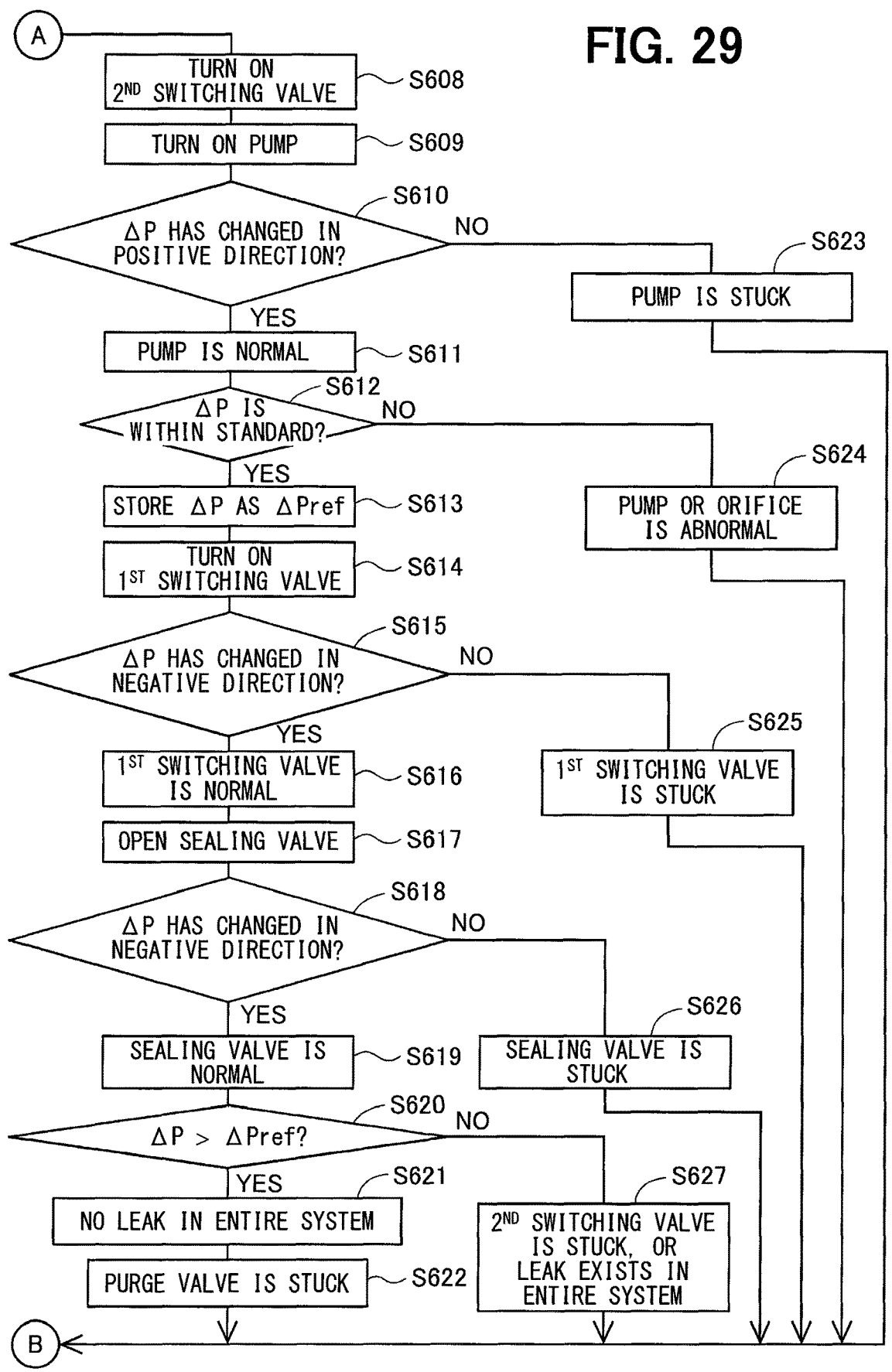

FUEL VAPOR PROCESSING DEVICE

CROSS REFERENCE TO RELATED APPLICATION

This application is based on Japanese Patent Applications No. 2017-150572 filed on Aug. 3, 2017 and No. 2017-245430 filed on Dec. 21, 2017, the disclosures of which are incorporated herein by reference.

TECHNICAL FIELD

The present disclosure relates to a fuel vapor processing device.

BACKGROUND

A fuel vapor processing device that is conventionally known includes a canister capable of absorbing fuel evaporative in a fuel tank, and supplies fuel recovered by the canister to an intake system of an internal combustion engine. The fuel vapor processing device includes a fuel vapor leak detection unit capable of detecting a fuel vapor leak from the fuel tank or the canister. For example, JP 2014-126006 A describes a fuel vapor processing device including a tank internal pressure sensor capable of detecting a pressure inside a sealed fuel tank, and a leak detection sensor capable of detecting a pressure of a fuel vapor leak detection unit.

According to the fuel vapor processing device described in JP 2014-126006 A, however, a detection position at which a pressure inside the sealed fuel tank is detected is different from a detection position at which a pressure for determining presence or absence of a fuel vapor leak is detected. Accordingly, two pressure sensors are needed for detection at the respective detection positions. In this case, structural complication of the fuel vapor processing device increases.

SUMMARY

It is an object of the present disclosure to provide a fuel vapor processing device capable of detecting a pressure inside a fuel tank and a fuel vapor leak by using a simplified configuration.

According to the present disclosure, a fuel vapor processing device is configured to recover fuel vapor generated in a fuel tank that stores fuel of an internal combustion engine. The fuel vapor processing device includes a canister, a fuel vapor path member, a canister path member, an atmosphere path member, a pressure detection path member, a first switching valve, a pressurizing/depressurizing unit, a bypass path member, a narrowing portion, a differential pressure detection unit, a sealing valve, and a control unit.

The fuel vapor path member forms a fuel vapor path that communicatively connects a canister and the fuel tank. The canister includes an absorbent configured to absorb fuel vapor generated in the fuel tank.

The canister path member forms a canister path that communicates with the canister.

The atmosphere path member forms an atmosphere path that communicates with the atmosphere.

The pressure detection path member forms a pressure detection path configured to communicate with the canister path.

The first switching valve is configured to selectively switch between communication between the canister path and the pressure detection path and communication between canister path and the atmosphere path.

The pressurizing/depressurizing unit is configured to depressurize or pressurize the inside of the canister when the first switching valve communicatively connects the canister path and the pressure detection path.

The bypass path member forms a switching valve bypass path that bypasses the first switching valve, and communicatively connects the canister path and the pressure detection path.

The narrowing portion is disposed in the bypass path member.

The differential pressure detection unit is configured to detect a difference between a pressure inside the fuel tank or the atmospheric pressure and a pressure of the pressure detection path, and output a signal indicating the difference.

The sealing valve is disposed in the fuel vapor path member or the canister path member, and configured to isolate the fuel tank from the canister, or isolate the canister from the pressurizing/depressurizing unit.

The control unit electrically connects with the first switching valve, the pressurizing/depressurizing unit, the sealing valve, and the differential pressure detection unit. The control unit is configured to determine presence or absence of a fuel vapor leak while controlling operations of the first switching valve, the pressurizing/depressurizing unit, and the sealing valve based on a signal output from the differential pressure detection unit.

The fuel vapor processing device of the present disclosure includes the differential pressure detection unit configured to detect a difference between a pressure inside the fuel tank or the atmospheric pressure and a pressure of the pressure detection path, and output a signal that indicates the difference. The control unit controls operations of the first switching valve, the pressurizing/depressurizing unit, and the sealing valve, and determines presence or absence of a fuel vapor leak from the fuel vapor processing device based on a signal output from the single differential pressure detection unit. Accordingly, the fuel vapor processing device of the present disclosure is capable of detecting a pressure inside the fuel tank, and determining presence or absence of a fuel vapor leak by a simplified configuration including a single differential pressure detection unit capable of detecting differential pressures at two positions within the fuel vapor processing device.

BRIEF DESCRIPTION OF DRAWINGS

FIG. 29 is a part of the flowchart showing the fuel vapor leak detection method, and the abnormality detection method for detecting abnormality of units of the fuel vapor processing device, both performed by the fuel vapor processing device according to the different embodiment.

DETAILED DESCRIPTION

Embodiments are hereinafter described with reference to the drawings.

First Embodiment

A fuel vapor processing device 1 according to a first embodiment is described with reference to FIGS. 1 to 8.

Figure 1:
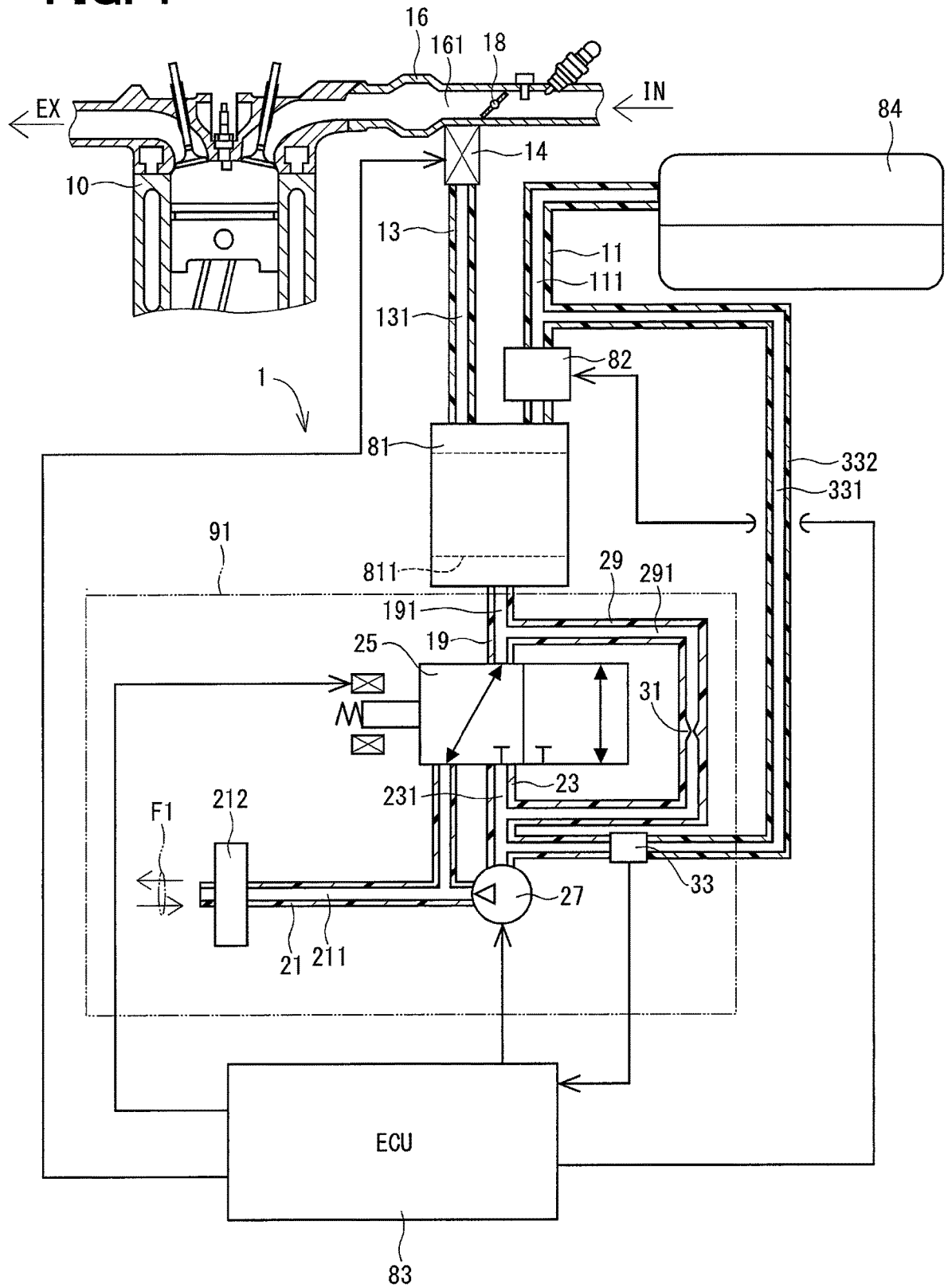
FIG. 1 is a conceptual diagram of a fuel vapor processing device according to a first embodiment.

FIG. 1 is a conceptual diagram of the fuel vapor processing device 1. The fuel vapor processing device 1 includes a canister 81, a fuel vapor leak detection unit 91, a sealing valve 82, an electronic control unit (ECU) 83, and other components. The fuel vapor processing device 1 recovers fuel vapor generated inside a fuel tank 84 by using the canister 81. The fuel tank 84 stores fuel supplied to an engine 10 functioning as an "internal combustion engine". Fuel vapor recovered by the canister 81 is purged into an intake path 161 formed by an intake pipe 16 functioning as an "intake system" connected to the engine 10, and is consumed for fuel combustion at the engine 10.

The canister 81 includes a canister absorbent 811 that recovers fuel vapor generated inside the fuel tank 84. The canister 81 is connected to the fuel tank 84 via a first purge pipe 11 functioning as an "fuel vapor path member". The first purge pipe 11 forms a first purge path 111 functioning as an "fuel vapor path" that communicatively connects the inside of the fuel tank 84 and the inside of the canister 81. Fuel vapor generated inside the fuel tank 84 is conveyed through the first purge path 111, and absorbed by the canister absorbent 811 to be recovered.

The canister 81 is connected to the intake pipe 16 via a second purge pipe 13 that forms a second purge path 131. The second purge pipe 13 includes a purge valve 14. The purge valve 14 is an electromagnetic valve, and electrically connected to the ECU 83. An opening degree of the purge valve 14 is controlled in accordance with a command signal output from the ECU 83. In this manner, a quantity of fuel vapor supplied from the canister 81 toward the downstream side of a throttle valve 18 of the intake path 161 is controlled.

The fuel vapor leak detection unit 91 is connected to the canister 81 via a canister connection pipe 19 functioning as a "canister path member" that forms a canister connection path 191 functioning as a "canister path". The fuel vapor leak detection unit 91 determines presence or absence of a fuel vapor leak from the fuel tank 84, the canister 81, the first purge pipe 11, the second purge pipe 13, or other components.

A "canister side system", a "fuel tank side system", and an "entire system" are each defined herein as an area where a fuel vapor leak is detectable by the fuel vapor leak detection unit 91.

The "canister side system" covers an area of the canister 81, an area of the first purge pipe 11 between the canister 81 and the sealing valve 82, an area of the second purge pipe 13 between the canister 81 and the purge valve 14, and an area of the inside of the fuel vapor leak detection unit 91 communicating with the inside of the canister 81.

The "fuel tank side system" covers an area of the fuel tank 84, and an area of the first purge pipe 11 between the fuel tank 84 and the sealing valve 82.

The "entire system" covers a combined area of the "canister side system" and the "fuel tank side system".

The fuel vapor leak detection unit 91 includes an atmosphere pipe 21 functioning as an "atmosphere path member", a pressure pipe 23 functioning as a "pressure detection path member", a first switching valve 25, a pump 27 functioning as a "pressurizing/depressurizing unit", a bypass pipe 29 functioning as a "bypass path member", a reference orifice 31 functioning as a "narrowing portion", and a differential pressure sensor 33 functioning as a "differential pressure detection unit".

The atmosphere pipe 21 is connected to the first switching valve 25 and the pump 27. The atmosphere pipe 21 forms an atmosphere path 211 communicating with the atmosphere.

The atmosphere pipe 21 includes a filter 212. The filter 212 is configured such that gas discharged from the inside of the fuel tank 84 or the inside of the canister 81 into the outside atmosphere passes through the filter 212 at the time of absorption of fuel vapor by the canister absorbent 811 of the canister 81, depressurization inside the fuel tank 84 by the pump 27, or supply of fuel into the fuel tank 84. At the time of supply of fuel vapor absorbed by the canister 81 toward the intake pipe 16, outside air passes through the filter 212 to be introduced into the pump 27 or the first switching valve 25. At this time, the filter 212 collects foreign materials contained in the introduced air. Arrows F1 in FIG. 1 indicate flows of gas between the fuel vapor leak detection unit 91 and the outside atmosphere.

The pressure pipe 23 is connected to the first switching valve 25 and the pump 27. The pressure pipe 23 forms a pressure detection path 231 communicatively connectable with the canister connection path 191.

The first switching valve 25 is connected to the canister connection pipe 19, the atmosphere pipe 21, and the pressure pipe 23. The first switching valve 25 is electrically connected to the ECU 83. When power is not supplied to the first switching valve 25, the canister connection path 191 communicates with the atmosphere path 211 as illustrated in FIG. 1. When power is supplied to the first switching valve 25, the canister connection path 191 communicates with the pressure detection path 231 via the first switching valve 25.

The pump 27 is connected to the atmosphere pipe 21 and the pressure pipe 23. The pump 27 is electrically connected to the ECU 83. The pump 27 is capable of depressurizing the insides of the fuel tank 84 and the canister 81.

The bypass pipe 29 bypasses the first switching valve 25, and connects with the canister connection pipe 19 and the pressure pipe 23. The bypass pipe 29 forms a bypass path 291 that communicatively connects the canister connection path 191 and the pressure detection path 231. The bypass pipe 29 includes the reference orifice 31 functioning as the "narrowing portion". The inside diameter of the reference orifice 31 is sized to be equivalent to the inside diameter of a hole through which an upper limit of an allowable quantity of gas, including fuel vapor, can leak from the entire system.

The differential pressure sensor 33 is disposed in a differential pressure pipe 332 that connects the pressure pipe 23 and the first purge pipe 11 between the fuel tank 84 and the sealing valve 82. The differential pressure pipe 332 forms a differential pressure detection path 331 that communicatively connects the first purge path 111 and the pressure detection path 231.

The differential pressure sensor 33 is electrically connected to the ECU 83. The differential pressure sensor 33 is capable of detecting a difference between a pressure of the first purge path 111 and a pressure of the pressure detection path 231, and outputting a signal indicating the detected difference to the ECU 83.

The sealing valve 82 is disposed in the first purge pipe 11. The sealing valve 82 is electrically connected to the ECU 83. The sealing valve 82 is capable of opening or closing the first purge path 111 in accordance with a command signal output from the ECU 83.

For example, the ECU 83 is constituted by a microcomputer including a central processing unit (CPU) functioning as an arithmetic unit, and a random-access memory (RAM) and a read-only memory (ROM) functioning as a recording unit, and others units. The ECU 83 controls the first switching valve 25, the pump 27, and the sealing valve 82 in accordance with a signal output from the differential pressure sensor 33.

Figure 2:
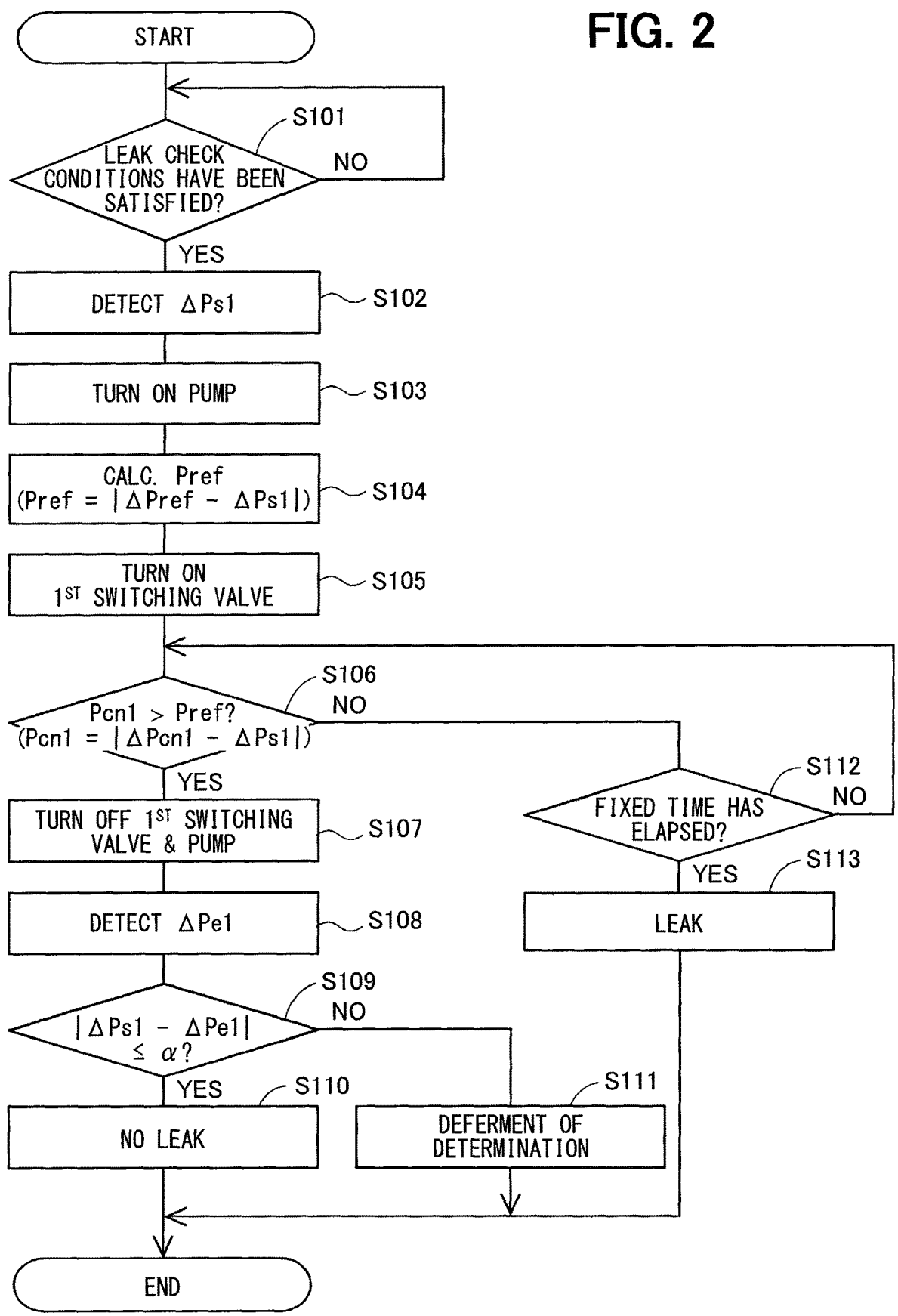
FIG. 2 is a flowchart showing a fuel vapor leak detection method performed by the fuel vapor processing device according to the first embodiment for detecting a fuel vapor leak from a canister.
Figure 3:
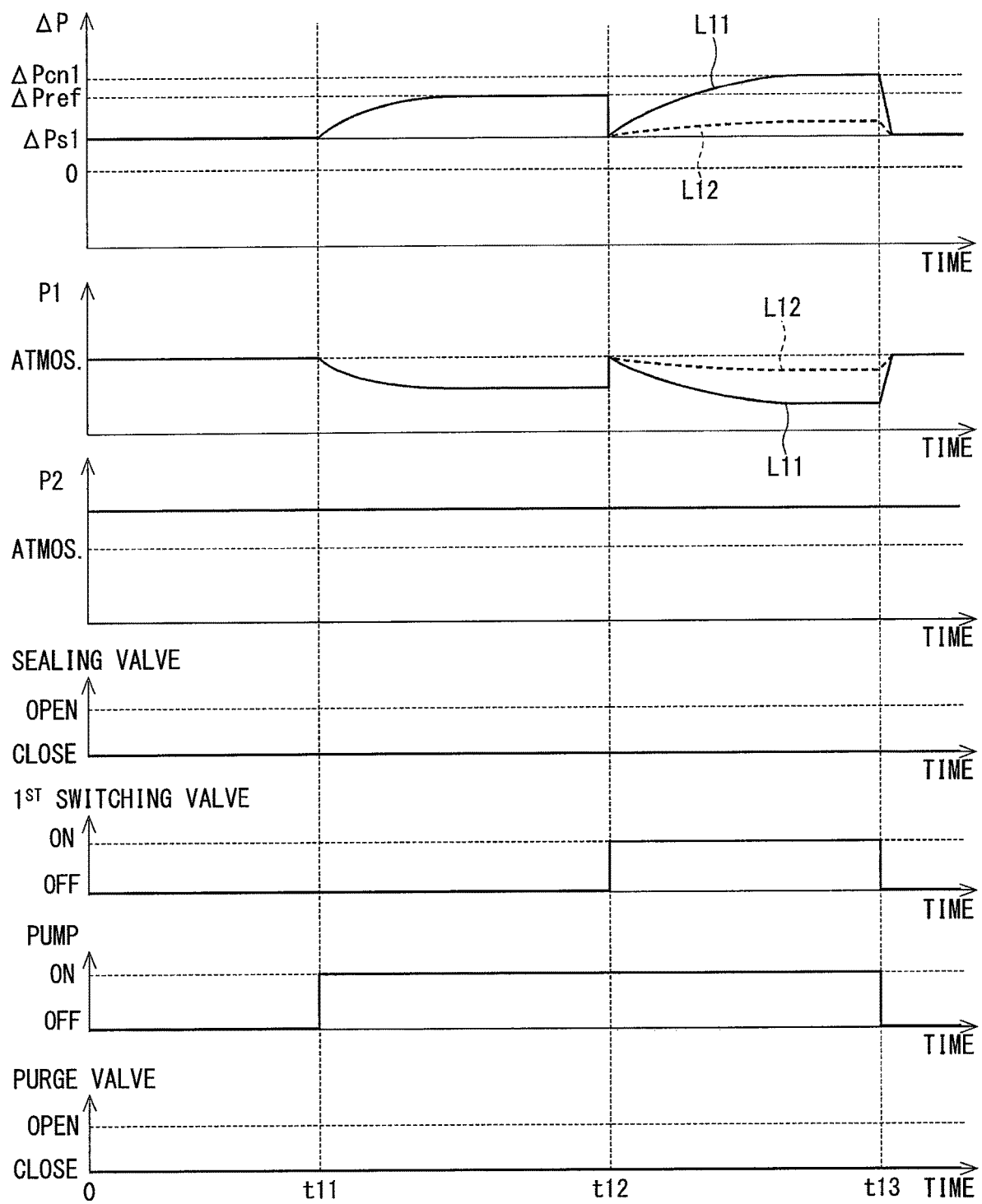
FIG. 3 is a characteristic diagram showing characteristics during fuel vapor leak detection performed by the fuel vapor processing device according to the first embodiment for detecting a fuel vapor leak from the canister.

A fuel vapor leak detection method performed by the fuel vapor processing device 1 for detecting a fuel vapor leak from the canister 81 is now described with reference to FIGS. 2 and 3. FIG. 2 is a flowchart showing the fuel vapor leak detection method performed by the fuel vapor processing device 1 for detecting a fuel vapor leak from the canister 81. FIG. 3 is characteristic diagram showing characteristics during fuel vapor leak detection of a fuel vapor leak from the canister 81. In FIG. 3, each of horizontal axes represents time, while each of vertical axes represents a numerical value or a state of a corresponding item.αα

FIG. 3 shows a differential pressure ΔP calculated based on a signal output from the differential pressure sensor 33, a pressure P1 of the pressure detection path 231, a pressure P2 of the first purge path 111, an open/close state of the sealing valve 82, a state of the first switching valve 25, an operation state of the pump 27, and an open/close state of the purge valve 14 in this order.

In practice, the fuel vapor processing device 1 does not detect the pressures P1 and P2. However, considering that the differential pressure ΔP shown in FIG. 3 is a value calculated by subtracting the pressure P1 from the pressure P2, the pressure P2 is estimable from the magnitude of the pressure P1. For example, the differential pressure ΔP is higher than "0" between a time "0" and a time t11 as shown in FIG. 3. At this time, the pressure P1 of the pressure detection path 231 is equivalent to the atmospheric pressure in the condition of the fuel vapor processing device 1. Accordingly, the inside of the first purge path 111 is considered to have a positive pressure. As illustrated in FIG. 1, the inside of first purge path 111 near the fuel tank 84 with respect to the sealing valve 82 communicates with the inside of the fuel tank 84. The pressure P2 of the first purge path 111 is therefore considered to be equivalent to the pressure inside the fuel tank 84. According to the first embodiment, the inside of the fuel tank 84 is considered to have a positive pressure. In FIG. 3, an "on-state" is achieved when the canister connection path 191 communicates with the pressure detection path 231 via the first switching valve 25 with supply of power to the first switching valve 25.

First, in S101, it is determined whether conditions required for a fuel vapor leak check start performed by the fuel vapor processing device 1 have been satisfied. For example, the ECU 83 determines whether a leak check by the fuel vapor processing device 1 is startable based on a state of a vehicle carrying the engine 10, an elapsed time from a stop of the vehicle, whether an internal pressure of the fuel tank has been stabilized, or other conditions. When it is determined that the conditions required for the leak check start have been satisfied based on types of information, the process proceeds to S102. When it is determined that the conditions required for the leak check start are not satisfied based on types of information, the process repeats determination in S101.

During determination in S101, the fuel vapor processing device 1 remains in the state illustrated in FIG. 1. The sealing valve 82 is closed in this state, and therefore the fuel tank 84 and the canister 81 are isolated from each other. Accordingly, it is estimated that the pressure P1 is equivalent to the atmospheric pressure between the time "0" and the time t11 shown in FIG. 3 as described above. It is further estimated that the pressure P2 is higher than the atmospheric pressure in the presence of fuel vapor inside the fuel tank 84. Accordingly, the differential pressure ΔP has a value higher than "0" in FIG. 3.

Subsequently, in S102, a differential pressure ΔPs1 is detected as an "initial value" and a "base difference value" including information about a pressure inside the fuel tank 84. As described above, the differential pressure ΔPs1 is the differential pressure ΔP produced when the pressure P1 is the atmospheric pressure. Accordingly, the differential pressure ΔPs1 is equivalent to a gauge pressure inside the fuel tank 84. The ECU 83 records the differential pressure ΔP between the time "0" and the time t11 in FIG. 3 as the differential pressure ΔPs1.

Subsequently, in S103, driving of the pump 27 is started. The ECU 83 in S103 starts driving of the pump 27 (time t11 in FIG. 3). As a result, the atmosphere is introduced through the atmosphere path 211, the first switching valve 25, the bypass path 291, and the pressure detection path 231. In this case, it is estimated that the pressure P1 of the pressure detection path 231 drops (period from time t11 to time t12 in FIG. 3). It is estimated that the pressure P1 becomes constant after an elapse of a certain period of time. When the differential pressure ΔP becomes constant after the start of driving of the pump 27, the ECU 83 records the differential pressure ΔP that has become constant as a differential pressure ΔPref indicating a "reference difference value".

Subsequently, in S104, a reference pressure Pref indicating a "reference value" is calculated. The ECU 83 in S104 subtracts the differential pressure ΔPs1 recorded in S102 from the differential pressure ΔPref recorded in S103, and designates the absolute value of the difference thus obtained as the reference pressure Pref.

Subsequently, in S105, power is supplied to the first switching valve 25. The ECU 83 in S105 supplies power to the first switching valve 25. As a result, the canister connection path 191 communicates with the pressure detection path 231 via the first switching valve 25 (time t12 in FIG. 3).

Subsequently, in S106, it is determined whether a calculated value Pcn1 indicating a "determination value" is larger than the reference pressure Pref. The ECU 83 in S106 detects a differential pressure ΔPcn1 indicating a "determination difference value", which has become constant between the time t12 and a time t13 in FIG. 3. The ECU 83 subtracts the differential pressure ΔPs1 recorded in S102 from the detected differential pressure ΔPcn1, and designates the absolute value of the difference thus obtained as the calculated value Pcn1. The ECU 83 compares the magnitude of the calculated value Pcn1 with the magnitude of the reference pressure Pref. FIG. 3 shows solid lines L11 each indicating an example of changes of the differential pressure ΔP and the pressure P1 with time when the calculated value Pcn1 is higher than the reference pressure Pref. When it is determined that the calculated value Pcn1 is higher than the reference pressure Pref, the process proceeds to S107. FIG. 3 shows dotted lines L12 each indicating an example of changes of the differential pressure ΔP and the pressure P1 with time when the calculated value Pcn1 is lower than or equal to the reference pressure Pref. When it is determined that the calculated value Pcn1 is lower than or equal to the reference pressure Pref, the process proceeds to S112.

When it is determined in S106 that the calculated value Pcn1 is higher than the reference pressure Pref, power supply to the first switching valve 25, and driving of the pump 27 are stopped in S107 (time t13 in FIG. 3).

Subsequently, in S108, the differential pressure ΔP is measured. It is estimated in S107 that the pressure P1 returns to the atmospheric pressure as indicated after the time t13 in FIG. 3 by the stops of power supply to the first switching valve 25 and driving of the pump 27. The ECU 83 records the differential pressure ΔP at this time as a differential pressure ΔPe1 indicating an "end value".

Subsequently, in S109, the differential pressure ΔPs1 detected in S104 is compared with the differential pressure ΔPe1 detected in S108. More specifically, the ECU 83 determines whether an absolute value of the difference between the differential pressure ΔPs1 and the differential pressure ΔPe1 is smaller than or equal to a predetermined value α.

When it is determined that the absolute value of the difference between the differential pressure ΔPs1 and the differential pressure ΔPe1 is smaller than or equal to the predetermined value α, it is estimated that a pressure change inside the fuel tank 84 is relatively small between S103 and S107. Accordingly, when it is determined that the absolute value of the difference between the differential pressure ΔPs1 and the differential pressure ΔPe1 is smaller than or equal to the predetermined value α in S109, the canister side system is considered to have no hole whose inside diameter is larger than the inside diameter of the reference orifice 31. The ECU 83 in S110 therefore determines absence of a leak from the canister side system.

When it is determined that the absolute value of the difference between the differential pressure ΔPs1 and the differential pressure ΔPe1 is larger than the predetermined value α it is estimated that a pressure change inside the fuel tank 84 is relatively large between S103 and S107. Accordingly, when it is determined in S109 that the absolute value of the difference between the differential pressure ΔPs1 and the differential pressure ΔPe1 is larger than the predetermined value α, the pressure inside the fuel tank 84 is considered to be unstable. The ECU 83 in S111 therefore determines a deferment of leak detection of the canister side system.

When it is determined in S106 that the calculated value Pcn1 is lower than or equal to the reference pressure Pref, it is further determined in S112 whether a fixed period of time has elapsed from the time t12. When the ECU 83 determines that the fixed period of time has elapsed from the time t12, the process proceeds to S113. When the ECU 83 determines that the fixed period of time has not elapsed from the time t12 yet, the process returns to S106 to again determine whether the calculated value Pcn1 is higher than the reference pressure Pref.

When it is determined that the calculated value Pcn1 is lower than or equal to the reference pressure Pref in S106, and that the fixed period of time has elapsed in S112, the canister side system is considered to have a hole whose inside diameter is larger than the inside diameter of the reference orifice 31. The ECU 83 in S113 therefore determines presence of a leak from the canister side system.

Figure 4:
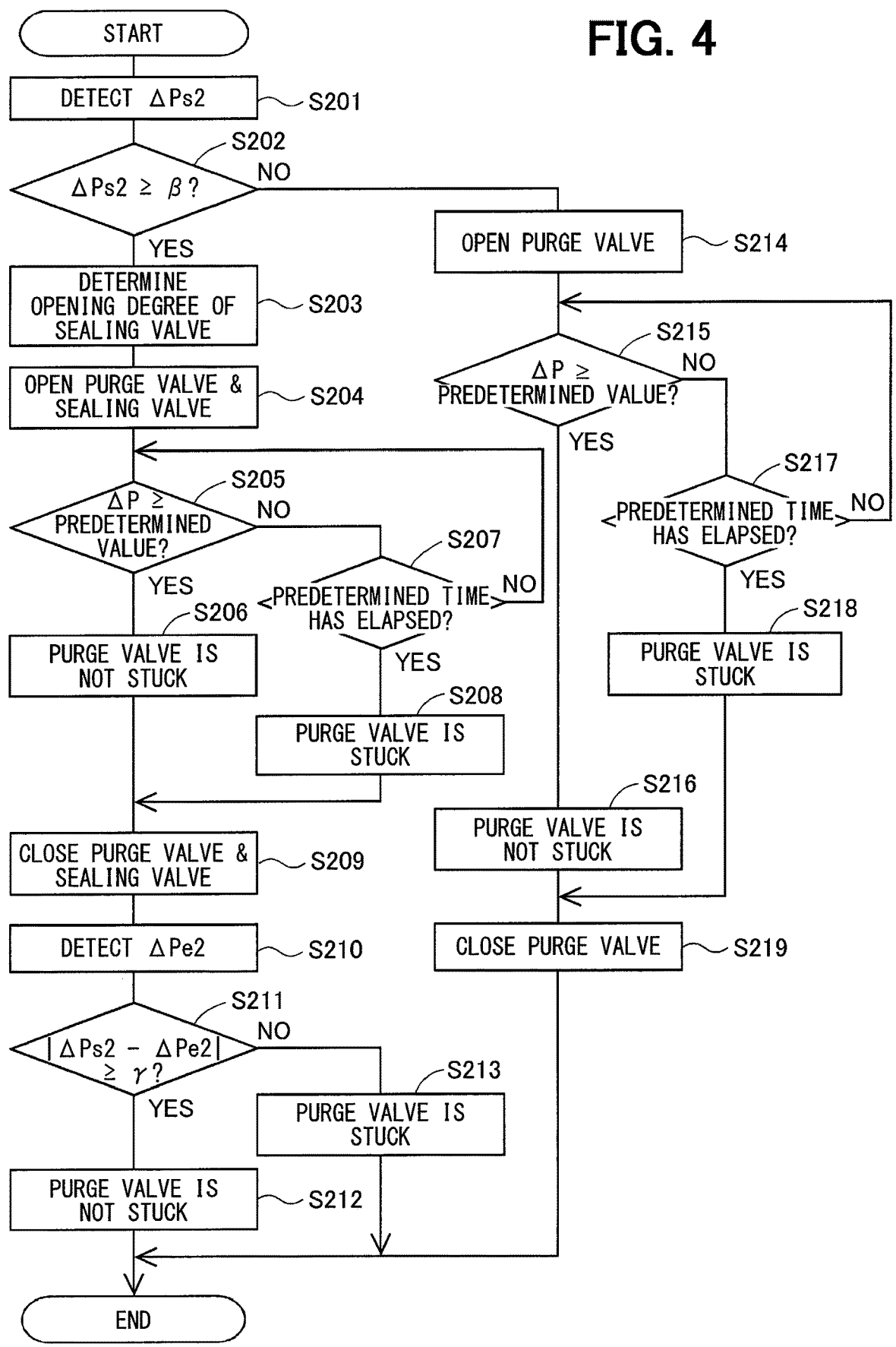
FIG. 4 is a flowchart showing an abnormality detection method performed by the fuel vapor processing device according to the first embodiment for detecting abnormality of a purge valve and a sealing valve.

An abnormality detection method performed by the fuel vapor processing device 1 for detecting abnormality of the purge valve 14 and the sealing valve 82 is now described with reference to FIGS. 4 to 6. FIG. 4 is a flowchart showing the abnormality detection method performed by the fuel vapor processing device 1 for detecting abnormality of the purge valve 14 and the sealing valve 82. The flowchart shown in FIG. 4 is executed when fuel vapor absorbed by the canister 81 is supplied to the intake pipe 16 during driving of the engine 10.

Figure 5:
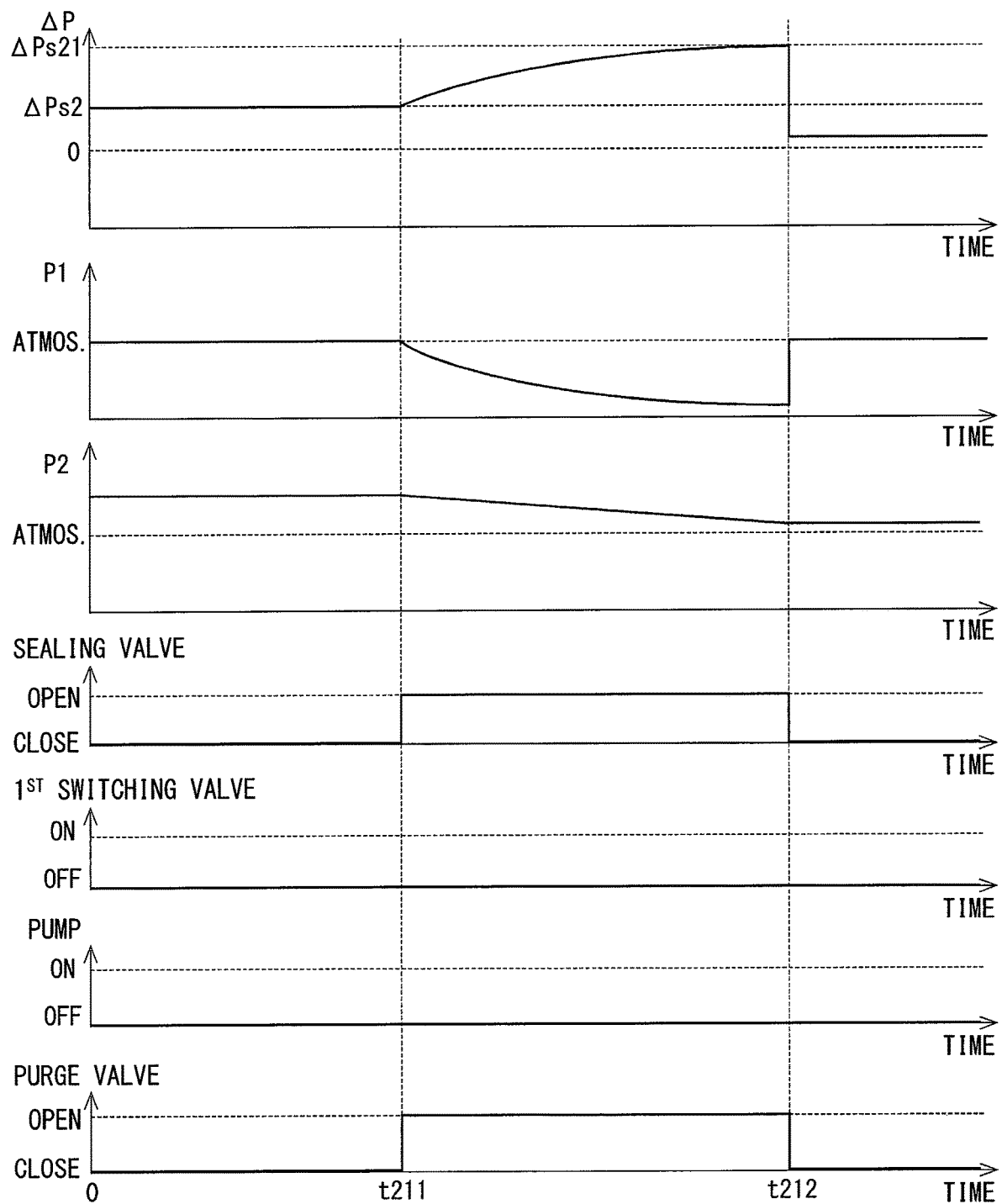
FIG. 5 is a characteristic diagram showing characteristics during abnormality detection performed by the fuel vapor processing device according to the first embodiment for detecting abnormality of the purge valve and the sealing valve.
Figure 6:
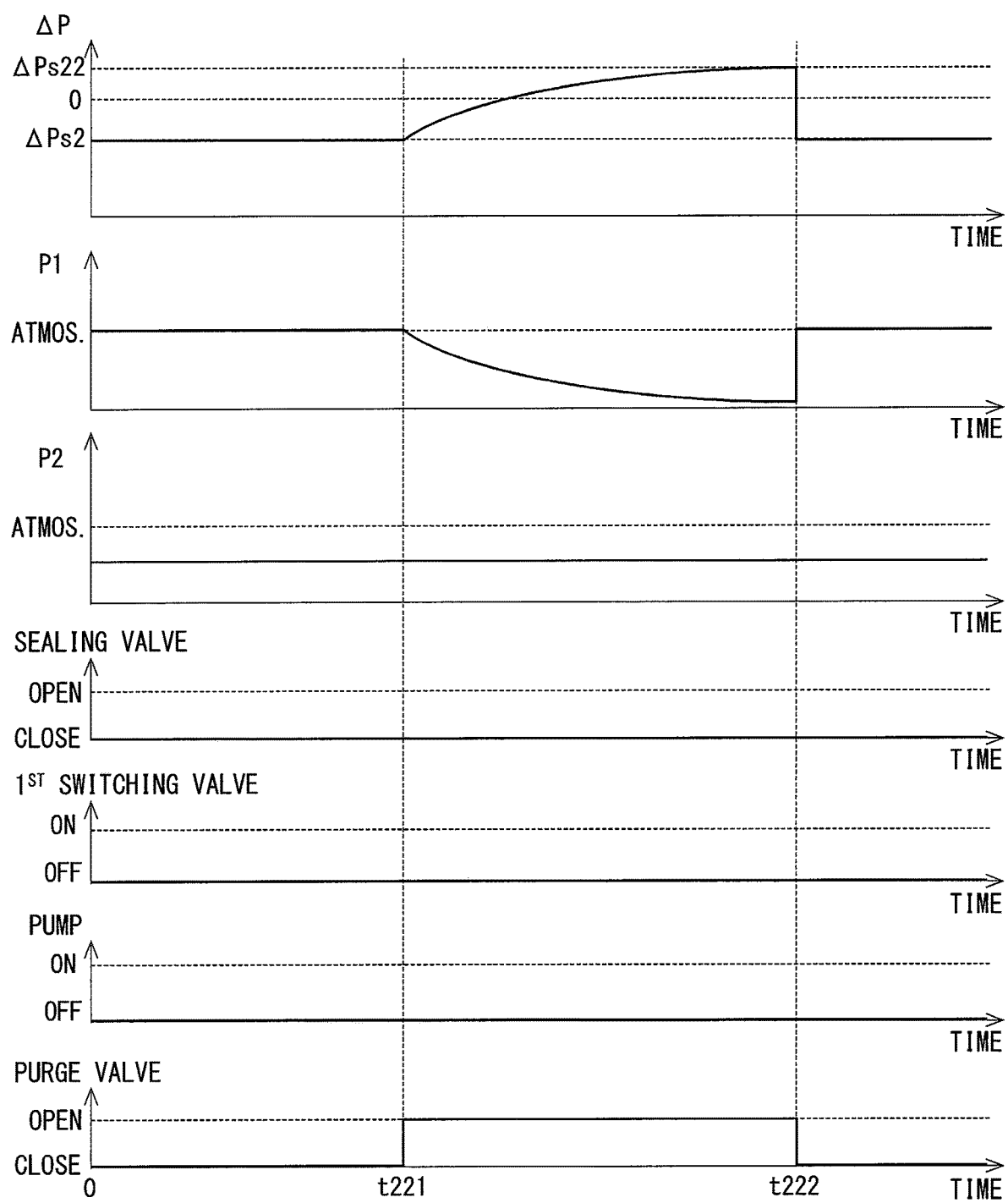
FIG. 6 is a characteristic diagram showing characteristics during abnormality detection performed by the fuel vapor processing device according to the first embodiment for detecting abnormality of the purge valve and the sealing valve in a state of the inside of a fuel tank different from a state of the inside of the fuel tank shown in FIG. 5.

FIGS. 5 and 6 are characteristic diagrams each showing characteristics during abnormality detection of the purge valve 14 and the sealing valve 82. FIG. 5 shows a case where the pressure of the fuel tank 84 is higher than the atmospheric pressure, while FIG. 6 shows a case where the pressure of the fuel tank 84 is lower than the atmospheric pressure. FIG. 5 is a characteristic diagram showing characteristics during abnormality detection of the purge valve 14 and the sealing valve 82 in a state that the pressure of the fuel tank 84 is higher than the atmospheric pressure. FIG. 6 is a characteristic diagram showing characteristics during abnormality detection of the purge valve 14 and the sealing valve 82 in a state that the pressure of the fuel tank 84 is lower than the atmospheric pressure.

First, in S201, a differential pressure ΔPs2 including information about the pressure inside the fuel tank 84 is detected. The ECU 83 in S201 records the differential pressure ΔP between a time "0" and times t211 and t221 in FIGS. 5 and 6, respectively, as the differential pressure ΔPs2.

Subsequently, in S202, it is determined whether the differential pressure ΔPs2 is higher than or equal to a predetermined value. The ECU 83 in S202 determines whether the differential pressure ΔPs2 detected in S201 is higher than or equal to the predetermined value β.

The predetermined value in S202 herein is "0", for example. When the differential pressure ΔPs2 is higher than or equal to the predetermined value, the pressure P2 equivalent to the internal pressure of the fuel tank 84 is a pressure higher than or equal to the atmospheric pressure as shown in FIG. 5. When the ECU 83 determines that the differential pressure ΔPs2 is higher than or equal to the predetermined value, the process proceeds to S203. When the differential pressure ΔPs2 is lower than the predetermined value, the pressure P2 is a pressure lower than the atmospheric pressure as shown in FIG. 6. When the ECU 83 determines that the differential pressure ΔPs2 is lower than the predetermined value, the process proceeds to S214.

When it is determined in S202 that the differential pressure ΔPs2 is higher than or equal to the predetermined value, an opening degree of the sealing valve 82 is further determined in S203. For example, the ECU 83 in S203 determines the opening degree of the sealing valve 82 based on information about the driving state of the engine 10 or other conditions.

Subsequently, in S204, the purge valve 14 and the sealing valve 82 are opened. The ECU 83 in S204 outputs a valve opening command to each of the purge valve 14 and the sealing valve 82 (time t211 in FIG. 5). As a result, fuel vapor within the fuel tank 84 is allowed to be supplied to the intake pipe 16 as well as fuel vapor absorbed by the canister 81. With opening of the purge valve 14, the intake path 161 is communicatively connected to the inside of the canister 81. During driving of the engine 10, the inside of the intake path 161 has a negative pressure, wherefore the inside of the canister 81 also has a negative pressure. Accordingly, it is estimated that the pressure P1 is a negative pressure (time t211 to time t212 in FIG. 5).

Subsequently, in S205, it is determined whether an amount of change of the differential pressure ΔP is larger than or equal to a predetermined value. For example, the predetermined value in S205 herein is a value sufficient for recognizing a change of the differential pressure ΔP. The ECU 83 in S205 determines whether an amount of change from the differential pressure ΔPs2 at the time t211 (change corresponding to difference between differential pressure ΔPs2 at time t211 and differential pressure ΔPs21 at time t212 in FIG. 5) is larger than or equal to a predetermined value under supply of fuel vapor to the intake pipe 16 with opening of the purge valve 14 and the sealing valve 82. When it is determined that the amount of change of the differential pressure ΔP is larger than or equal to the predetermined value, the process proceeds to S206. When it is determined that the amount of change of the differential pressure ΔP is smaller than the predetermined value, the process proceeds to S207.

When it is determined in S205 that the amount of change of the differential pressure ΔP is larger than or equal to the predetermined value, the ECU 83 in S206 determines that the purge valve 14 is not stuck.

When it is determined in S205 that the amount of change of the differential pressure ΔP is smaller than the predetermined value, the ECU 83 in S207 further determines whether a predetermined period of time has elapsed from the time t211. For example, the predetermined time in S207 herein is a time required until the change of the differential pressure ΔP with time becomes "0" after the time t211. When the ECU 83 determines that the predetermined time has elapsed from the time t211, the process proceeds to S208. When it is determined that the predetermined time has not elapsed from the time t211 yet, the process returns to S205 to again determine whether the amount of change of the differential pressure ΔP is larger than or equal to the predetermined value.

When it is determined in S207 that the predetermined time has elapsed from the time t211, the ECU 83 in S208 determines that the purge valve 14 is stuck.

After completion of S206 and S208, the purge valve 14 and the sealing valve 82 are closed in S209. The ECU 83 outputs a valve closing command to each of the purge valve 14 and the sealing valve 82 (time t212 in FIG. 5). In response to these commands, isolations between the intake pipe 16 and the canister 81, and between the canister 81 and the fuel tank 84 are achieved. As a result, supply of fuel vapor to the intake pipe 16 ends.

Subsequently, in S210, the differential pressure ΔP is detected. With closure of the purge valve 14 and the sealing valve 82 in S209, it is estimated that the pressure P1 becomes the atmospheric pressure as indicated after the time t212 in FIG. 5. The ECU 83 in S210 records a differential pressure ΔPe2 that is the differential pressure ΔP stabilized after an elapse of a certain period of time from the time t212.

Subsequently, in S211, the differential pressure ΔPs2 detected in S202 is compared with the differential pressure ΔPe2 detected in S210. More specifically, the ECU 83 determines whether the absolute value of the difference between the differential pressure ΔPs2 and the differential pressure ΔPe2 is larger than or equal to a predetermined value γ. For example, the predetermined value in S211 herein is a detection error of the differential pressure sensor 33. When it is determined that the absolute value of the difference between the differential pressure ΔPs2 and the differential pressure ΔPe2 is larger than or equal to the predetermined value γ, the process proceeds to S212. When it is determined that the absolute value of the difference between the differential pressure ΔPs2 and the differential pressure ΔPe2 is smaller than the predetermined value γ, the process proceeds to S213.

When it is determined in S211 that the absolute value of the difference between the differential pressure ΔPs2 and the differential pressure ΔPe2 is larger than or equal to the predetermined value γ, the ECU 83 in S212 determines that the sealing valve 82 is not stuck.

When it is determined in S211 that the absolute value of the difference between the differential pressure ΔPs2 and the differential pressure ΔPe2 is smaller than the predetermined value γ, the ECU 83 in S213 determines that the sealing valve 82 is stuck.

When it is determined in S202 that the differential pressure ΔPs2 is lower than the predetermined value β, the purge valve 14 is opened in S214. The ECU 83 in S214 outputs a valve opening command to the purge valve 14 (time t221 in FIG. 6). As a result, fuel vapor absorbed by the canister 81 is allowed to be supplied to the intake pipe 16. As described above, the inside of the canister 81 also has a negative pressure with opening of the purge valve 14. Accordingly, it is estimated that the pressure P1 becomes a negative pressure (time t221 to time t222 in FIG. 6).

Subsequently, in S215, it is determined whether an amount of change of the differential pressure ΔP is larger than or equal to a predetermined value. The predetermined value in S215 herein is a value sufficient for recognizing a change of the differential pressure ΔP. The ECU 83 in S215 determines whether an amount of change from the differential pressure ΔPs2 at the time t221 (change corresponding to difference between differential pressure ΔPs2 at time t221 and differential pressure ΔPs22 at time t222 in FIG. 6) is larger than or equal to the predetermined value under supply of fuel vapor to the intake pipe 16 with opening of the purge valve 14. When it is determined that the amount of change of the differential pressure ΔP is larger than or equal to the predetermined value, the process proceeds to S216. When it is determined that the amount of change of the differential pressure ΔP is smaller than the predetermined value, the process proceeds to S217.

When it is determined in S215 that the amount of change of the differential pressure ΔP is larger than or equal to the predetermined value, the ECU 83 in S216 determines that the purge valve 14 is not stuck.

When it is determined in S215 that the amount of change of the differential pressure ΔP is smaller than the predetermined value, the ECU 83 in S217 further determines whether a predetermined time has elapsed from the time t221. For example, the predetermined time in S217 herein is a time required until the change of the differential pressure ΔP with time becomes "0" after the time t221. When it is determined that the predetermined time has elapsed from the time t221, the process proceeds to S218. When it is determined that the predetermined time has not elapsed from the time t221 yet, the process returns to S215 to again determine whether the amount of change of the differential pressure ΔP is larger than or equal to the predetermined value.

When it is determined in S217 that the predetermined time has elapsed from the time t221, the ECU 83 in S218 determines that the purge valve 14 is stuck.

After completion of S216 and S218, the purge valve 14 is closed in S219. The ECU 83 outputs a valve closing command to the purge valve 14 (time t222 in FIG. 6). In response to this command, isolation between the intake pipe 16 and the canister 81 is achieved. As a result, supply of fuel vapor to the intake pipe 16 ends.

An operation performed by the fuel vapor processing device 1 during refueling of the fuel tank 84 is now described with reference to FIGS. 7 and 8. When the pressure inside the fuel tank 84 is higher than the atmospheric pressure during refueling of the fuel tank 84, fuel vapor may be discharged from a fuel filler opening to the outside with opening of the fuel filler opening. The fuel vapor processing device 1 therefore equalizes the pressure inside the fuel tank 84 with the atmospheric pressure in accordance with a flowchart in FIG. 7 to prevent discharge of fuel vapor from the fuel filler opening into the atmosphere. FIG. 8 is a characteristic diagram showing characteristics during refueling of the fuel tank.

Before opening of the fuel filler opening for refueling in the state illustrated in FIG. 1, the pressure P2 equivalent to the pressure inside the fuel tank 84 is higher than the atmospheric pressure as indicated between a time "0" and a time t31 in FIG. 8. In this case, the differential pressure ΔP becomes a differential pressure ΔPs3 higher than "0".

In this condition, the sealing valve 82 is initially opened in S301. The ECU 83 in S301 outputs a valve opening command to the sealing valve 82 (time t31 in FIG. 8). With opening of the sealing valve 82, fuel vapor inside the fuel tank 84 flows through the first purge pipe 11 into the canister 81 to be absorbed by the canister absorbent 811. As a result, the pressure P2 gradually drops (see period after time t31 in FIG. 8).

Subsequently, in S302, it is determined whether the differential pressure ΔP after opening of the sealing valve 82 (differential pressure ΔP between time t31 and time t32 in FIG. 8) falls within a predetermined range, or whether a predetermined time has elapsed. The ECU 83 in S302 determines whether the value of the differential pressure ΔP changeable in accordance with the drop of the pressure inside the fuel tank 84 falls within a predetermined range including "0", or whether a predetermined time, which corresponds to a time required for relative stabilization of the differential pressure ΔP after the time t31, has elapsed. When it is determined that the differential pressure ΔP after opening of the sealing valve 82 falls within the predetermined range, or that the predetermined time has elapsed, the process proceeds to S303. When it is determined that the differential pressure ΔP after opening of the sealing valve 82 does not fall within the predetermined range, and that the predetermined time has not elapsed yet, the determination in S302 is repeated.

When it is determined in S302 that the differential pressure ΔP falls within the predetermined range, or that the predetermined time has elapsed, the sealing valve 82 is closed in S303. The ECU 83 outputs a valve closing command to the sealing valve 82 (time t32 in FIG. 8). As a result, isolation between the fuel tank 84 and the canister 81 is achieved.

Subsequently, in S304, it is determined whether the differential pressure ΔP after closure of the sealing valve 82 (differential pressure ΔP between time t32 and time t33 in FIG. 8) falls within a predetermined range. The predetermined range in S304 herein is a relatively narrow range including "0". When the differential pressure ΔP after closure of the sealing valve 82 falls within the relatively narrow range including "0" in the closed state of the sealing valve 82, it is estimated that the pressure inside the fuel tank 84 is a pressure around the atmospheric pressure. When it is determined that the differential pressure ΔP after closure of the sealing valve 82 falls within the predetermined range, the process proceeds to S305. When the differential pressure ΔP after closure of the sealing valve 82 lies out of the predetermined range, the process returns to S301 to again open the sealing valve 82.

Subsequently, in S305, the sealing valve 82 is opened. The ECU 83 in S305 outputs a valve opening command to the sealing valve 82 (time t33 in FIG. 8). With opening of the sealing valve 82, the inside of the fuel tank 84 is communicatively connected to the inside of the canister 81 via the first purge pipe 11. At this time, the pressure inside the fuel tank 84 becomes substantially equivalent to the atmospheric pressure.

Subsequently, in S306, the fuel filler opening is opened to supply fuel to the fuel tank 84. At this time, gas present inside the fuel tank 84 and pushed out by the fuel supplied to the fuel tank 84 flows through the first purge pipe 11 into the canister 81.

(a) The fuel vapor processing device 1 according to the first embodiment includes the single differential pressure sensor 33. The differential pressure sensor 33 detects a difference between the pressure P1 of the pressure detection path 231 and the pressure P2 of the first purge path 111, and outputs a signal indicating the detected difference to the ECU 83. The ECU 83 controls operations of the first switching valve 25, the pump 27, and the sealing valve 82 in accordance with the signal output from the single differential pressure sensor 33.

In S102, the ECU 83 detects the differential pressure ΔPs1 in the state that the pressure P1 of the pressure detection path 231 is the atmospheric pressure. The ECU 83 calculates the pressure P2 of the first purge path 111 by subtracting the atmospheric pressure from the differential pressure ΔPs1. The fuel vapor processing device 1 therefore can detect a gauge pressure of the fuel tank 84. Moreover, the ECU 83 calculates the reference pressure Pref and the calculated value Pcn1 based on the differential pressure ΔPs in S104 and S106. The ECU 83 determines presence or absence of a fuel vapor leak from the canister side system, based on the magnitude relationship between the reference pressure Pref and the calculated value Pcn1.

The fuel vapor processing device 1 therefore can detect a fuel vapor leak by using a simplified configuration without a need of a plurality of sensors.

(b) The fuel vapor processing device 1 compares the differential pressure ΔPs1 detected in S104 with the differential pressure ΔPe1 detected in S108 to determine presence or absence of a fuel vapor leak from the canister side system. This comparison is made to check the magnitude of a pressure change inside the fuel tank 84 during processing from S103 to S107. When the pressure change is small, accuracy in determining presence or absence of a fuel vapor leak from the canister side system from S103 to S107 increases.

(c) The fuel vapor processing device 1 can determine sticking abnormality of the purge valve 14 and the sealing valve 82 by performing the process shown in the flowchart in FIG. 4 based on an amount of change of the differential pressure ΔP when fuel vapor is supplied to the intake pipe 16.

Figure 7:
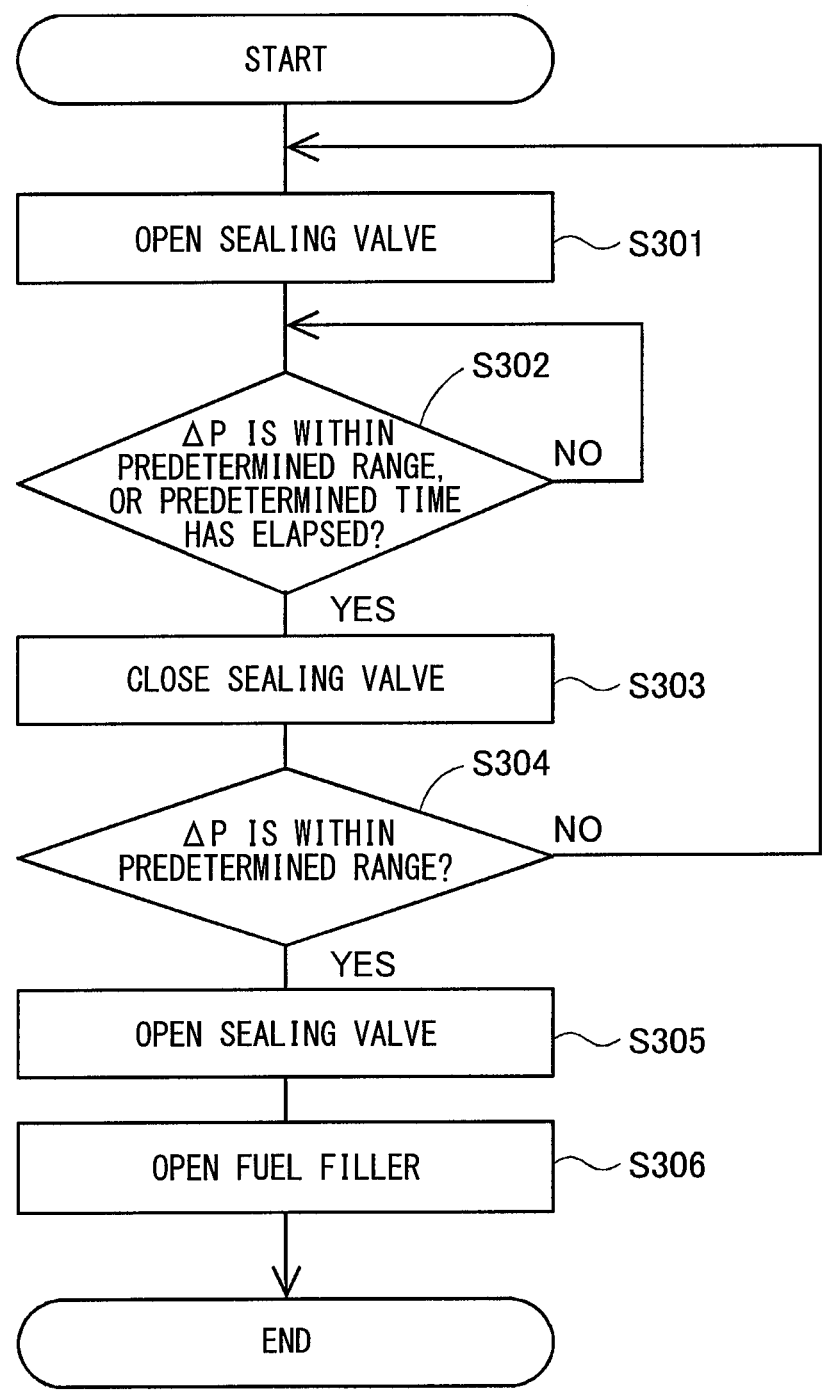
FIG. 7 is a flowchart showing an operation during refueling of the fuel tank performed by the fuel vapor processing device according to the first embodiment.
Figure 8:
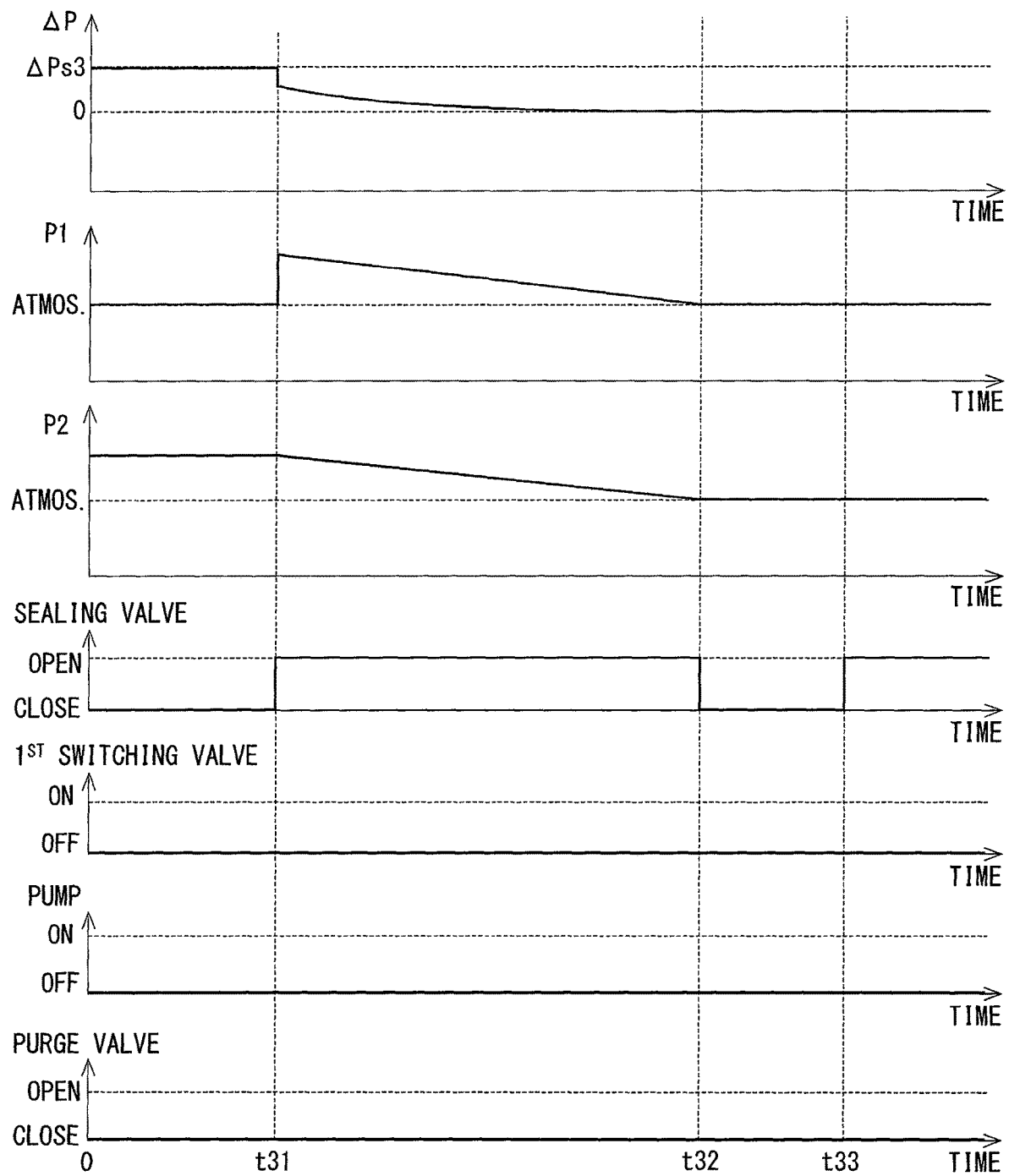
FIG. 8 is a characteristic diagram showing characteristics during refueling of the fuel tank performed by the fuel vapor processing device according to the first embodiment.

(d) The fuel vapor processing device 1 can detect the pressure inside the fuel tank 84 as a gauge pressure by using the differential pressure sensor 33 in accordance with the flowchart in FIG. 7 based on a comparison between the pressure inside the fuel tank 84 and the pressure of the pressure pipe 23 equivalent to the atmospheric pressure. Accordingly, discharge of fuel vapor from the fuel filler opening into the atmosphere can be securely avoidable during refueling of the fuel tank 84.

(e) The fuel vapor processing device 1 can determine presence or absence of a fuel vapor leak while detecting the pressure inside the fuel tank only by using the single differential pressure sensor 33. Accordingly, reduction of manufacturing costs of the fuel vapor processing device 1 is achievable.

Second Embodiment

Figure 9:
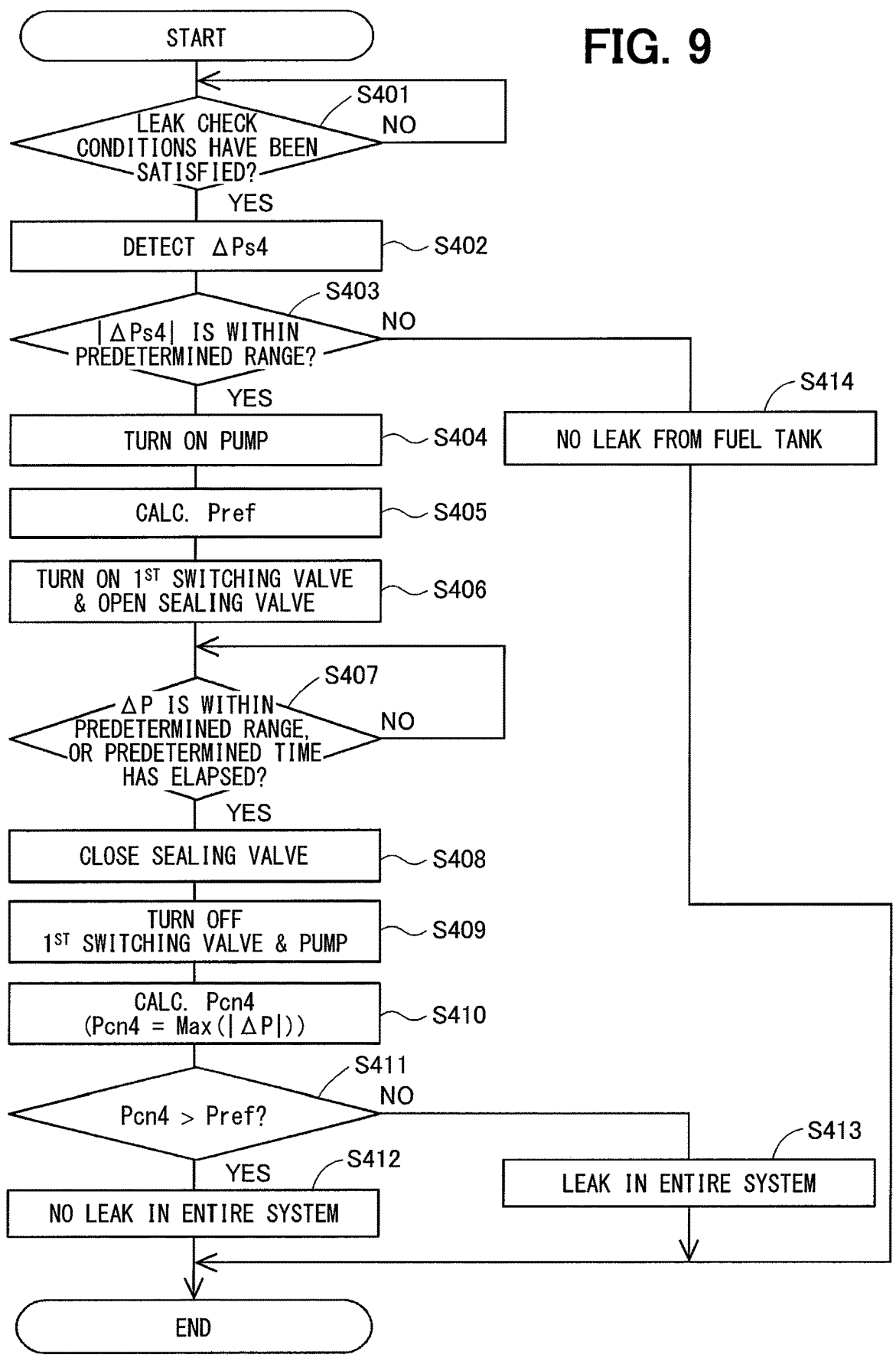
FIG. 9 is a flowchart showing a fuel vapor leak detection method performed by a fuel vapor processing device according to a second embodiment.

A fuel vapor processing device according to a second embodiment of the present disclosure is now described with reference to FIGS. 9 and 10. The second embodiment is different from the first embodiment in that detection of a fuel vapor leak from the entire system including the fuel tank is achievable. Parts substantially identical to the corresponding parts in the first embodiment have been given identical reference numbers, and the same description of these parts is not repeated.

A fuel vapor leak detection method performed by the fuel vapor processing device according to the second embodiment is described with reference to FIGS. 9 and 10. FIG. 9 is a flowchart showing the fuel vapor leak detection method performed by the fuel vapor processing device according to the second embodiment. FIG. 10 is characteristic diagram showing characteristics during fuel vapor leak detection. As shown in FIG. 10, the inside of the fuel tank 84 has a positive pressure according to the second embodiment.

First, in S401, it is determined whether conditions required for a fuel vapor leak check start performed by the fuel vapor processing device of the second embodiment have been satisfied. The ECU 83 determines whether the leak check performed by the fuel vapor processing device of the second embodiment is startable similarly to S101 of the first embodiment. When it is determined that the conditions required for the leak check start have been satisfied based on types of information, the process proceeds to S402. When it is determined that the conditions required for the leak check start have not been satisfied based on types of information, the process repeats the determination in S401.

Subsequently, in S402, a differential pressure ΔPs4 including information about the pressure inside the fuel tank 84 is detected. The ECU 83 records the differential pressure ΔP between a time "0" and a time t41 in FIG. 10 as the differential pressure ΔPs4.

Subsequently, in S403, it is determined whether the absolute value of the differential pressure ΔPs4 falls within a predetermined range. The ECU 83 in S403 determines whether the absolute value of the differential pressure ΔPs4 detected in S402 falls within the predetermined range. The predetermined range in S403 herein is a relatively narrow range including "0".

Figure 10:
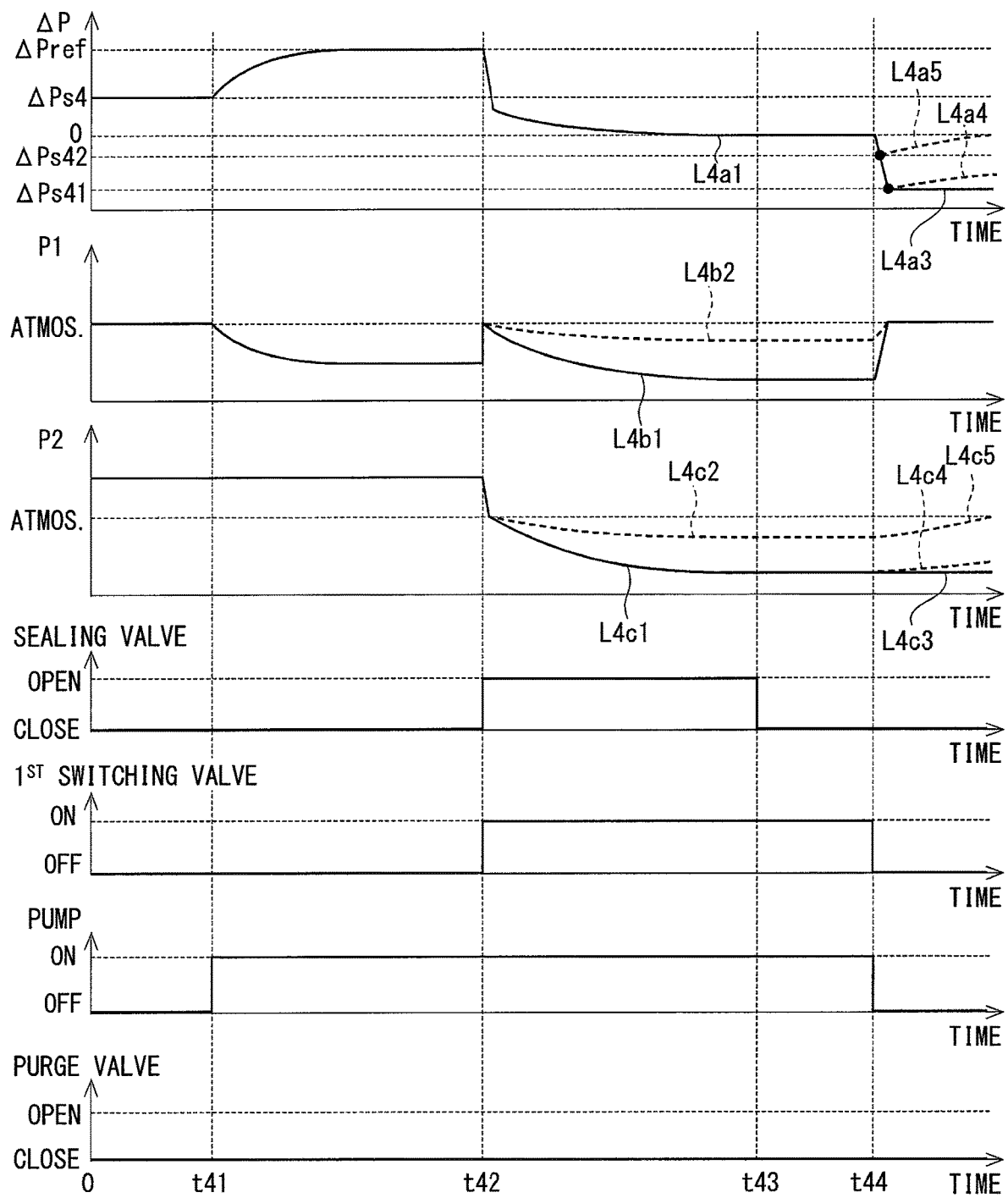
FIG. 10 is a characteristic diagram showing characteristics during fuel vapor leak detection performed by the fuel vapor processing device according to the second embodiment.

During detection of the differential pressure ΔPs4 in S402, the sealing valve 82 is closed, while driving of the pump 27 is stopped (between time "0" and time t41 in FIG. 10) as shown in FIG. 10. Accordingly, when it is determined that the absolute value of the differential pressure ΔPs4 falls within the predetermined range including 0, it is estimated that the pressure P2 of the first purge path 111 is substantially equivalent to the pressure P1 of the pressure detection path 231, which is equivalent to the atmospheric pressure. In other words, a leak from the fuel tank 84 communicating with the first purge path 111 may be present. When it is determined that the absolute value of the differential pressure ΔPs4 falls within the predetermined range, the process proceeds to S404.

When it is determined that the absolute value of the differential pressure ΔPs4 lies out of the predetermined range including 0, it is estimated that the pressure P2 of the first purge path 111 is a pressure considerably different from the atmospheric pressure. More specifically, the pressure P2 of the first purge path 111 in the presence of fuel vapor generated in the fuel tank 84 is considered to be higher or lower than the atmospheric pressure. Accordingly, absence of a leak from the fuel tank 84 is assumed. When it is determined that the absolute value of the differential pressure ΔPs4 lies out of the predetermined range, the process proceeds to S414.

When it is determined that the absolute value of the differential pressure ΔPs4 falls within the predetermined range in S403, driving of the pump 27 is initiated in S404 (time t41 in FIG. 10).

Subsequently, in S405, the reference pressure Pref is calculated. When the differential pressure ΔP becomes constant after the start of driving of the pump 27 in S404, the ECU 83 in S405 records the differential pressure ΔP that has become constant as a differential pressure ΔPref. The ECU 83 calculates the reference pressure Pref by subtracting the differential pressure ΔPs4 recorded in S402 from the differential pressure ΔPref.

Subsequently, in S406, power is supplied to the first switching valve 25, while the sealing valve 82 is opened (time t42 in FIG. 10). As a result, the inside of the fuel tank 84 is communicatively connected to the pressure detection path 231 via the first purge path 111, the inside of the canister 81, the canister connection path 191, and the first switching valve 25.

A change of the differential pressure ΔP with time in this state is shown between the time t42 and a time t43 in FIG. 10. The differential pressure ΔP changes in the period between the time t42 and the time t43 by a pressure loss caused by piping in correspondence with a flow rate immediately after a start of depressurization. However, the differential pressure ΔP becomes constant with development of depressurization and decrease in the flow rate.

Subsequently, in S407, it is determined whether the differential pressure ΔP falls within a predetermined range, or whether a predetermined time has elapsed. The ECU 83 in S407 determines whether the value of the differential pressure ΔP changeable in accordance with a drop of the pressure inside the fuel tank 84 falls within a predetermined range, or whether a predetermined time, which corresponds to a time required for relative stabilization of the differential pressure ΔP after the time t42, has elapsed. When it is determined that the differential pressure ΔP falls within the predetermined range, or that the predetermined time has elapsed, the process proceeds to S408. When it is determined that the differential pressure ΔP does not fall within the predetermined range, and that the predetermined time has not elapsed yet, the determination in S407 is repeated.

When it is determined in S407 that the differential pressure ΔP falls within the predetermined range, or that the predetermined time has elapsed, the sealing valve 82 is closed in S408. The ECU 83 outputs a valve closing command to the sealing valve 82 (time t43 in FIG. 10) in S408. As a result, isolation between the fuel tank 84 and the canister 81 is achieved.

Subsequently, in S409, power supply to the first switching valve 25, and power supply to the pump 27 are both stopped (time t44 in FIG. 10). In this case, it is estimated that the pressure P1 of the pressure detection path 231 becomes equivalent to the atmospheric pressure (period after time t44 in FIG. 10).

Subsequently, in S410, a calculated value Pcn4 indicating a "difference maximum value" is calculated. Details of calculation performed by the ECU 83 based on a signal output from the differential pressure sensor 33 are herein described with reference to FIG. 10.

When a leak from the entire system is absent, it is estimated that the pressure P1 shown in FIG. 10 drops from the pressure at the time t42, and becomes constant in the period between the time t43 and the time t44 as indicated by a solid line L4b1. When power supply to the first switching valve 25 and the pump 27 is subsequently stopped at the time t44, it is estimated that the pressure P1 becomes the atmospheric pressure as indicated after the time t44. When a leak from the entire system is present, it is estimated, as indicated by a dotted line L4b2, that the pressure P1 in the period between the time t42 and the time t44 is higher than the pressure indicated by the solid line L4b1.

Between the time t42 and the time t44, it is estimated that the pressure P2 shown in FIG. 10 becomes a pressure indicated by a solid line L4c1 in a state of absence of a leak from the entire system. However, in a state of presence of a leak from the entire system, the pressure P2 becomes a pressure indicated by a dotted line L4c2. Accordingly, the pressure P2 changes with time in a manner similar to the change of the pressure P1. Accordingly, the differential pressure ΔP changes with time as indicated by a solid line L4a1 between the time t42 and the time t44 regardless of presence or absence of a leak from the entire system.

It is estimated that the pressure P2 changes with time in a manner different from the change of the pressure P1 when power supply to the first switching valve 25 and power supply to the pump 27 is stopped at the time t44.

More specifically, when a leak from the entire system is completely absent after the change with time indicated by the solid line L4c1, a change with time as indicated by a solid line L4c3 is exhibited. When a hole having an inside diameter smaller than the inside diameter of the reference orifice 31 is formed at any position of the entire system, a change with time as indicated by a dotted line L4c4 is exhibited.

When a hole having an inside diameter larger than the inside diameter of the reference orifice 31 is formed in the entire system, a change with time indicated by a dotted line L4c5 is exhibited after the change with time indicated by the dotted line L4c2.

The pressure ΔP changes with time as indicated after the time t44 in FIG. 10 in accordance with the magnitude relationship between the pressure P2 changing with time indicated by the solid line L4c3, and the dotted lines L4c4 and L4c5, and the pressure P1 equivalent to the atmospheric pressure.

More specifically, the differential pressure ΔP temporarily drops at the time t44. When the pressure P2 changes with time as indicated by the solid line L4c3 or the dotted line L4c4, the differential pressure ΔP drops to a differential pressure ΔPs41 lower than "0". When the pressure P2 changes with time as indicated by the dotted line L4c5, the differential pressure ΔP only drops to a differential pressure ΔPs42 lower than 0.

In S410, the ECU 83 calculates the maximum absolute value of the differential pressure ΔP after the time t44, and records the calculated value as a calculated value Pcn4. In the foregoing examples where the pressure P2 changes with time as indicated by the solid line L4c3 and the dotted line L4c4, the calculated value Pcn4 becomes the absolute value of the differential pressure ΔPs41. In the foregoing example where the pressure P2 changes with time as indicated by the dotted line L4c5, the calculated value Pcn4 becomes the absolute value of the differential pressure ΔPs42.

Subsequently, in S411, the magnitude of the calculated value Pcn4 is compared with the magnitude of the reference pressure Pref. More specifically, the ECU 83 determines whether the calculated value Pcn4 is higher than the reference pressure Pref. When it is determined that the calculated value Pcn4 is higher than the reference pressure Pref, the process proceeds to S412. In the foregoing examples of the changes with time as indicated by the solid line L4a3 and the dotted lines L4a4 and L4a5, it is determined that the calculated value Pcn4 during the changes with time as indicated by the solid line L4a3 and the dotted line L4a4 is higher than the reference pressure Pref. When it is determined that the calculated value Pcn4 is higher than the reference pressure Pref, the process proceeds to S413. In the foregoing examples of the changes with time indicated by the solid line L4a3 and the dotted lines L4a4 and L4a5, it is determined that the calculated value Pcn4 during the change with time as indicated by the dotted line L4a5 is lower than or equal to the reference pressure Pref.

When it is determined in S411 that the calculated value Pcn4 is higher than the reference pressure Pref, the ECU 83 in S412 determines absence of a leak from the entire system. When it is determined in S411 that the calculated value Pcn4 is lower than or equal to the reference pressure Pref, the ECU 83 in S413 determines presence of a leak from the entire system.

According to the second embodiment, the fuel vapor processing device calculates a pressure change produced after depressurizing the fuel tank 84 by the pump 27 and sealing the depressurized fuel tank 84 by the sealing valve 82, based on a change of a differential pressure with respect to the pressure P1 of the pressure detection path 231 equivalent to the atmospheric pressure, and determines presence or absence of a leak from the entire system including the fuel tank 84 based on the calculated pressure change. Accordingly, a fuel vapor processing device 2 of the second embodiment can detect a fuel vapor leak from the entire system by using a simplified configuration without a need of a plurality of sensor.

Third Embodiment

A fuel vapor processing device according to a third embodiment of the present disclosure is now described with reference to FIG. 11. The third embodiment is different from the first embodiment in that detection of a fuel vapor leak from the canister and the fuel tank, and abnormality detection of a plurality of valves are achievable by a series of operations. Parts substantially identical to the corresponding parts in the first embodiment have been given identical reference numbers, and the same description of these parts is not repeated.

A fuel vapor leak detection method performed by the fuel vapor processing device according to the third embodiment is described with reference to FIG. 11. FIG. 11 is characteristic diagram showing characteristics during fuel vapor leak detection. The fuel vapor leak detection performed by the fuel vapor processing device according to the third embodiment is time required until the pressure inside the fuel tank 84 is relatively stabilized from a stop of the vehicle, for example. The detection is executed after an elapse of a predetermined time. According to the third embodiment, the differential pressure ΔP is higher than "0" in a period between a time "0" and a time t51 as shown in FIG. 11. Accordingly, the inside of the fuel tank 84 has a positive pressure.

Initially, a differential pressure ΔPs5 between the time "0" and the time t51 is detected to determine whether the differential pressure ΔPs5 lies out of a predetermined range including 0.

When the differential pressure ΔPs5 lies out of the predetermined range, the pressure P2 of the first purge path 111 in the presence of fuel vapor generated inside the fuel tank 84 is higher or lower than the atmospheric pressure. In this case, the fuel tank 84 is considered to be sealed without a leak. Accordingly, the ECU 83 determines absence of a leak from the fuel tank 84.

When the differential pressure ΔPs5 falls within the predetermined range, the pressure P2 of the first purge path 111 is substantially equivalent to the atmospheric pressure. In this case, it is considered that a leak from the fuel tank 84 communicating with the first purge path 111 is present, or that the pressure generated by fuel vapor inside the tank is low due to a small temperature change of the ambient environment or for other reasons. Accordingly, the ECU 83 separately executes the fuel vapor leak detection method according to the second embodiment, for example, to securely determine presence or absence of a fuel vapor leak from the fuel tank 84.

With a start of driving of the pump 27 at the time t51, a drop of the pressure P1 of the pressure detection path 231 is estimated. Accordingly, the differential pressure ΔP increases. The differential pressure ΔP that has become constant at a time t52 is recorded as a differential pressure ΔPref. The ECU 83 calculates a reference pressure Pref1 by subtracting the differential pressure ΔPs5 from the differential pressure ΔPref.

Power is supplied to the first switching valve 25 at the time t52. When the ECU 83 supplies power to the first switching valve 25, the pressure detection path 231 and the canister 81 are communicatively connected via the first switching valve 25.

Figure 11:
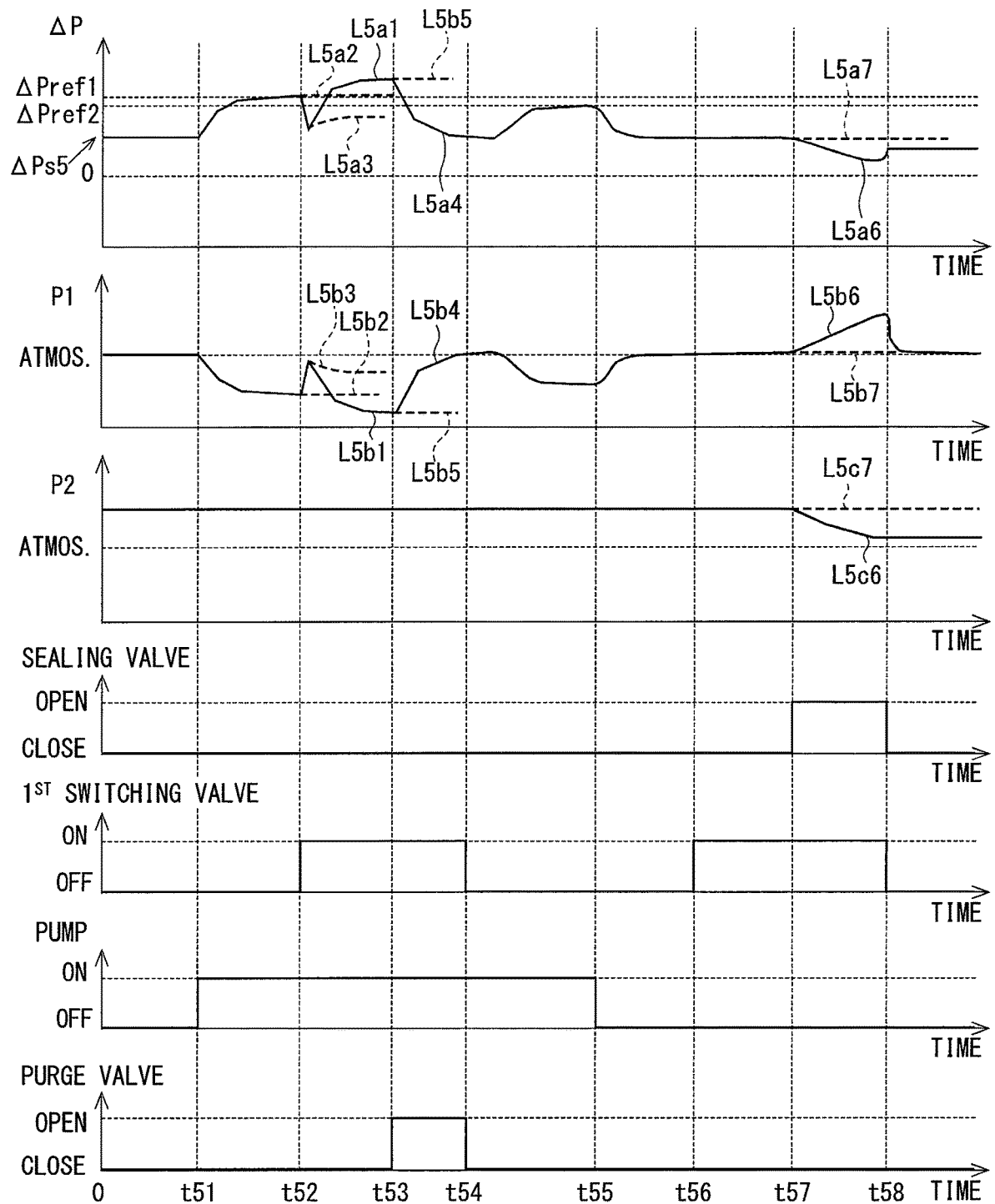
FIG. 11 is a characteristic diagram showing characteristics during determination made by a fuel vapor processing device according to a third embodiment for determining a state of the fuel vapor processing device of the third embodiment.

When no leak hole is present in the canister side system after switching of the first switching valve 25 at the time t52, it is estimated that the pressure P1 changes with time as indicated by a solid line L5b1 between the time t52 and a time t53 in FIG. 11. Accordingly, the differential pressure ΔP changes with time as indicated by a solid line L5a1 between the time t52 and the time t53 in FIG. 11.

When the first switching valve 25 is stuck, it is estimated that the pressure P1 does not change from the state before the time t52 as indicated by a dotted line L5b2 between the time t52 and the time t53 in FIG. 11. Accordingly, the differential pressure ΔP is considered to change with time as indicated by a dotted line L5a2 between the time t52 and the time t53 in FIG. 11. The ECU 83 is therefore capable of detecting sticking abnormality of the first switching valve 25.

When the canister side system has a leak hole, it is estimated that the pressure P1 changes with time as indicated by a dotted line L5b3 between the time t52 and the time t53 in FIG. 11. Accordingly, the differential pressure ΔP changes with time as indicated by a dotted line L5a3 between the time t52 and the time t53 in FIG. 11. The ECU 83 is therefore capable of detecting abnormality of the canister side system.

The purge valve 14 is opened at the time t53. The ECU 83 outputs a valve opening command to the purge valve 14. With opening of the purge valve 14, the atmosphere is introduced into the pressure detection path 231 through the intake pipe 16. It is therefore estimated that the pressure P1 returns to the atmospheric pressure as indicated by a solid line L5b4 between the time t53 and a time t54 in FIG. 11. Accordingly, the differential pressure ΔP changes with time as indicated by a solid line L5a4 between the time t53 and the time t54 in FIG. 11.

When the first purge valve 14 is stuck, it is estimated that the pressure P1 does not change from the state before the time t53 as indicated by a dotted line L5b5 between the time t53 and the time t54 in FIG. 11. The ECU 83 is therefore capable of detecting sticking abnormality of the purge valve 14.

The purge valve 14 is closed, while power supply to the first switching valve 25 is stopped at the time t54. The ECU 83 outputs a valve closing command to the purge valve 14. During driving of the pump 27 in this condition, the pressure of the pressure detection path 231 becomes the atmospheric pressure introduced through the reference orifice 31. Accordingly, the ECU 83 calculates a second reference pressure pref2 based on a signal output from the differential pressure sensor 33.

Power supply to the pump 27 is stopped at a time t55. In this case, it is estimated that the pressure P1 of the pressure detection path 231 becomes the atmospheric pressure.

Power is supplied to the first switching valve 25 at a time t56. When the ECU 83 supplies power to the first switching valve 25, the pressure detection path 231 and the canister 81 are communicatively connected via the first switching valve 25.

The sealing valve 82 is opened at a time t57. The ECU 83 also outputs a valve opening command to the sealing valve 82. As a result, the inside of the canister 81 and the inside of the fuel tank 84 are communicatively connected. With opening of the sealing valve 82, fuel vapor inside the fuel tank 84 flows into the canister 81. In this case, it is estimated that the pressure P2 of the first purge path 111 drops as indicated by a solid line L5c6 after the time t57 in FIG. 11. It is further estimated that the pressure P1 of the pressure detection path 231 increases with a flow of gas from the fuel tank 84 as indicated by a solid line L5b6 after the time t57 in FIG. 11. Accordingly, the differential pressure ΔP considerably changes as indicated by a solid line L5a6 after the time t57 in FIG. 11.

When the sealing valve 82 is stuck, it is estimated that the pressure P2 does not change from the state before the time t57 as indicated by a dotted line L5c7 between the time t57 and a time t58 in FIG. 11. In this case, it is estimated that the pressure P1 does not change from the state before the time t57 as indicated by a dotted line L5b7 between the time t57 and the time t58 in FIG. 11. Accordingly, the differential pressure ΔP does not change from the state before the time t57 as indicated by a dotted line L5a7 between the time t57 and the time t58 in FIG. 11. Sticking abnormality of the sealing valve 82 is detectable in this manner.

The fuel vapor processing device according to the third embodiment easily determines presence or absence of a leak from the fuel tank side system based on the magnitude of the differential pressure ΔPs5 between the time "0" and the time t51, and determines a leak from the canister side system based on the differential pressure ΔP between the time t52 and the time t53.

In addition, the fuel vapor processing device determines the state of the first switching valve 25 based on the differential pressure ΔP between the time t52 and the time t53, determines the state of the purge valve 14 based on the differential pressure ΔP between the time t53 and the time t54, and determines the state of the sealing valve 82 based on the differential pressure ΔP between the time t57 and the time t58.

Accordingly, the fuel vapor processing device of the third embodiment performing the foregoing series of operations can determine presence or absence of a fuel vapor leak while determining the states of the plurality of valves included in the fuel vapor processing device.

Fourth Embodiment

A fuel vapor processing device according to a fourth embodiment of the present disclosure is now described with reference to FIGS. 12 to 18. The fourth embodiment is different from the first embodiment in that the differential pressure pipe includes a second switching valve. Parts substantially identical to the corresponding parts in the first embodiment have been given identical reference numbers, and the same description of these parts is not repeated.

Figure 12:
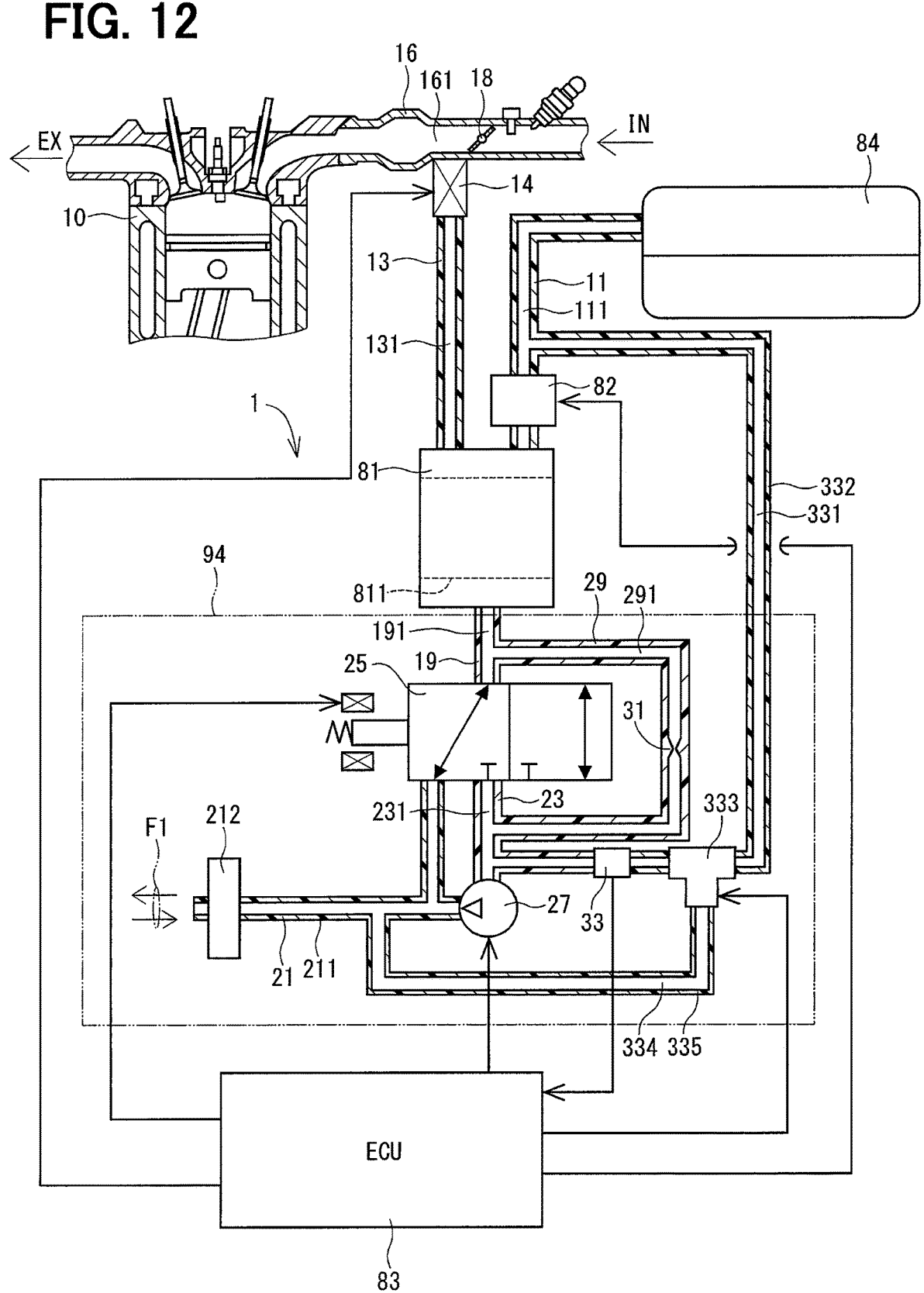
FIG. 12 is a conceptual diagram of a fuel vapor processing device according to a fourth embodiment.

FIG. 12 is a conceptual diagram of a fuel vapor processing device 4 according to the fourth embodiment. The fuel vapor processing device 4 includes the canister 81, a fuel vapor leak detection unit 94, the sealing valve 82, the ECU 83, and other components. The fuel vapor processing device 4 purges fuel vapor, which has been generated inside the fuel tank 84 and recovered by the canister 81, into the intake path 161.

The fuel vapor leak detection unit 94 includes the atmosphere pipe 21, the pressure pipe 23, the first switching valve 25, the pump 27, the bypass pipe 29, the reference orifice 31, the differential pressure sensor 33, and a second switching valve 333.

The second switching valve 333 is disposed in a differential pressure pipe 332. The second switching valve 333 is a constituted by a conventional three-way valve, and also connected to the atmosphere pipe 21 via a communication pipe 335 including a communication path 334. The second switching valve 333 is electrically connected to the ECU 83. The second switching valve 333 switches between communication between the inside of the differential pressure sensor 33 and the first purge path 111, and communication between the inside of the differential pressure sensor 33 and the atmosphere path 211, in accordance with a command from the ECU 83.

Figure 13:
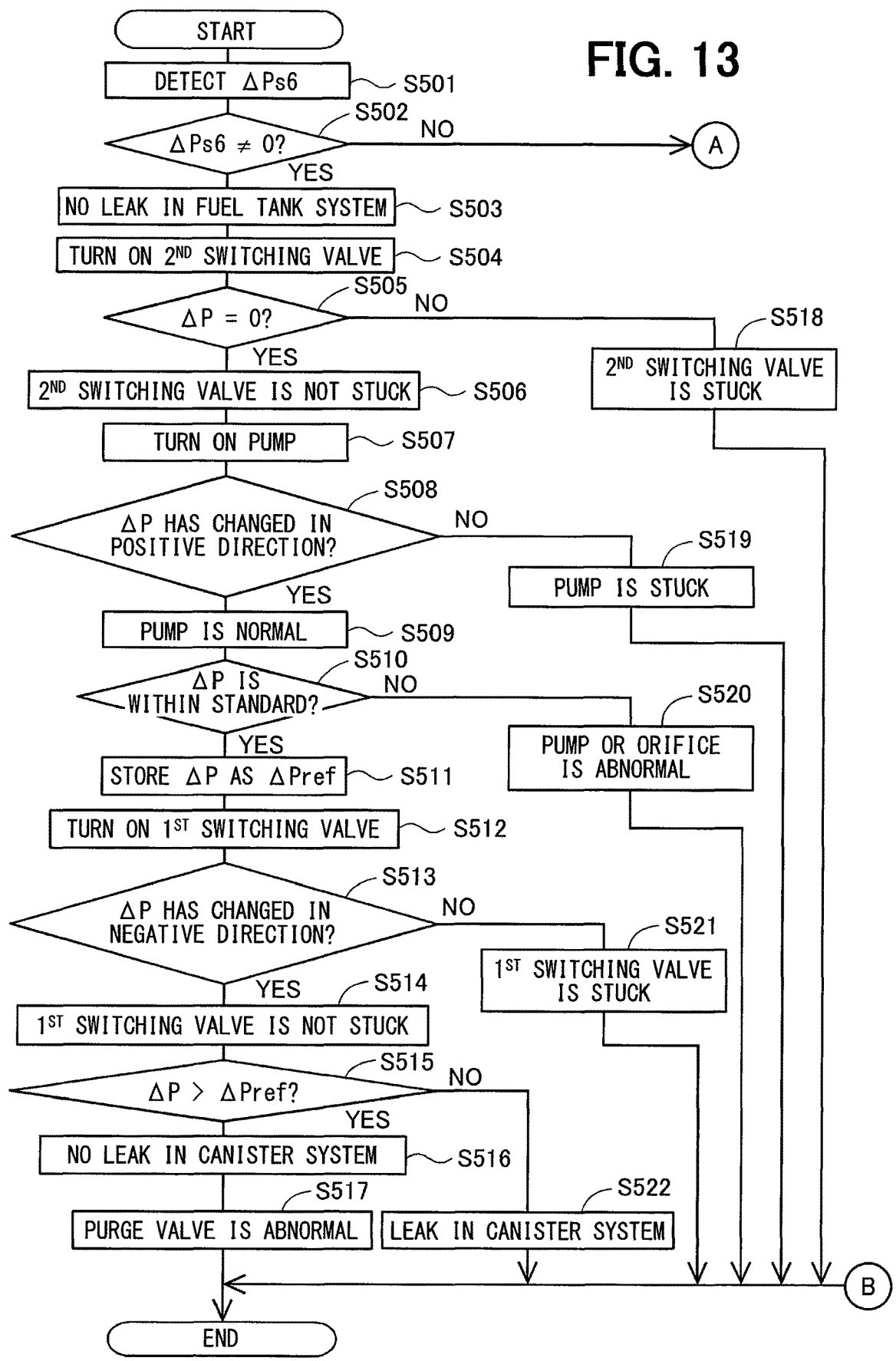
FIG. 13 is a part of a flowchart showing a fuel vapor leak detection method, and an abnormality detection method for detecting abnormality of units of the fuel vapor processing device, both the methods performed by the fuel vapor processing device according to the fourth embodiment.
Figure 14:
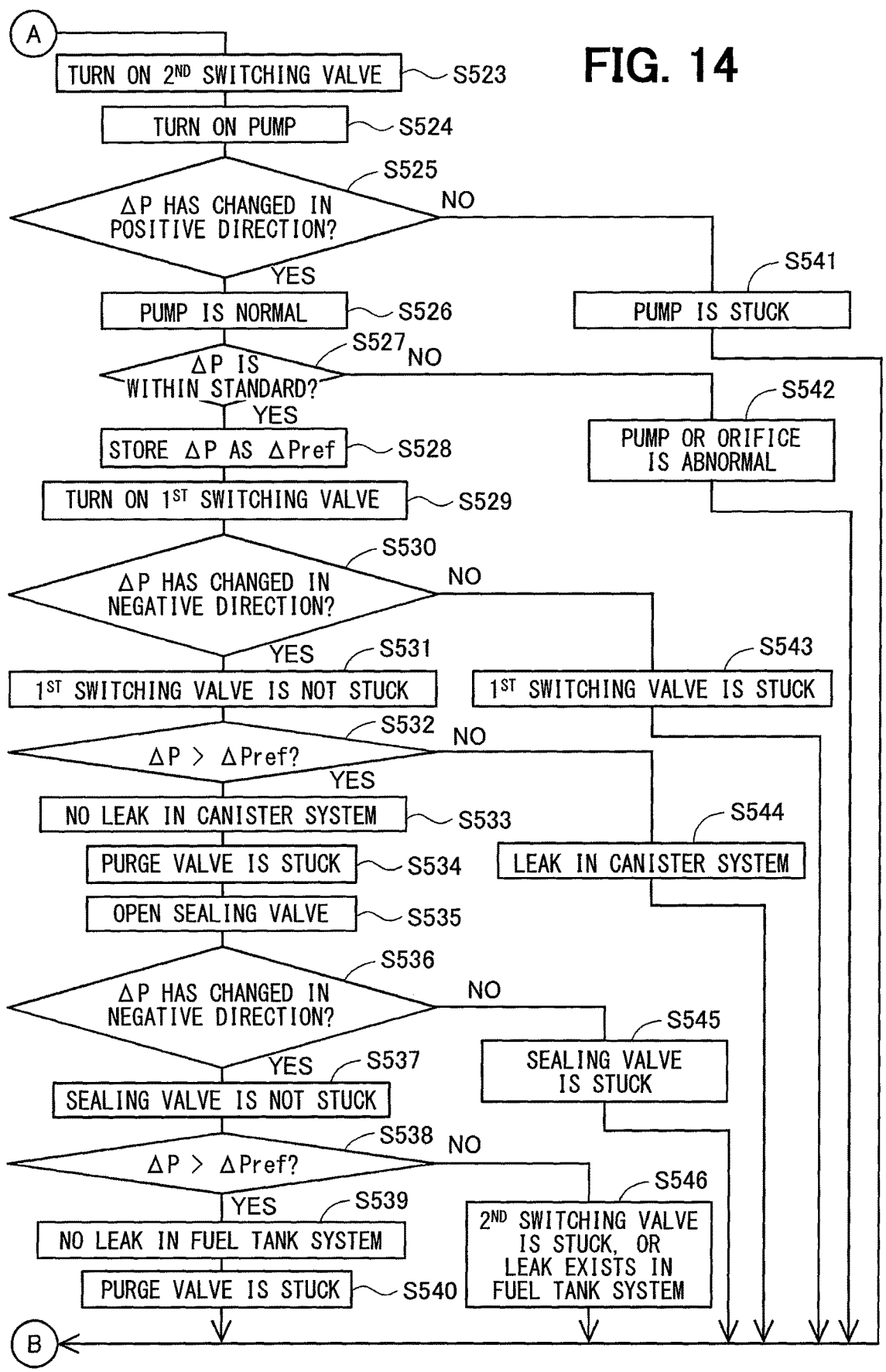
FIG. 14 is a part of the flowchart showing the fuel vapor leak detection method, and the abnormality detection method for detecting abnormality of units of the fuel vapor processing device, both the methods performed by the fuel vapor processing device according to the fourth embodiment.
Figure 15:
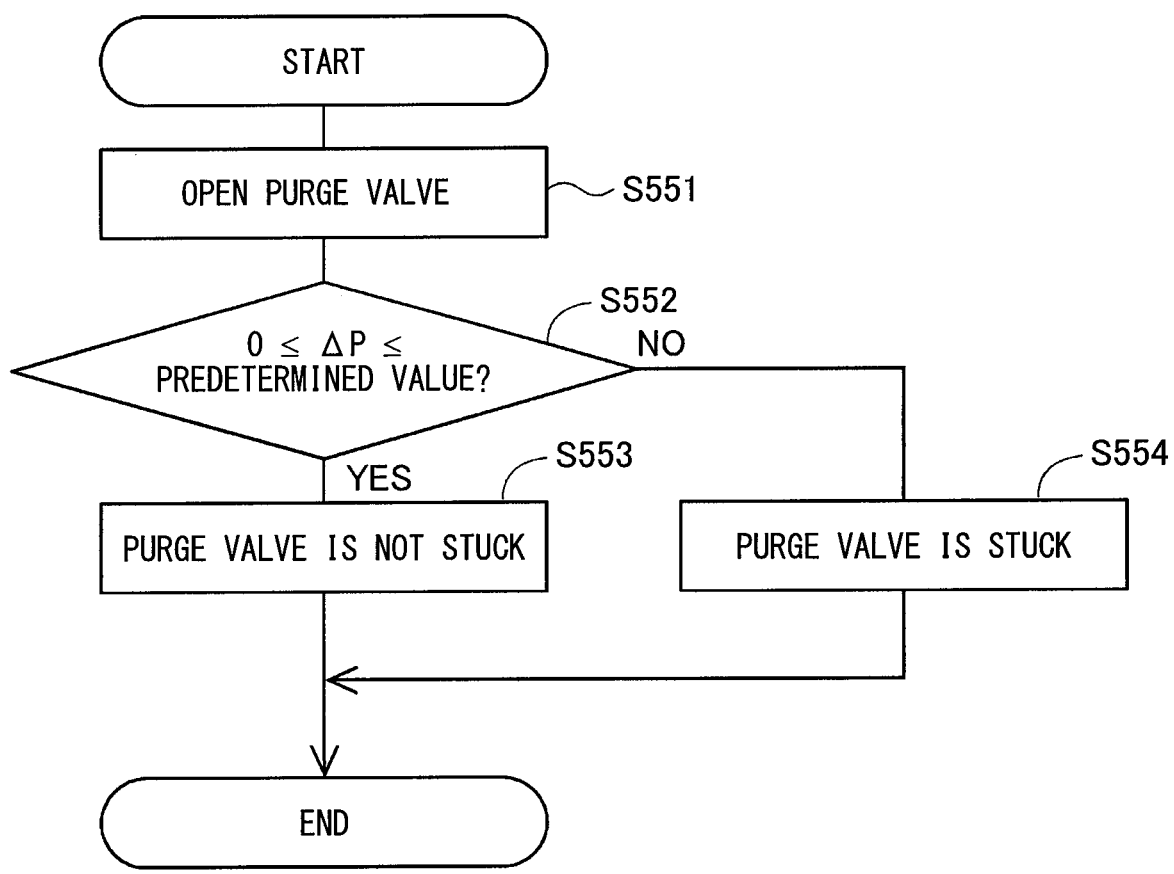
FIG. 15 is a flowchart showing an abnormality detection method performed by the fuel vapor processing device according to the fourth embodiment for detecting abnormality of a purge valve.
Figure 16:
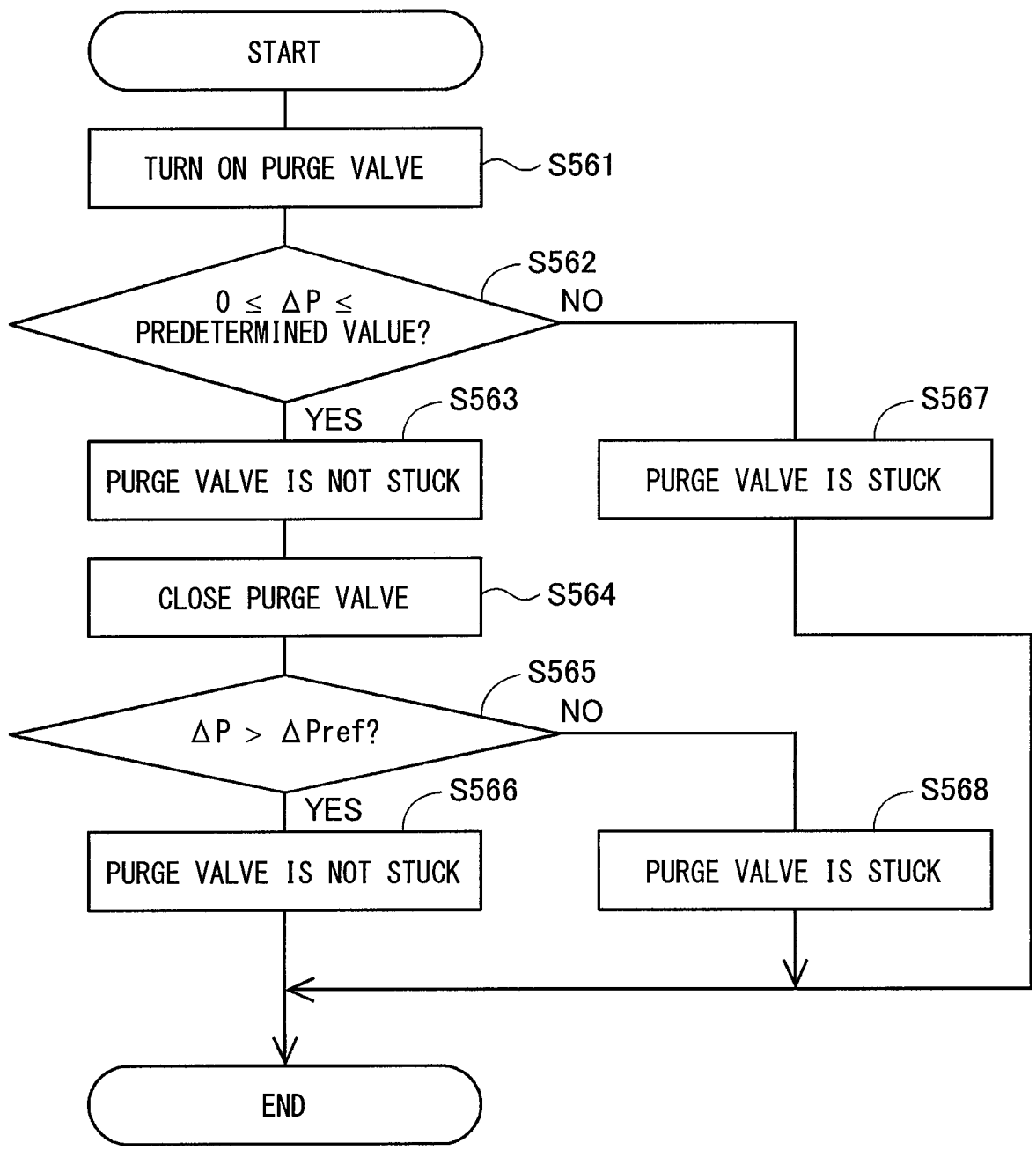
FIG. 16 is a flowchart showing an abnormality detection method performed by the fuel vapor processing device according to the fourth embodiment for detecting abnormality of the purge valve, as a method different from the abnormality detection method shown in FIG. 15.
Figure 17:
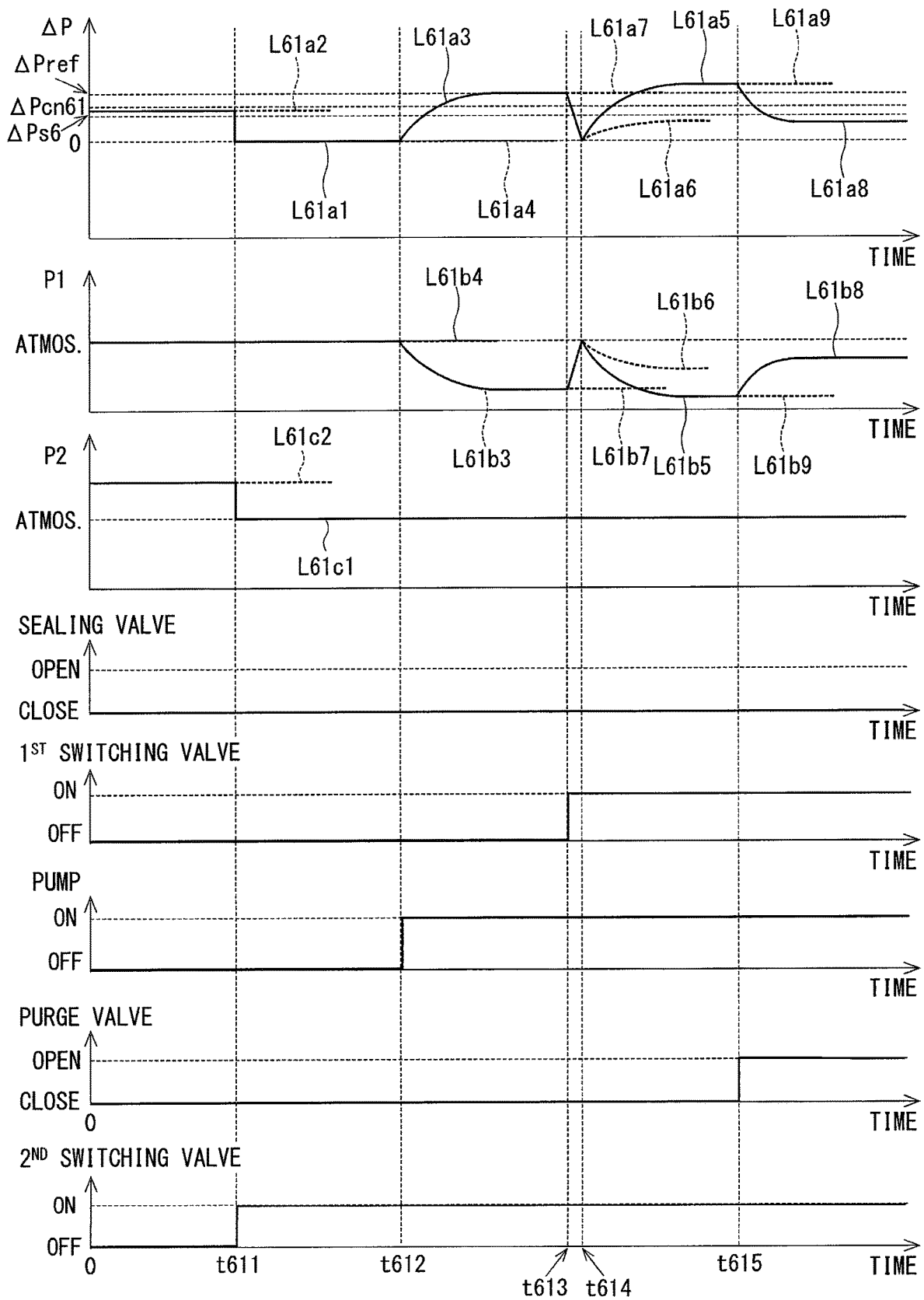
FIG. 17 is a characteristic diagram showing characteristics during fuel vapor leak detection, and abnormality detection for detecting abnormality of units of the fuel vapor processing device, both the detections performed by the fuel vapor processing device according to the fourth embodiment.
Figure 18:
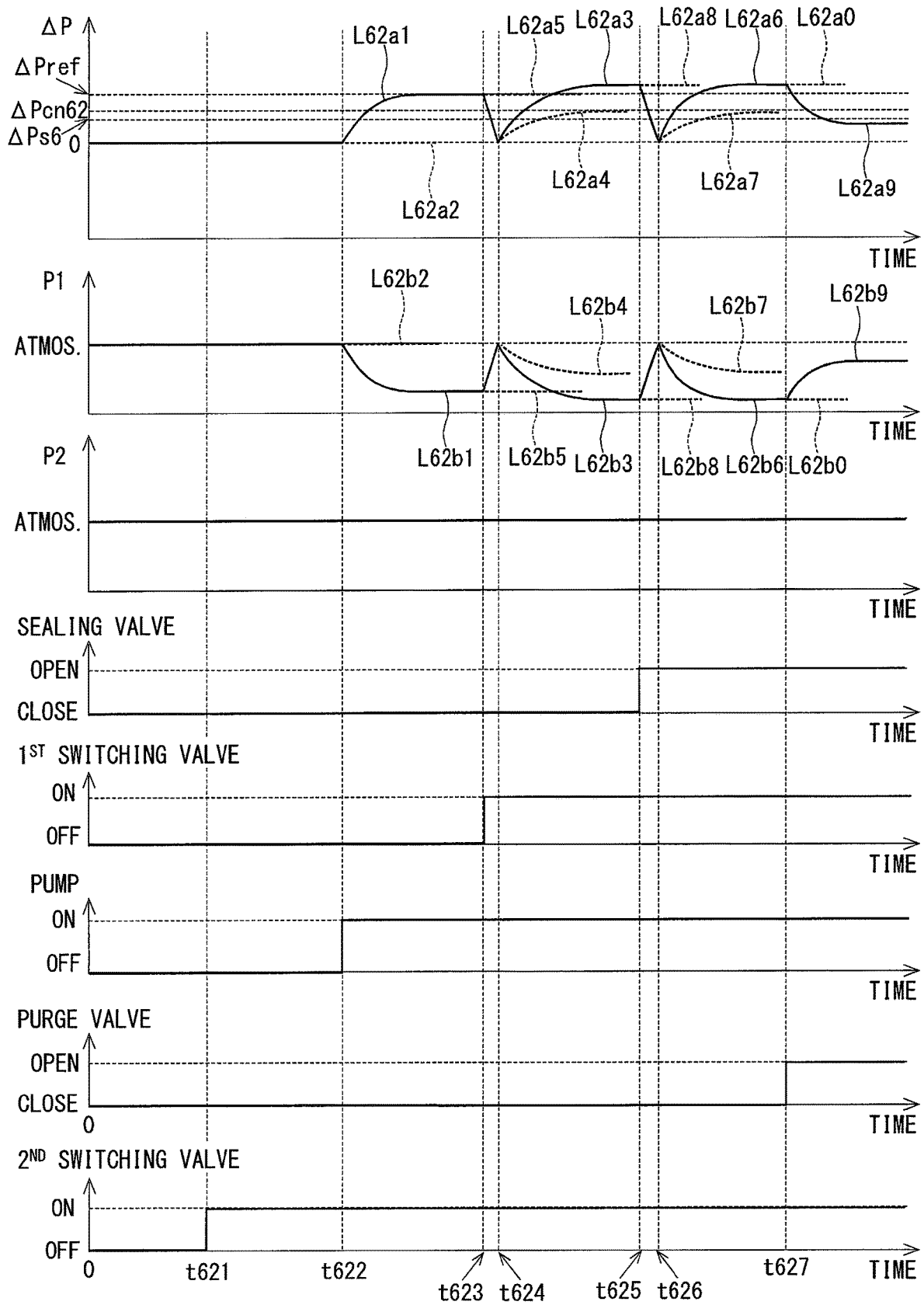
FIG. 18 is a characteristic diagram during fuel vapor leak detection, and abnormality detection for detecting abnormality of units of the fuel vapor processing device, both the detections performed by the fuel vapor processing device according to the fourth embodiment, in a state different from the state shown in FIG. 17.

A fuel vapor leak detection method, and an abnormality detection method for detecting abnormality of units of the fuel vapor processing device 4, both the methods performed by the fuel vapor processing device 4, are now described with reference to FIGS. 13 to 18. FIGS. 13 and 14 are flowcharts each showing the leak detection method for detecting a leak from the fuel tank side system and a leak from the canister side system, and the abnormality detection method for detecting abnormality of constituent parts of the fuel vapor processing device 4, both the methods performed by performed by the fuel vapor processing device 4. FIGS. 15 and 16 are flowcharts each showing the abnormality detection method for detecting abnormality of the purge valve 14 of the fuel vapor processing device 4. FIGS. 17 and 18 are characteristic diagrams each showing characteristics during leak detection for detecting a leak from the fuel tank side system and a leak from the canister side system, and abnormality detection of constituent parts of the fuel vapor processing device 4, both the detections performed by the fuel vapor processing device 4. In FIGS. 17 and 18, an "on-state" is achieved when the inside of the differential pressure sensor 33 is communicatively connected to the communication path 334 via the second switching valve 333 with supply of power to the second switching valve 333.

In initial S501, a differential pressure ΔPs6 is detected. The ECU 83 in S501 records the differential pressure ΔP between a time "0" and times t611 and t621 in FIGS. 17 and 18 as the differential pressure ΔPs6. In this case, the second switching valve 333 is in an off-state, and therefore the inside of the differential pressure sensor 33 communicates with the first purge path 111. Accordingly, the differential pressure sensor 33 calculates the differential pressure ΔPs6 by subtracting the pressure P1 of the pressure detection path 231 equivalent to the atmospheric pressure from the pressure P2 corresponding to the pressure inside the fuel tank 84, and outputs the differential pressure ΔPs6. The differential pressure ΔPs6 is a gauge pressure inside the fuel tank 84.

Subsequently, in S502, it is determined whether the differential pressure ΔPs6 is not "0". The ECU 83 in S502 determines whether the differential pressure ΔPs6 detected in S501 is not "0". When the ECU 83 determines that the differential pressure ΔPs6 is not 0, i.e., the pressure inside the fuel tank 84 is not the atmospheric pressure, the process proceeds to S503. When the ECU 83 determines that the differential pressure ΔPs6 is 0, i.e., the pressure inside the fuel tank 84 is equivalent to the atmospheric pressure, the process proceeds to S523.

When it is determined in S502 that the differential pressure ΔPs6 is not 0, the ECU 83 in S503 determines absence of a leak from the fuel tank side system.

Subsequently, in S504, power is supplied to the second switching valve 333. The ECU 83 in S504 supplies power to the second switching valve 333. As a result, the inside of the differential pressure sensor 33 is communicatively connected to the communication path 334 via the second switching valve 333 (time t611 in FIG. 17). In the state of communication between the communication path 334 and the atmosphere via the atmosphere path 211, a differential pressure detected by the differential pressure sensor 33 indicates a magnitude of a pressure relative to the atmospheric pressure.

Subsequently, in S505, it is determined whether the differential pressure ΔP has become "0". The ECU 83 in S505 determines whether the differential pressure ΔP has become "0" based on a signal output from the differential pressure sensor 33. When the second switching valve 333 normally operates, the pressure P2 becomes the atmospheric pressure as indicated by a solid line L61c1 in FIG. 17. Accordingly, the differential pressure ΔP becomes "0" as indicated by a solid line L61a1 in FIG. 17. When it is determined that the differential pressure ΔP has become "0" as indicated by the solid line L61a1 in FIG. 17, the process proceeds to S506. When the second switching valve 333 does not normally operate by sticking or for other reasons, the pressure P2 does not become the atmospheric pressure as indicated by a dotted line L61c2 in FIG. 17. Accordingly, the differential pressure ΔP does not become "0" as indicated by a dotted line L61a2 in FIG. 17. When it is determined that the differential pressure ΔP is not "0" as indicated by the dotted line L61a2 in FIG. 17, the process proceeds to S518.

When it is determined in S505 that the differential pressure ΔP has become "0", the ECU 83 in S506 determines that the second switching valve 333 is not stuck.

When it is determined in S505 that the differential pressure ΔP is not "0", the ECU 83 in S518 determines that the second switching valve 333 is stuck in the off-state, i.e., in the state of communication between the inside of the differential pressure sensor 33 and the atmosphere. Thereafter, the fuel vapor leak detection currently performed is ended.

After determination that the second switching valve 333 is not stuck in S506, driving of the pump 27 is started in S507. The ECU 83 in S507 starts driving of the pump 27 (time t612 in FIG. 17). As a result, the atmosphere is introduced through the atmosphere path 211, the first switching valve 25, the bypass path 291, and the pressure detection path 231.

Subsequently, in S508, the ECU 83 determines whether the differential pressure ΔP has changed in a positive direction by an amount larger than or equal to a predetermined value within a predetermined time from the start of driving of the pump 27. The "positive direction" herein is a direction in which a value of the differential pressure ΔP increases with an elapse of time. For example, the predetermined time in S508 is a time required for relative stabilization of the differential pressure ΔP within a period between a time t612 and a time t613 in FIG. 17. The predetermined value in S508 is a value sufficient for recognizing a change of the differential pressure ΔP. The predetermined value herein is a differential pressure ΔPcn61. When the pump 27 normally operates, the pressure P1 of the pressure detection path 231 becomes a pressure lower than the atmospheric pressure as indicated by a solid line L61b3 in FIG. 17. Accordingly, the differential pressure ΔP changes in the positive direction as indicated by a solid line L61a3 in FIG. 17. When it is determined that the differential pressure ΔP has changed in the positive direction by an amount larger than or equal to the predetermined value of the differential pressure ΔPcn61 within the predetermined time as indicated by the solid line L61a3 in FIG. 17, the process proceeds to S509. When the pump 27 does not normally operate by sticking or for other reasons, the pressure P1 of the pressure detection path 231 remains at the atmospheric pressure as indicated by a dotted line L61b4 in FIG. 17. Accordingly, the differential pressure ΔP does not considerably change from the value before the time t612 as indicated by a dotted line L61a4 in FIG. 17. When it is determined that a change of the differential pressure ΔP in the positive direction by an amount larger than or equal to the predetermined value of the differential pressure ΔPcn61 has not been made within the predetermined time as indicated by the dotted line L61a4 in FIG. 17, the process proceeds to S519.

When it is determined in S508 that the differential pressure ΔP has changed in the positive direction by an amount larger than or equal to the predetermined value of the differential pressure ΔPcn61 within the predetermined time, the ECU 83 in S509 determines that the pump 27 is normally operating.

When it is determined in S508 that a change of the differential pressure ΔP in the positive direction by an amount larger than or equal to the predetermined value of the differential pressure ΔPcn61 has not been made within the predetermined time, the ECU 83 in S519 determines that the pump 27 is stuck in the off-state. Thereafter, the fuel vapor leak detection currently performed is ended.

After the pump 27 is determined to be normally operating in S509, it is further determined in S510 whether the differential pressure ΔP falls within a predetermined standard. For example, the state within the predetermined standard in S509 herein refers to a state within a standard specified based on a relationship between the pump 27, the reference orifice 31, and piping connecting the pump 27 and the reference orifice 31. The ECU 83 in S510 determines whether the differential pressure ΔP in S508 falls within the predetermined standard. When the differential pressure ΔP falls within the predetermined standard, the process proceeds to S511. When the differential pressure ΔP does not fall within the predetermined standard, the process proceeds to S520.

When it is determined in S510 that the differential pressure ΔP falls within the predetermined standard, the ECU 83 in S511 records the differential pressure ΔP in S508 as a differential pressure ΔPref indicating a "reference differential pressure".

When it is determined in S510 that the differential pressure ΔP does not fall within the predetermined standard, the ECU 83 in S520 determines that the pump 27 or the reference orifice 31 is abnormal. Thereafter, the fuel vapor leak detection currently performed is ended.

After the differential pressure ΔP in S508 is recorded as the differential pressure ΔPref in S511, power is supplied to the first switching valve 25 in S512. The ECU 83 in S512 supplies power to the first switching valve 25 (time t613 in FIG. 17).

Subsequently, in S513, the ECU 83 determines whether the differential pressure ΔP has changed in a negative direction by an amount larger than or equal to a predetermined value within a predetermined time from the start of power supply to the first switching valve 25. The predetermined time in S513 herein is a relatively short period of time between the time t613 at the start of power supply to the first switching valve 25 and a time t614 in FIG. 17, for example. The predetermined value in S513 is a difference between the differential pressure ΔP at the time t613 and a pressure around the atmospheric pressure as shown in FIG. 17, for example. However, the differential pressure ΔP at the time t614 is not necessarily equivalent to the atmospheric pressure as shown in FIG. 17. When the first switching valve 25 normally operates, the pressure P1 changes in the positive direction by an amount larger than or equal to the predetermined value within the predetermined time as indicated by a solid line L61b5 in FIG. 17. Accordingly, the differential pressure ΔP changes in the negative direction by an amount larger than or equal to the predetermined value within the predetermined time as indicated by a solid line L61a5 in FIG. 17. When it is determined that the differential pressure ΔP has changed in the negative direction by an amount larger than or equal to the predetermined value within the predetermined time as indicated by the solid line L61a5 in FIG. 17, the process proceeds to S514.

When the first switching valve 25 does not normally operate, the pressure P1 does not considerably change from the value before the time t613 as indicated by a dotted line L61b7 in FIG. 17. Accordingly, the differential pressure ΔP does not change in the negative direction by an amount larger than or equal to the predetermined value as indicated by a dotted line L61a7 in FIG. 17. When it is determined that a change of the differential pressure ΔP in the negative direction by an amount larger than or equal to the predetermined value has not been made within the predetermined time as indicated by the dotted line L61a7 in FIG. 17, the process proceeds to S521.

When it is determined in S513 that the differential pressure ΔP has changed in the negative direction by an amount larger than or equal to the predetermined value within the predetermined time, the ECU 83 determines in S514 that the first switching valve 25 is not stuck.

When it is determined in S513 that a change of the differential pressure ΔP in the negative direction by an amount larger than or equal to the predetermined value has not been made within the predetermined time, the ECU 83 in S521 determines that the first switching valve 25 is stuck in the off-state, i.e., in a state of no communication between the canister connection path 191 and the pressure detection path 231 via the first switching valve 25. Thereafter, the fuel vapor leak detection currently performed is ended.

When it is determined that the first switching valve 25 is not stuck in S514, it is further determined in S515 whether the differential pressure ΔP is higher than the differential pressure ΔPref. The ECU 83 compares the magnitude of the differential pressure ΔP in S508 with the magnitude of the differential pressure ΔPref in S515. The differential pressure ΔP changes as indicated by the solid line L61a5 in FIG. 17 as the pressure P1 changes as indicated by the solid line L61b5 in FIG. 17. At the time of the change as indicated by the solid line L61a5, the differential pressure ΔP is determined to be higher than the differential pressure ΔPref. In this case, the process proceeds to S516. The differential pressure ΔP changes as indicated by a dotted line L61a6 in FIG. 17 as the pressure P1 changes as indicated by a dotted line L61b6 in FIG. 17. At the time of the change as indicated by the dotted line L61a6, the differential pressure ΔP is determined to be lower than or equal to the differential pressure ΔPref. In this case, the process proceeds to S522.

When it is determined in S515 that the differential pressure ΔP in S508 is higher than the differential pressure ΔPref, the ECU 83 in S516 determines absence of a leak from the canister side system.

When it is determined in S515 that the differential pressure ΔP in S508 is lower than or equal to the differential pressure ΔPref, the ECU 83 in S522 determines presence of a leak from the canister side system. Thereafter, the fuel vapor leak detection currently performed is ended.

When absence of a leak from the canister side system is determined in S516, abnormality diagnosis of the purge valve 14 is performed in S517. The abnormality diagnosis of the purge valve 14 in S517 is performed in the manner shown in the flowchart in FIG. 15.

The purge valve 14 is opened in S551 shown in FIG. 15. The ECU 83 in S551 outputs a valve opening command to the purge valve 14 (time t615 in FIG. 17). In response to this command, the pump 27 in the state of driving introduces the atmosphere into the pressure detection path 231 via the intake pipe 16.

Subsequently, in S552, it is determined whether the differential pressure ΔP becomes a pressure in a range from "0" to a predetermined value (inclusive) within a predetermined time. The ECU 83 in S552 determines the magnitude of the differential pressure ΔP based on a signal output from the differential pressure sensor 33. For example, the predetermined time in S552 herein is a time required for relative stabilization of the differential pressure ΔP after the time t615 in FIG. 17. For example, the predetermined value in S552 is the differential pressure ΔPref in FIG. 17. When the purge valve 14 normally operates, the pressure P1 of the pressure detection path 231 becomes a pressure higher than the value before the time t615 as indicated by a solid line L61*b*8 in FIG. 17. Accordingly, the differential pressure ΔP changes in the negative direction as indicated by a solid line L61*a*8 in FIG. 17, and becomes a value higher than "0". When it is determined that the differential pressure ΔP has a value in the range from "0" to the predetermined value (inclusive) within the predetermined time, the process proceeds to S553. When the purge valve 14 does not normally operate by sticking or for other reasons, the pressure P1 of the pressure detection path 231 does not considerably change from the value before the time t615 as indicated by a dotted line L61*b*9 in FIG. 17. Accordingly, the differential pressure ΔP does not considerably change from the value before the time t615 as indicated by a dotted line L61*a*9 in FIG. 17. When it is determined that the differential pressure ΔP has a value lower than "0" or higher than the predetermined value within the predetermined time, the process proceeds to S554.

When it is determined in S552 that the differential pressure ΔP has a value in the range from "0" to the predetermined value (inclusive) within the predetermined time, the ECU 83 in S553 determines that the purge valve 14 is not stuck.

When it is determined in S552 that the differential pressure ΔP has a value lower than "0" or higher than the predetermined value within the predetermined time, the ECU 83 in S554 determines that the purge valve 14 is stuck in the closed state.

When the state of the purge valve 14 is determined in S553 and S554, the abnormality diagnosis of the purge valve 14 currently performed is ended.

When it is determined that the differential pressure ΔPs6 is "0" in S502, power is supplied to the second switching valve 333 in S523 shown in FIG. 14. The ECU 83 in S523 supplies power to the second switching valve 333. As a result, the inside of the differential pressure sensor 33 is communicatively connected to the communication path 334 via the second switching valve 333 (time t621 in FIG. 18).

Subsequently, in S524, driving of the pump 27 is started. The ECU 83 in S524 starts driving of the pump 27 (time t622 in FIG. 18).

Subsequently, in S525, the ECU 83 determines whether the differential pressure ΔP has changed in the positive direction by an amount larger than or equal to a predetermined value within a predetermined time from the start of driving of the pump 27. For example, the predetermined time in S525 is a time required for relative stabilization of the differential pressure ΔP. The predetermined value in S525 is a value sufficient for recognizing a change of the differential pressure ΔP. The predetermined value herein is a differential pressure ΔPcn62 in FIG. 18. When the pump 27 normally operates, the pressure P1 of the pressure detection path 231 becomes a pressure lower than the atmospheric pressure as indicated by a solid line L62*b*1 in FIG. 18. Accordingly, the differential pressure ΔP changes in the positive direction as indicated by a solid line L62*a*1 in FIG. 18. When it is determined that the differential pressure ΔP has changed in the positive direction by an amount larger than or equal to the predetermined value of the differential pressure ΔPcn62 within the predetermined time as indicated by the solid line L62*a*1 in FIG. 18, the process proceeds to S526. When the pump 27 does not normally operate by sticking or for other reasons, the pressure P1 of the pressure detection path 231 remains at the atmospheric pressure as indicated by a dotted line L62*b*2 in FIG. 18. Accordingly, the differential pressure ΔP does not considerably change from the value before the time t622 as indicated by a dotted line L62*a*2 in FIG. 18. When it is determined that a change of the differential pressure ΔP in the positive direction by an amount larger than or equal to the predetermined value of the differential pressure ΔPcn62 has not been made within the predetermined time as indicated by the dotted line L62*a*2 in FIG. 18, the process proceeds to S541.

When it is determined in S525 that the differential pressure ΔP has changed in the positive direction by an amount larger than or equal to the predetermined value of the differential pressure ΔPcn62 within the predetermined time, the ECU 83 in S526 determines that the pump 27 is normally operating.

When it is determined in S525 that a change of the differential pressure ΔP in the positive direction by an amount larger than or equal to the predetermined value of the differential pressure ΔPcn62 has not been made within the predetermined time, the ECU 83 in S541 determines that the pump 27 is stuck in the off-state. Thereafter, the fuel vapor leak detection currently performed is ended.

After it is determined that the pump 27 is normally operating in S526, it is further determined in S527 whether the differential pressure ΔP falls within a standard. For example, the state within the predetermined standard in S527 herein refers to a state within a standard specified based on a relationship between the pump 27, the reference orifice 31, and piping connecting the pump 27 and the reference orifice 31. The ECU 83 in S527 determines whether the differential pressure ΔP in S525 falls within the predetermined standard. When the differential pressure ΔP falls within the predetermined standard, the process proceeds to S528. When the differential pressure ΔP does not fall within the predetermined standard, the process proceeds to S542.

When it is determined in S527 that the differential pressure ΔP falls within the predetermined standard, the ECU 83 in S528 records the differential pressure ΔP in S525 as a differential pressure ΔPref.

When it is determined in S527 that the differential pressure ΔP does not fall within the predetermined standard, the ECU 83 in S542 determines that the pump 27 or the reference orifice 31 is abnormal. Thereafter, the fuel vapor leak detection currently performed is ended.

After the differential pressure ΔP in S525 is recorded as the differential pressure ΔPref in S528, power is supplied to the first switching valve 25 in S529. The ECU 83 in S529 supplies power to the first switching valve 25 (time t623 in FIG. 18).

Subsequently, in S530, the ECU 83 determines whether the differential pressure ΔP has changed in the negative direction by an amount larger than or equal to a predetermined value within a predetermined time from the start of power supply to the first switching valve 25. The predetermined time in S530 herein is a relatively short period of time between the time t623 at the start of power supply to the first switching valve 25 and a time t624 in FIG. 18, for example. The predetermined value in S530 is a difference between the differential pressure ΔP at the time t623 and a pressure around the atmospheric pressure as shown in FIG. 18, for example. However, the differential pressure ΔP at the time t624 is not necessarily equivalent to the atmospheric pressure as shown in FIG. 18. When the first switching valve 25 normally operates, the pressure P1 changes in the positive direction by an amount larger than or equal to the predetermined value within the predetermined time as indicated by a solid line L62*b*3 in FIG. 18. Accordingly, the differential pressure ΔP changes in the negative direction by an amount larger than or equal to the predetermined value αs indicated by a solid line L62a3 in FIG. 18. When it is determined that the differential pressure ΔP has changed in the negative direction by an amount larger than or equal to the predetermined value within the predetermined time as indicated by the solid line L62a3 in FIG. 18, the process proceeds to S531.

When the first switching valve 25 does not normally operate, the pressure P1 does not considerably change from the value before the time t623 as indicated by a dotted line L62b5 in FIG. 18. Accordingly, the differential pressure ΔP does not change in the negative direction by an amount larger than or equal to the predetermined value as indicated by a dotted line L62a5 in FIG. 18. When it is determined that a change of the differential pressure ΔP in the negative direction by an amount larger than or equal to the predetermined value has not been made within the predetermined time as indicated by the dotted line L62a5 in FIG. 18, the process proceeds to S543.

When it is determined in S530 that the differential pressure ΔP has changed in the negative direction by an amount larger than or equal to the predetermined value within the predetermined time, the ECU 83 in S531 determines that the first switching valve 25 is not stuck.

When it is determined in S530 that a change of the differential pressure ΔP in the negative direction by an amount larger than or equal to the predetermined value has not been made within the predetermined time, the ECU 83 in S543 determines that the first switching valve 25 is stuck in the off-state, i.e., in a state of no communication between the canister connection path 191 and the pressure detection path 231 via the first switching valve 25. Thereafter, the fuel vapor leak detection currently performed is ended.

When it is determined that the first switching valve 25 is not stuck in S531, it is further determined in S532 whether the differential pressure ΔP is higher than the differential pressure ΔPref. The ECU 83 in S532 compares the magnitude of the differential pressure ΔP in S530 with the magnitude of the differential pressure ΔPref. The differential pressure ΔP changes as indicated by the solid line L62a3 in FIG. 18 as the pressure P1 changes as indicated by the solid line L62b3 in FIG. 18. At the time of the change as indicated by the solid line L62a3, the differential pressure ΔP is determined to be higher than the differential pressure ΔPref. In this case, the process proceeds to S533. The differential pressure ΔP changes as indicated by a dotted line L62a4 in FIG. 18 as the pressure P1 changes as indicated by a dotted line L62b4 in FIG. 18. At the time of the change as indicated by the dotted line L62a4, the differential pressure ΔP is determined to be lower than or equal to the differential pressure ΔPref. In this case, the process proceeds to S544.

When it is determined that the differential pressure ΔP in S530 is higher than the differential pressure ΔPref in S532, the ECU 83 in S533 determines absence of a leak from the canister side system.

When it is determined in S532 that the differential pressure ΔP in S530 is lower than or equal to the differential pressure ΔPref, the ECU 83 in S544 determines presence of a leak from the canister side system. Thereafter, the fuel vapor leak detection currently performed is ended.

When absence of a leak from the canister side system is determined in S533, abnormality diagnosis of the purge valve 14 may be further performed in S534. The abnormality diagnosis of the purge valve 14 at this time is executed in the manner shown in the flowchart in FIG. 15. This diagnosis is not described in the present embodiment.

Subsequently, in S535, power is supplied to the sealing valve 82. The ECU 83 in S535 supplies power to the sealing valve 82 (time t625 in FIG. 18).

Subsequently, in S536, the ECU 83 determines whether the differential pressure ΔP has changed in the negative direction by an amount larger than or equal to a predetermined value within a predetermined time from the start of power supply to the sealing valve 82. The predetermined time in S536 herein is a relatively short period of time between the time t625 at the start of power supply to the sealing valve 82 and a time t626 in FIG. 18, for example. The predetermined value in S536 is a difference between the differential pressure ΔP at the time t625 and a pressure around the atmospheric pressure as shown in FIG. 18, for example. However, the differential pressure ΔP at the time t626 is not necessarily equivalent to the atmospheric pressure as shown in FIG. 18. When the sealing valve 82 normally operates, the pressure P1 changes in the positive direction by an amount larger than or equal to the predetermined value within the predetermined time as indicated by a solid line L62b6 in FIG. 18. Accordingly, the differential pressure ΔP changes in the negative direction by an amount larger than or equal to the predetermined value as indicated by a solid line L62a6 in FIG. 18. When it is determined that the differential pressure ΔP has changed in the negative direction by an amount larger than or equal to the predetermined value within the predetermined time as indicated by the solid line L62a6 in FIG. 18, the process proceeds to S537.

When the sealing valve 82 does not normally operate, the pressure P1 does not considerably change from the value before the time t625 as indicated by a dotted line L62b8 in FIG. 18. Accordingly, the differential pressure ΔP does not change in the negative direction by an amount larger than or equal to the predetermined value αs indicated by a dotted line L62a8 in FIG. 18. When it is determined that a change of the differential pressure ΔP in the negative direction by an amount larger than or equal to the predetermined value has not been made within the predetermined time as indicated by the dotted line L62a8 in FIG. 18, the process proceeds to S545.

When it is determined in S536 that the differential pressure ΔP has changed in the negative direction by an amount larger than or equal to the predetermined value within the predetermined time, the ECU 83 in S537 determines that the sealing valve 82 is not stuck.

When it is determined in S536 that a change of the differential pressure ΔP in the negative direction by an amount larger than or equal to the predetermined value has not been made within the predetermined time, the ECU 83 in S545 determines that the sealing valve 82 is stuck in the off-state, i.e., in a state of no communication between the inside of the fuel tank 84 and the inside of the canister 81 via the first purge path 111. Thereafter, the fuel vapor leak detection currently performed is ended.

When it is determined that the sealing valve 82 is not stuck in S537, it is further determined in S538 whether the differential pressure ΔP is higher than the differential pressure ΔPref. The ECU 83 in S538 compares the magnitude of the differential pressure ΔP in S536 with the magnitude of the differential pressure ΔPref. The differential pressure ΔP changes as indicated by the solid line L62a6 in FIG. 18 as the pressure P1 changes as indicated by the solid line L62b6 in FIG. 18. At the time of the change as indicated by the solid line L62a6, It is determined that the differential pressure ΔP is higher than the differential pressure ΔPref. Accordingly, the process proceeds to S539. The differential pressure ΔP changes as indicated by a dotted line L62a7 in FIG. 18 as the pressure P1 changes as indicated by a dotted line L62b7 in FIG. 18. At the time of the change as indicated by the dotted line L62a7, it is determined that the differential pressure ΔP is lower than or equal to the differential pressure ΔPref. Accordingly, the process proceeds to S546.

When it is determined in S538 that the differential pressure ΔP in S536 is higher than the differential pressure ΔPref, the ECU 83 in S539 determines absence of a leak from the fuel tank side system.

When it is determined in S538 that the differential pressure ΔP in S536 is lower than or equal to the differential pressure ΔPref, the ECU 83 in S546 determines that the second switching valve 333 is stuck in the off-state, or that a leak from the fuel tank side system is present. Thereafter, the fuel vapor leak detection currently performed is ended.

When absence of a leak from the fuel tank side system is determined in S539, abnormality diagnosis of the purge valve 14 is performed in S540. The abnormality diagnosis of the purge valve 14 in S540 is executed in the manner shown in the flowchart in FIG. 16.

The purge valve 14 is opened in S561 shown in FIG. 16. The ECU 83 in S561 outputs a valve opening command to the purge valve 14 (time t627 in FIG. 18). In response to this command, the pump 27 in the state of driving introduces the atmosphere into the pressure detection path 231 via the intake pipe 16.

Subsequently, in S562, it is determined whether the differential pressure ΔP becomes a value in a range from "0" to a predetermined value (inclusive) within a predetermined time. The ECU 83 in S562 determines the magnitude of the differential pressure ΔP based on a signal output from the differential pressure sensor 33. When the purge valve 14 normally operates, the pressure P1 of the pressure detection path 231 becomes a pressure higher than the value before the time t627 as indicated by a solid line L62b9 in FIG. 18. Accordingly, the differential pressure ΔP changes in the negative direction and has a value higher than "0" as indicated by a solid line L62a9 in FIG. 18. When it is determined that the differential pressure ΔP has a value in the range from "0" to the predetermined value (inclusive) within the predetermined time, the process proceeds to S563. When the purge valve 14 does not normally operate by sticking or for other reasons, the pressure P1 of the pressure detection path 231 does not considerably change from the value before the time t627 as indicated by a dotted line L62b0 in FIG. 18. Accordingly, the differential pressure ΔP does not considerably change from the value before the time t627 as indicated by a dotted line L62a0 in FIG. 18. When it is determined that the differential pressure ΔP has a value lower than "0" or higher than the predetermined value within the predetermined time, the process proceeds to S567.

When it is determined in S562 that the differential pressure ΔP has a value in the range from "0" to the predetermined value (inclusive) within the predetermined time, the ECU 83 in S563 determines that the purge valve 14 is not stuck.

When it is determined in S562 that the differential pressure ΔP has a value lower than "0" or higher than the predetermined value within the predetermined time, the ECU 83 in S567 determines that the purge valve 14 is stuck in the closed state. Thereafter, the abnormality diagnosis of the purge valve 14 currently performed is ended.

When it is determined in S563 that the purge valve 14 is not stuck, the purge valve 14 is closed in S564. The ECU 83 outputs a valve closing command to the purge valve 14. In response to this command, the purge valve 14 is closed.

Subsequently, in S565, it is determined whether the current differential pressure ΔP is higher than the differential pressure ΔPref. The ECU 83 in S565 compares the magnitudes of the current differential pressure ΔP with the differential pressure ΔPref. When it is determined that the current differential pressure ΔP is higher than the differential pressure ΔPref, the process proceeds to S566. When it is determined that the current differential pressure ΔP is lower than or equal to the differential pressure ΔPref, the process proceeds to S568.

When it is determined in S565 that the current differential pressure ΔP is higher than the differential pressure ΔPref, the ECU 83 again determines in S566 that the purge valve 14 is not stuck.

When it is determined in S565 that the current differential pressure ΔP is lower than or equal to the differential pressure ΔPref, the ECU 83 again determines in S568 that the purge valve 14 is stuck in the opened state.

When the state of the purge valve 14 is determined in S566 and S568, the abnormality diagnosis of the purge valve 14 currently performed is ended.

The fuel vapor processing device 4 according to the fourth embodiment can switch between communication between the inside of the differential pressure sensor 33 and the first purge path 111, and communication between the inside of the differential pressure sensor 33 and the atmosphere path 211 by using the second switching valve 333 disposed in the differential pressure pipe 332. In this case, the pressure inside the fuel tank 84 communicating with the first purge path 111, or the differential pressure ΔP with respect to the atmospheric pressure is detectable by the differential pressure sensor 33 as necessary. Accordingly, the fuel vapor processing device 4 can detect absolute pressures of the pressure detection path 231 and the first purge path 111 based on a pressure detected by the differential pressure sensor 33 as a pressure with respect to the atmospheric pressure, while offering advantageous effects (a) and (e) of the first embodiment.

Other Embodiments

According to the embodiments described above, the differential pressure ΔP is calculated by subtracting the pressure P1 from the pressure P2. However, the differential pressure ΔP may be calculated by subtracting the pressure P2 from the pressure P1. In this case, the fuel vapor processing device can similarly achieve vapor leak detection, and abnormality diagnosis of the constituent elements of the units.

Figure 19:
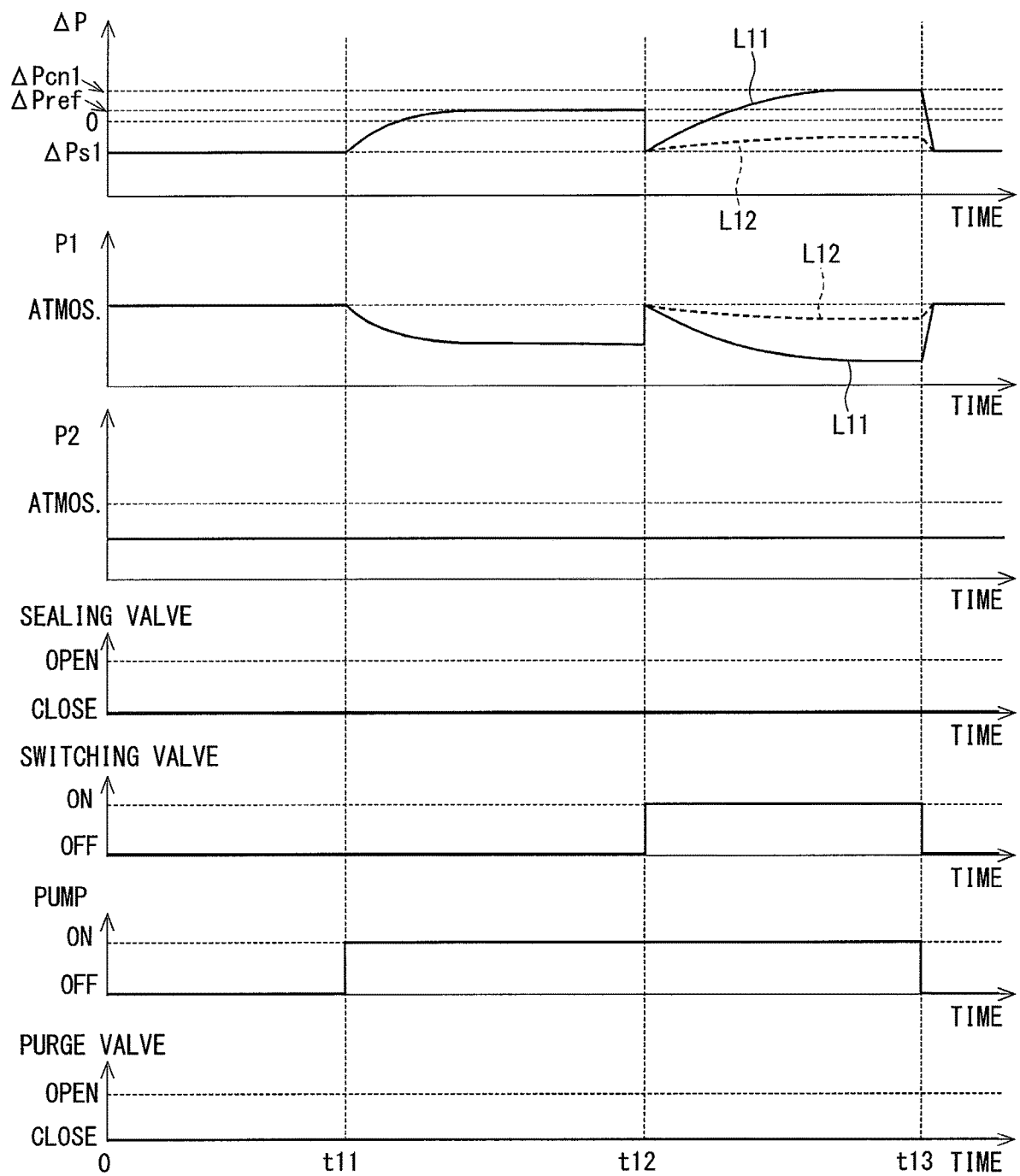
FIG. 19 is a characteristic diagram showing characteristics during fuel vapor leak detection performed by a fuel vapor processing device according to a different embodiment for detecting a fuel vapor leak from a canister.
Figure 20:
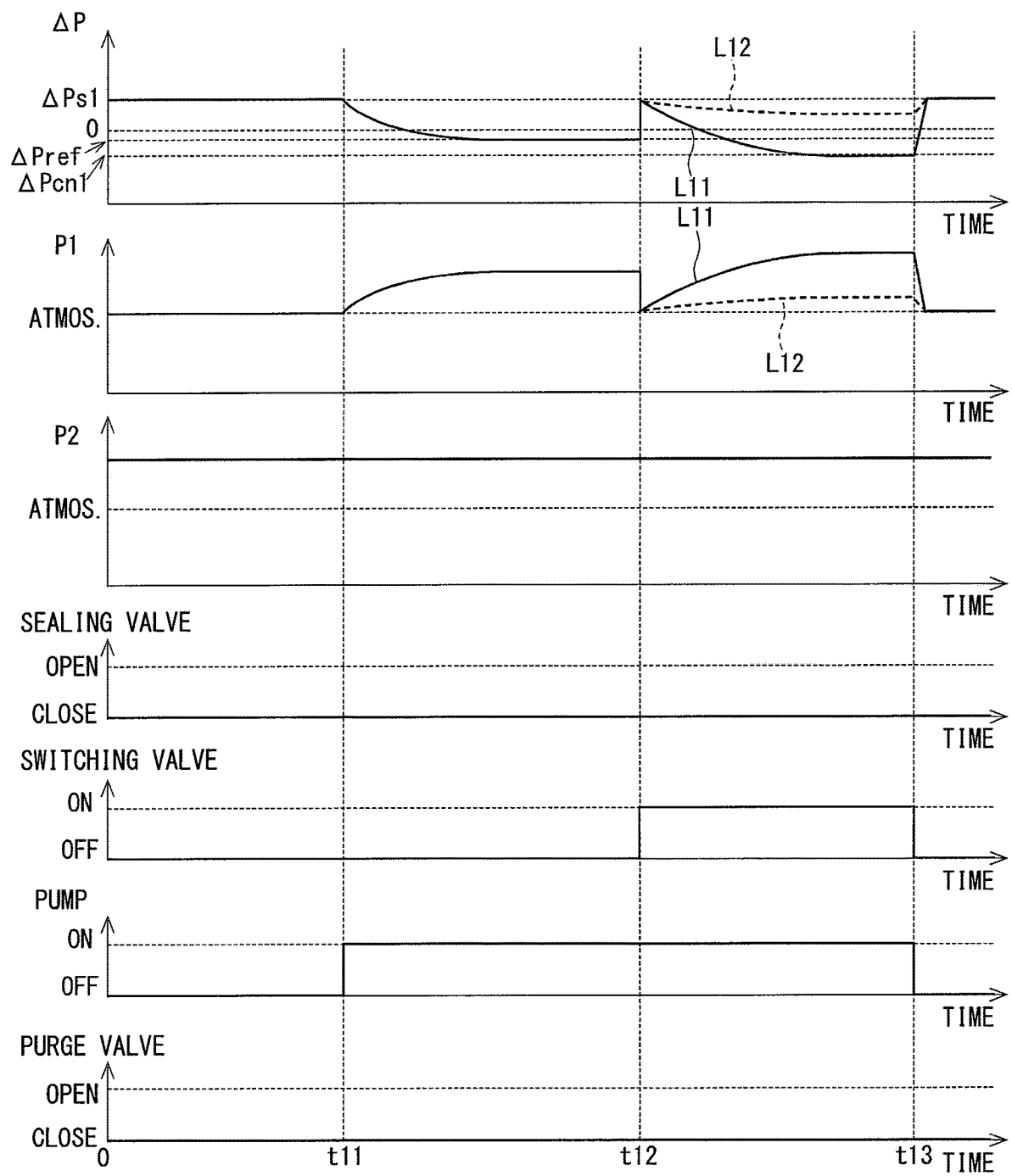
FIG. 20 is a characteristic diagram showing characteristics during fuel vapor leak detection performed by a fuel vapor processing device according to a different embodiment for detecting a fuel vapor leak from a canister.

According to the first embodiment, detection of a leak from the canister side system and other detections are performed for the fuel tank in the positive pressure condition. However, detection of a leak from the canister side system is similarly achievable for the fuel tank in the negative pressure condition as shown in FIG. 19. According to the first embodiment, the fuel vapor processing device includes the pump capable of depressurizing the inside of the fuel tank and the inside of the canister. However, detection of a leak from the canister side system is similarly achievable by using a pump capable of pressurizing the inside of the fuel tank and the inside of the canister as shown in FIG. 20.

According to the first embodiment, presence or absence of a leak from the fuel tank side system may be determined based on the differential pressure ΔPs1 detected in S102, similarly to S403 of the second embodiment.

Figure 21:
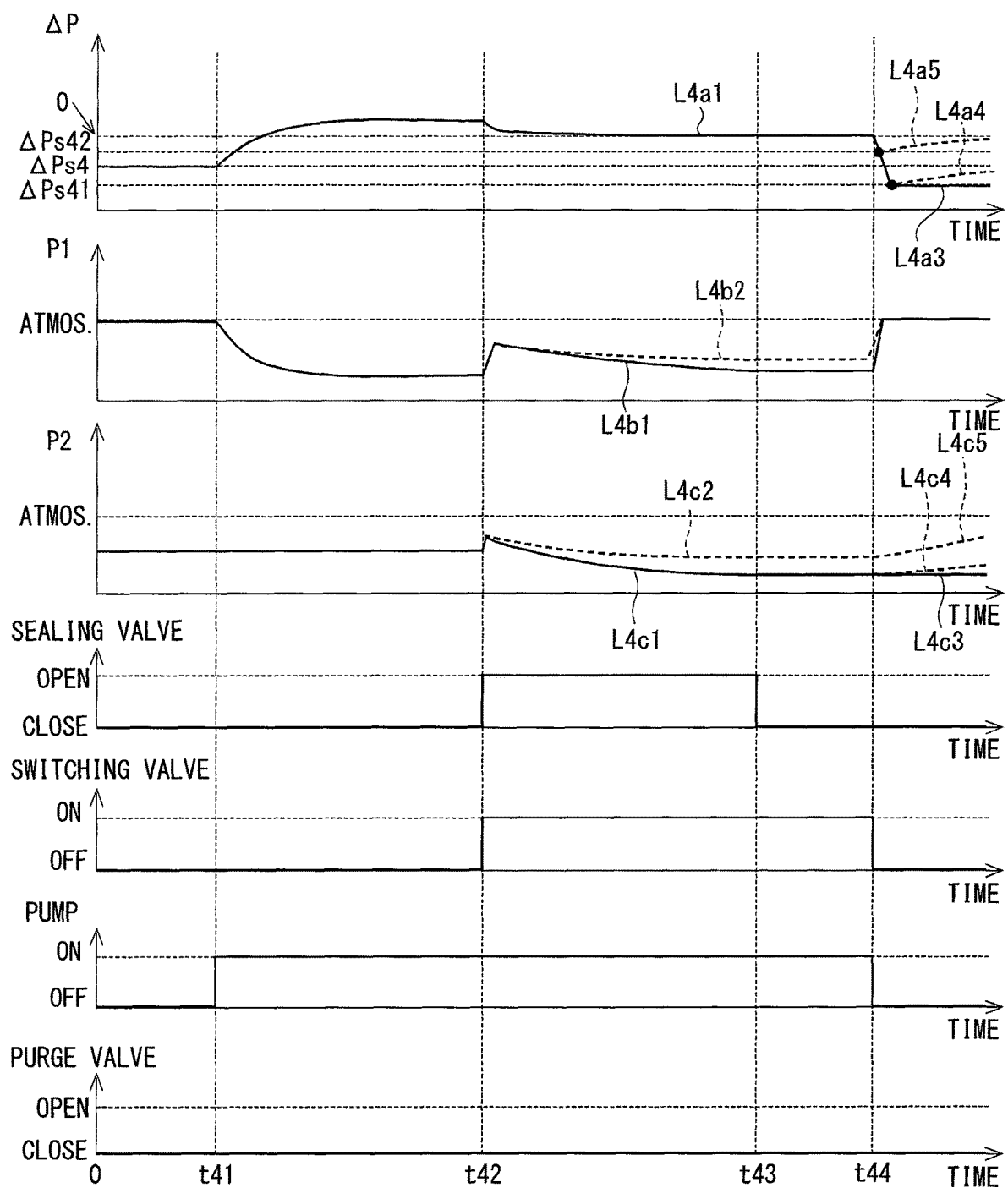
FIG. 21 is a characteristic diagram during fuel vapor leak detection performed by a fuel vapor processing device according to a different embodiment.
Figure 22:
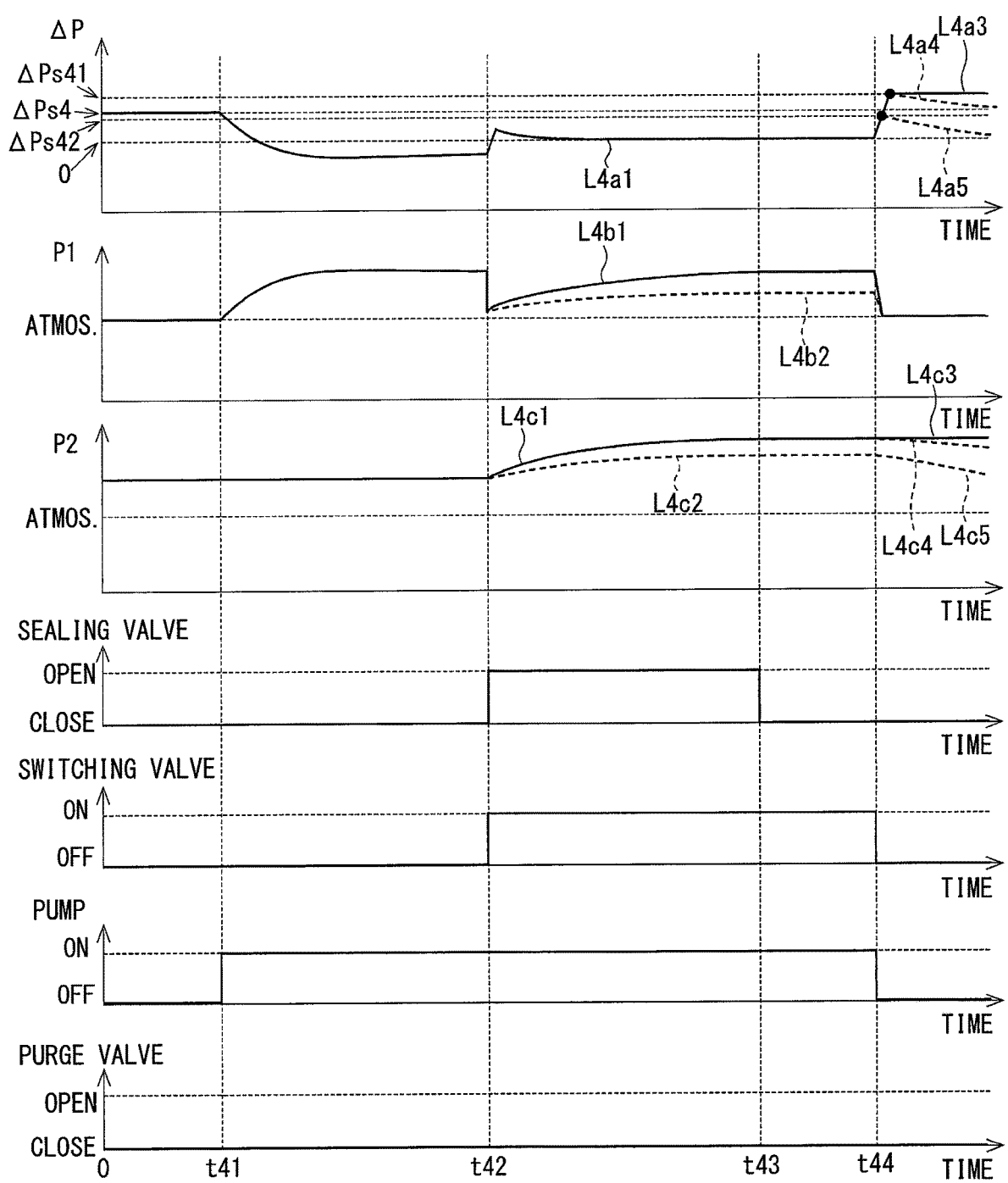
FIG. 22 is a characteristic diagram showing characteristics during fuel vapor leak detection performed by a fuel vapor processing device according to a different embodiment.

According to the second embodiment, detection of a fuel vapor leak from the fuel tank and other detections are performed for the fuel tank in the positive pressure condition. However, detection of a fuel vapor leak from the fuel tank is similarly achievable for the fuel tank in the negative pressure condition as shown in FIG. 21. According to the second embodiment, the fuel vapor processing device includes the pump capable of depressurizing the inside of the fuel tank and the inside of the canister. However, detection of a fuel vapor leak from the fuel tank is similarly achievable by using a pump capable of pressurizing the inside of the fuel tank and the inside of the canister as shown in FIG. 22.

According to the second embodiment, it is determined in S407 whether the differential pressure ΔP falls within the predetermined range, or whether the predetermined time has elapsed. In this step, the state of the sealing valve may be determined. More specifically, when the differential pressure ΔP falls within the predetermined range including 0, it is estimated that the difference between the pressure P1 and the pressure P2 is relatively small. Accordingly, the sealing valve is considered to be securely opened. When the amount of change of the differential pressure ΔP with time lies out of the predetermined range, the sealing valve is also considered to be securely opened. The method for determining the state of the sealing valve at this time is not limited to these methods. The state of the sealing valve may be determined based on a depressurizing time set in accordance with a space capacity of the fuel vapor processing device or other conditions. Alternatively, presence of a leak from the entire system may be determined based on an estimation of a pressure loss caused by generation of a flow of gas at a leak hole when the differential pressure ΔP is higher than a predetermined value after depressurization by the pump for a predetermined time.

Figure 23:
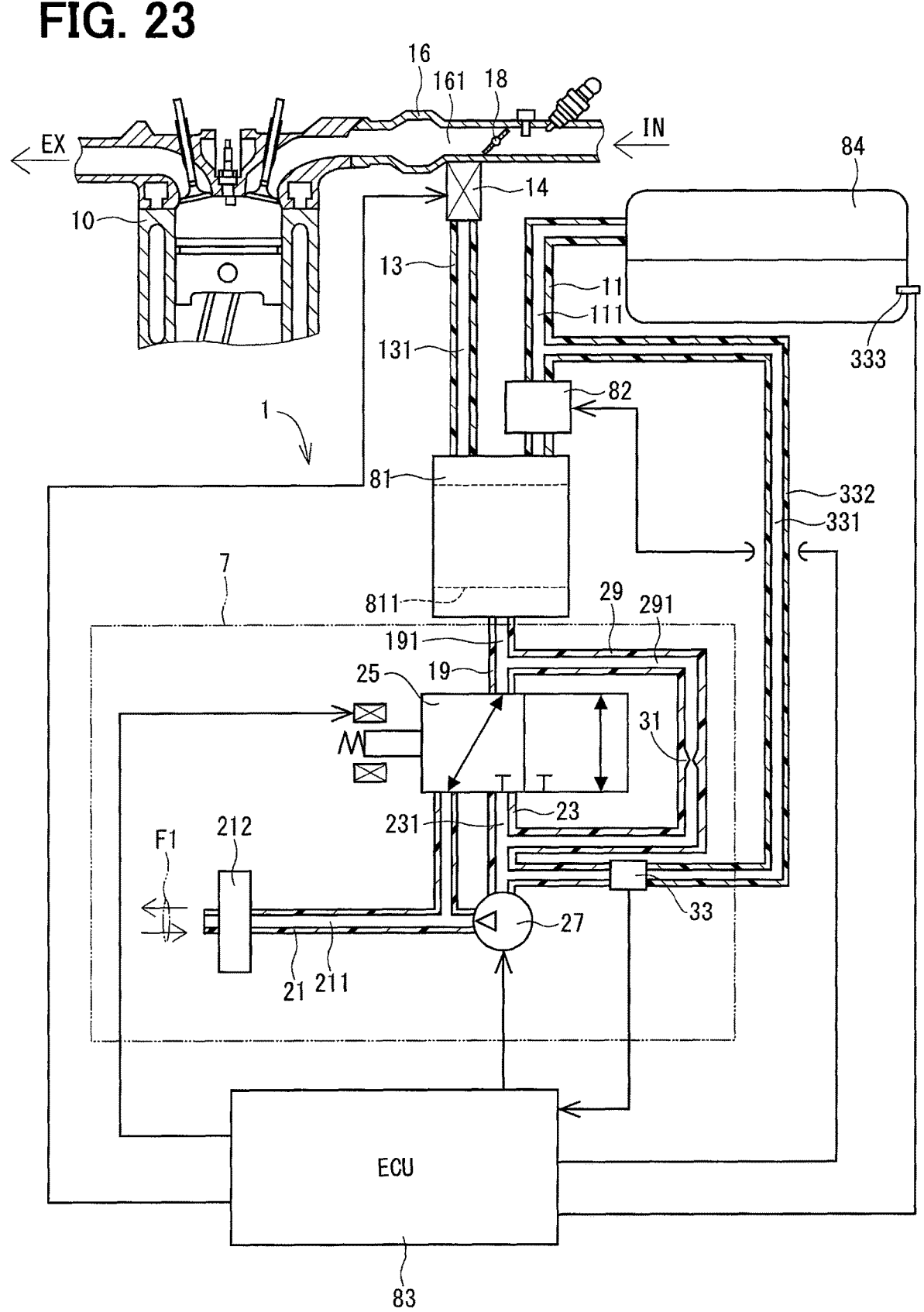
FIG. 23 is a conceptual diagram of a fuel vapor processing device according to a different embodiment.

According to the second embodiment, presence or absence of a leak from the entire system is determined based on a pressure change after depressurizing the fuel tank by the pump and sealing the depressurized fuel tank by the sealing valve. However, the method for determining presence or absence of a leak from the entire system is not limited to this method. For example, when a temperature sensor 35 is provided to detect a fuel temperature inside the fuel tank 84 as illustrated in FIG. 23, such an internal pressure method may be adopted which detects a fuel vapor leak based on a temperature change of fuel inside the fuel tank 84 with time and a pressure change inside the fuel tank 84 with time.

The abnormality detection method for detecting abnormality of the purge valve 14 and the sealing valve 82, and the operation performed during refueling of the fuel tank 84 according to the first embodiment may be applied to the second embodiment.

Figure 24:
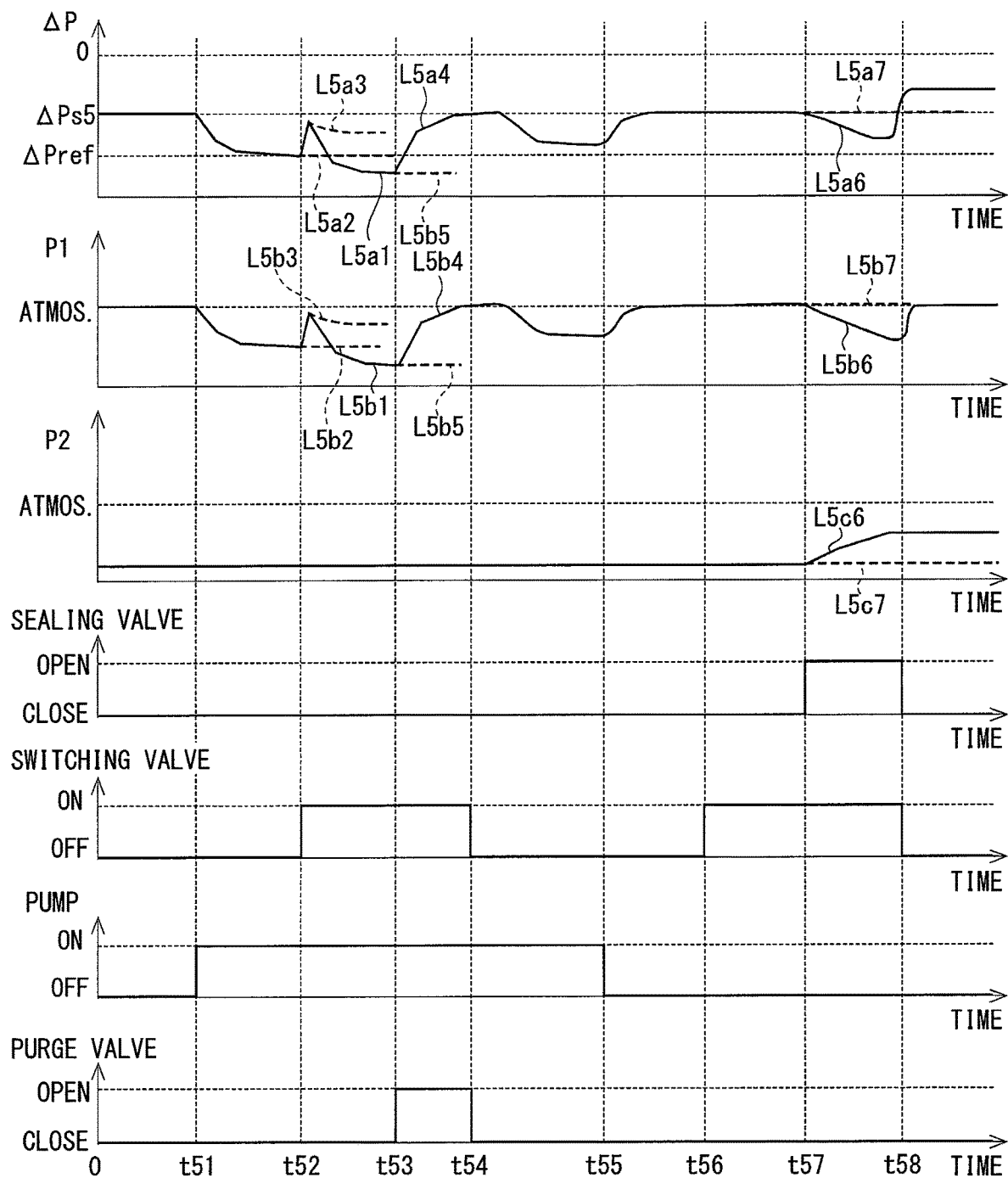
FIG. 24 is a characteristic diagram showing characteristics during leak detection performed by a fuel vapor processing device according to a different embodiment for detecting a leak from the fuel vapor processing device.

According to the third embodiment, abnormality detection of the plurality of valves simultaneously with detection of fuel vapor leaks from the canister and the fuel tank is achievable for the fuel tank in the positive pressure condition. However, as shown in FIG. 24, abnormality detection of the plurality of valves simultaneously with detection of fuel vapor leaks from the canister and the fuel tank is similarly achievable for the fuel tank in the negative pressure condition.

Figure 25:
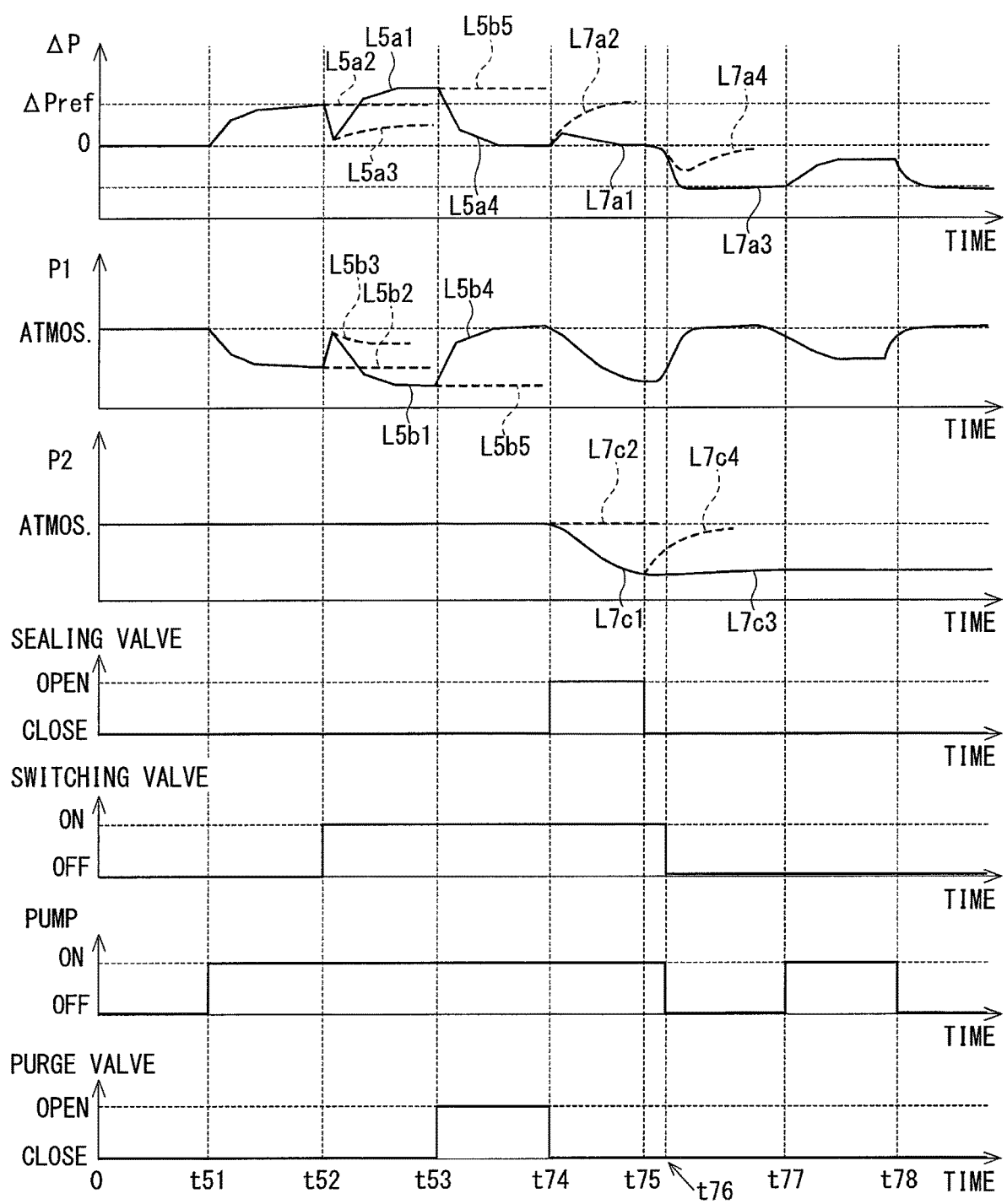
FIG. 25 is a characteristic diagram showing characteristics during leak detection performed by the fuel vapor processing device according to the different embodiment for detecting leak from the fuel vapor processing device.

According to the third embodiment, abnormality detection of the plurality of valves simultaneously with detection of fuel vapor leaks from the canister and the fuel tank is similarly achievable when the pressure inside the fuel tank is a pressure around the atmospheric pressure. FIG. 25 is a characteristic diagram of a fuel vapor processing device adoptable in this situation.

At a time t74 after the time t53, the sealing valve 82 is opened, while the purge valve 14 is closed. The ECU 83 outputs a valve opening command to the sealing valve 82, and a valve closing command to the purge valve 14. In response to these commands, the inside of the fuel tank 84 is communicatively connected to the pressure detection path 231 via the first purge pipe 11, the canister 81, the canister connection pipe 19, and the first switching valve 25. As a result, the inside of the fuel tank 84 is depressurized by the pump 27 (solid line L7c1 between time t74 and time t75 in FIG. 25). Accordingly, the differential pressure ΔP changes with time as indicated by a solid line L7a1 between the time t74 and the time t75 in FIG. 25.

When the sealing valve 82 is stuck, it is estimated that the pressure P2 does not change from the state before the time t74 as indicated by a dotted line L7c2 between the time t74 and the time t75 in FIG. 25. In this case, the differential pressure ΔP changes with time as indicated by the dotted line L5a2 between the time t52 and the time t53 in FIG. 11. Sticking abnormality of the sealing valve 82 is detectable in this manner.

The sealing valve 82 is closed at the time t75. The ECU 83 outputs a valve closing command to the sealing valve 82. At a subsequent time t76, power supply to the first switching valve 25 and the pump 27 is stopped. Accordingly, relatively high-pressure gas for leak determination is securely sealed into the fuel tank 84.

When the sealing valve 82 is closed at the time t75, the pressure P2 after the time t75 increases in a relatively slow manner as shown in FIG. 25 (solid line L7c3 after time t75 in FIG. 25). Accordingly, the differential pressure ΔP changes with time as indicated by a solid line L7a3 between the time t75 and the time t76 in FIG. 25. However, when the fuel tank side system has a leak hole, the atmosphere enters the fuel tank side system through this leak hole. Accordingly, the pressure P2 after the time t75 increases in a relatively sharp manner (dotted line L7c4 after time t75 in FIG. 25). In this case, the differential pressure ΔP changes with time as indicated by a dotted line L7a4 between the time t75 and the time t76 in FIG. 25. Accordingly, presence or absence of a leak from the fuel tank side system is detectable.

At a subsequent time t77, driving of the pump 27 is started. As a result, the pressure of the pressure detection path 231 becomes equivalent to the atmospheric pressure introduced through the reference orifice 31. The ECU 83 calculates a second reference pressure Pref based on a signal output from the differential pressure sensor 33. Power supply to the pump 27 is stopped at a time t78.

Accordingly, even when the pressure inside the fuel tank 84 is the atmospheric pressure, determination of presence or absence of a fuel vapor leak simultaneous with abnormality determination of the plurality of valves included in the fuel vapor processing device is achievable by depressurization using the pump 27. This advantageous effect is similarly offered by a fuel vapor processing device including a pump capable of pressurizing the inside of the fuel tank.

The operation during refueling to the fuel tank 84 according to the first embodiment may be applied to the third embodiment.

Figure 26:
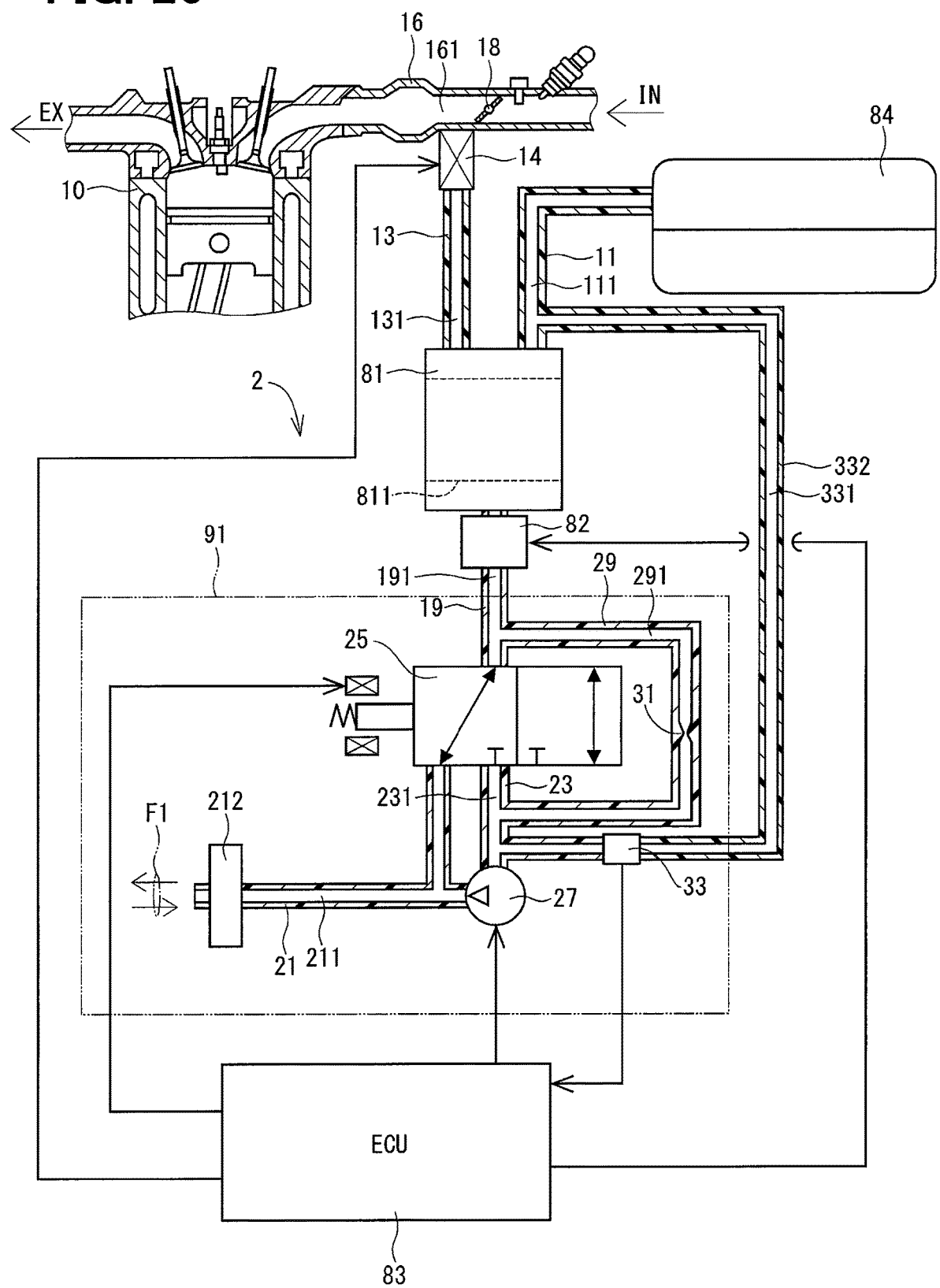
FIG. 26 is a conceptual diagram of a fuel vapor processing device according to a different embodiment.

According to the first to third embodiments, the sealing valve is disposed in the first purge pipe that connects the fuel tank and the canister. However, the sealing valve may be disposed in the canister connection pipe that connects the canister and the switching valve as in a fuel vapor processing device 2 illustrated in FIG. 26.

According to the fourth embodiment, the pump capable of depressurizing the inside of the fuel tank and the inside of the canister is provided. However, detection of a fuel vapor leak and abnormality detection of the units of the fuel vapor processing device are similarly achievable by using a pump capable of pressurizing the inside of the fuel tank and the inside of the canister.

Figure 27:
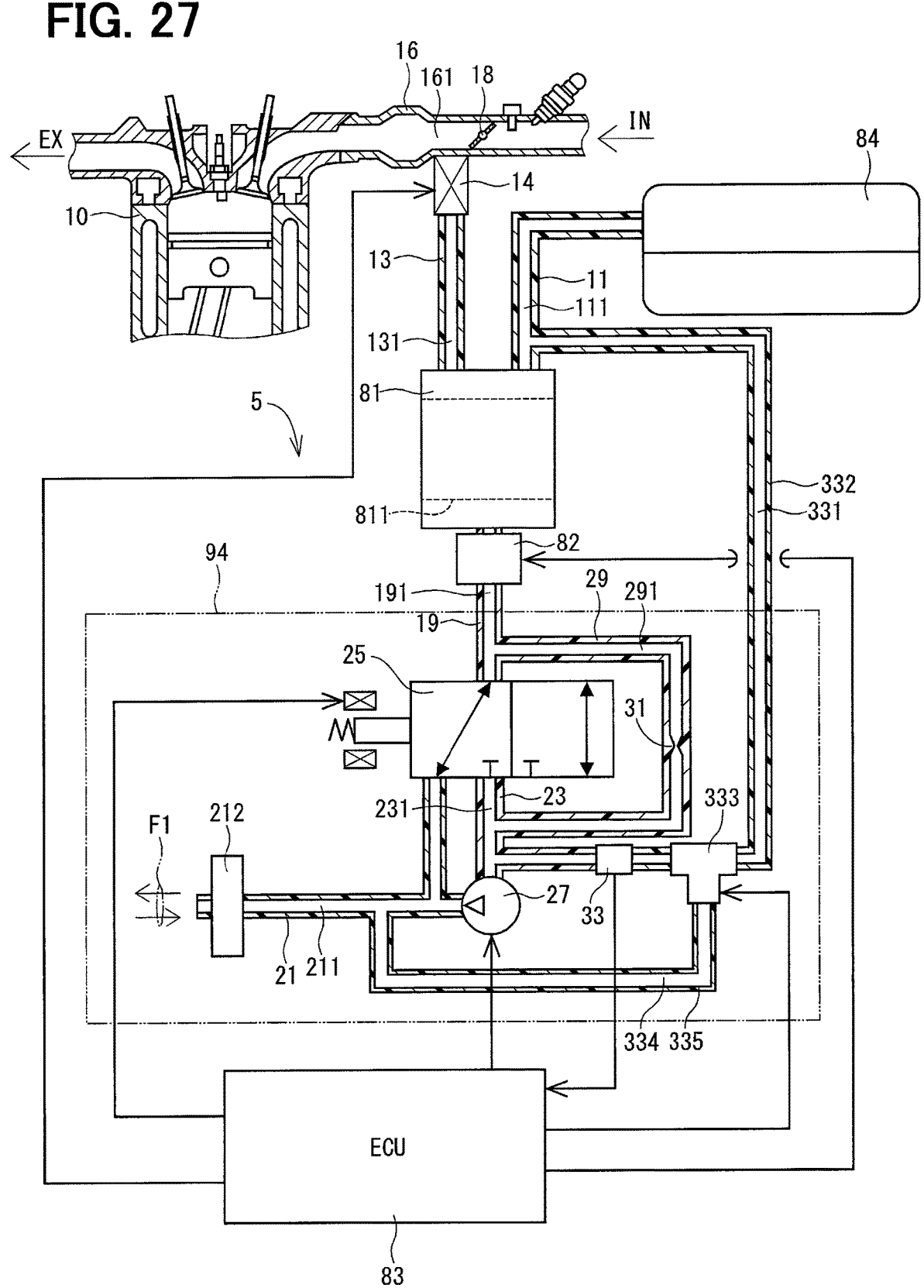
FIG. 27 is a conceptual diagram of a fuel vapor processing device according to a different embodiment.
Figure 28:
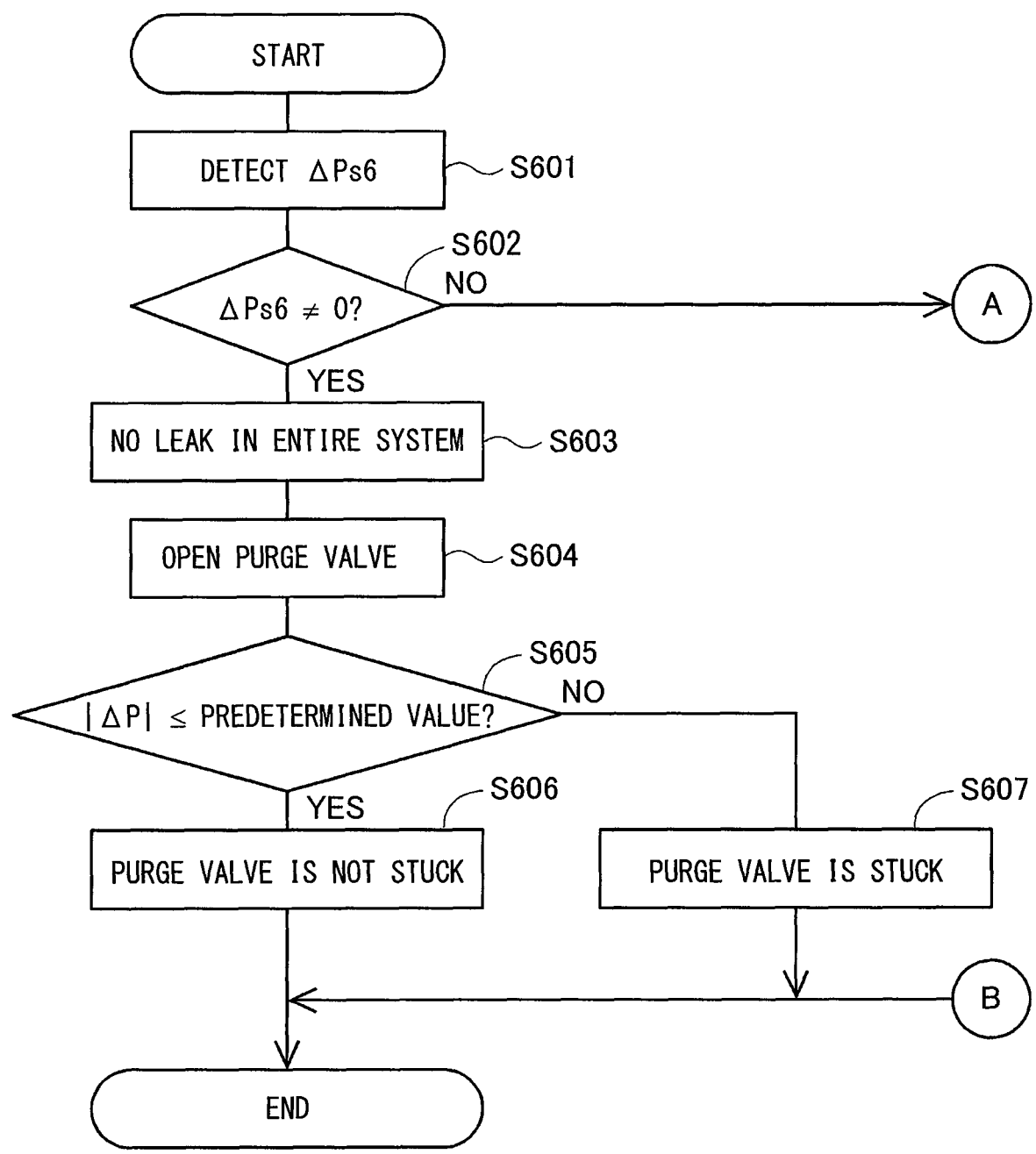
FIG. 28 is a part of a flowchart showing a fuel vapor leak detection method, and an abnormality detection method for detecting abnormality of units of the fuel vapor processing device, both methods performed by the fuel vapor processing device according to the different embodiment.

According to the fourth embodiment, the sealing valve is disposed in the first purge pipe that connects the fuel tank and the canister. However, the sealing valve may be disposed in the canister connection pipe that connects the canister and the switching valve as in a fuel vapor processing device 5 illustrated in FIG. 27. A fuel vapor leak detection method and an abnormality detection method for detecting abnormality of the units of the fuel vapor processing device 5 having this configuration are described with reference to FIGS. 28 and 29.

First, in S601, the differential pressure $\Delta Ps6$ is detected.

Subsequently, in S602, it is determined whether the differential pressure $\Delta Ps6$ is not "0". The ECU 83 in S602 determines whether the differential pressure $\Delta Ps6$ detected in S601 is not "0". When the ECU 83 determines that the differential pressure $\Delta Ps6$ is not "0", i.e., the pressures inside the fuel tank 84 and inside the canister 81 are positive pressures or negative pressures, the process proceeds to S603. When the ECU 83 determines that the differential pressure $\Delta Ps6$ is 0, the process proceeds to S608.

When it is determined in S602 that the differential pressure $\Delta Ps6$ is not 0, the ECU 83 in S603 determines absence of a leak from the entire system.

When absence of a leak from the entire system is determined in S603, the purge valve 14 is opened in S604. The ECU 83 in S604 outputs a valve opening command to the purge valve 14.

Subsequently, in S605, it is determined whether the absolute value of the differential pressure $\Delta P$ becomes a pressure smaller than or equal to a predetermined value within a predetermined time. The ECU 83 in S605 determines the magnitude of the absolute value of the differential pressure $\Delta P$ based on a signal output from the differential pressure sensor 33. The "predetermined value" herein is an absolute value of the differential pressure $\Delta P$ in S602. When the purge valve 14 normally operates, the absolute value of the differential pressure $\Delta P$ becomes smaller than the predetermined value. When it is determined that the differential pressure $\Delta P$ has a value in a range from "0" to the predetermined value (inclusive) within the predetermined time, the process proceeds to S606. When the purge valve 14 does not normally operate due to sticking or for other reasons, the absolute value of the differential pressure $\Delta P$ remains at the absolute value of the differential pressure $\Delta P$ in S602. When it is determined that the absolute value of the differential pressure $\Delta P$ remains at the predetermined value within the predetermined time, the process proceeds to S607.

When it is determined in S605 that the differential pressure $\Delta P$ has a value lower than or equal to the predetermined value within the predetermined time, the ECU 83 in S606 determines that the purge valve 14 is not stuck. Thereafter, the fuel vapor leak detection currently performed is ended.

When it is determined in S605 that the differential pressure $\Delta P$ remains at the predetermined value within the predetermined time, the ECU 83 in S607 determines that the purge valve 14 is stuck in the closed state. Thereafter, the fuel vapor leak detection currently performed is ended.

When it is determined in S602 that the differential pressure $\Delta Ps6$ is "0", power is supplied to the second switching valve 333 in S608 in FIG. 29.

Subsequently, in S609, driving of the pump 27 is started.

Subsequently, in S610, the ECU 83 determines whether the differential pressure $\Delta P$ has changed in the positive direction by an amount larger than or equal to a predetermined value within a predetermined time from the start of driving of the pump 27. When the pump 27 normally operates, the differential pressure $\Delta P$ changes in the positive direction. When it is determined that the differential pressure $\Delta P$ has changed in the positive direction by an amount larger than or equal to the predetermined value within the predetermined time, the process proceeds to S611. When the pump 27 does not normally operate by sticking or for other reasons, the differential pressure $\Delta P$ does not considerably change even after the start of driving of the pump 27. When it is determined that a change of the differential pressure $\Delta P$ in the positive direction by an amount larger than or equal to the predetermined value has not been made within the predetermined time, the process proceeds to S623.

When it is determined in S610 that the differential pressure $\Delta P$ has changed in the positive direction by an amount larger than or equal to the predetermined value within the predetermined time, the ECU 83 in S611 determines that the pump 27 is normally operating.

When it is determined in S610 that a change of the differential pressure $\Delta P$ in the positive direction by an amount larger than or equal to the predetermined value has not been made within the predetermined time, the ECU 83 in S623 determines that the pump 27 is stuck in the off-state. Thereafter, the fuel vapor leak detection currently performed is ended.

After it is determined in S611 that the pump 27 is normally operating, it is further determined in S612 whether the differential pressure $\Delta P$ falls within a standard. The ECU 83 in S612 determines whether the differential pressure $\Delta P$ in S610 falls within the predetermined standard. When the differential pressure $\Delta P$ falls within the predetermined standard, the process proceeds to S613. When the differential pressure $\Delta P$ does not fall within the predetermined standard, the process proceeds to S624.

When it is determined in S612 that the differential pressure $\Delta P$ falls within the predetermined standard, the ECU 83 in S613 records the differential pressure $\Delta P$ in S612 as a differential pressure $\Delta Pref$.

When it is determined in S612 that the differential pressure $\Delta P$ does not fall within the predetermined standard, the ECU 83 in S624 determines that the pump 27 or the reference orifice 31 is abnormal. Thereafter, the fuel vapor leak detection currently performed is ended.

After the differential pressure $\Delta P$ in S612 is recorded as the differential pressure $\Delta Pref$ in S613, power is supplied to the first switching valve 25 in S614. The ECU 83 in S614 supplies power to the first switching valve 25.

Subsequently, in S615, the ECU 83 determines whether the differential pressure $\Delta P$ has changed in the negative direction by an amount larger than or equal to a predetermined value within a predetermined time from the start of power supply to the first switching valve 25. The predetermined time in S615 herein is a relatively short period of time immediately after the start of power supply to the first switching valve 25. For example, the predetermined value in S615 is a relatively large value such as a difference between the differential pressure $\Delta P$ at the time of the start of power supply to the first switching valve 25 and a pressure around the atmospheric pressure. When the first switching valve 25 normally operates, the differential pressure ΔP changes in the negative direction by an amount larger than or equal to the predetermined value. When it is determined that the differential pressure ΔP has changed in the negative direction by an amount larger than or equal to the predetermined value within the predetermined time, the process proceeds to S616. When the first switching valve 25 does not normally operate, the differential pressure ΔP does not change in the negative direction by an amount larger than or equal to the predetermined value. When it is determined that a change of the differential pressure ΔP in the negative direction by an amount larger than or equal to the predetermined value has not been made within the predetermined time, the process proceeds to S625.

When it is determined in S615 that the differential pressure ΔP has changed in the negative direction by an amount larger than or equal to the predetermined value within the predetermined time, the ECU 83 in S616 determines that the first switching valve 25 is not stuck.

When it is determined in S615 that a change of the differential pressure ΔP in the negative direction by an amount larger than or equal to the predetermined value has not been made within the predetermined time, the ECU 83 in S625 determines that the first switching valve 25 is stuck in the off-state. Thereafter, the fuel vapor leak detection currently performed is ended.

After it is determined in S616 that the first switching valve 25 is not stuck, power is supplied to the sealing valve 82 in S617. The ECU 83 in S617 supplies power to the sealing valve 82.

Subsequently, in S618, the ECU 83 determines whether the differential pressure ΔP has changed in the negative direction by an amount larger than or equal to a predetermined value within a predetermined time from the start of power supply to the sealing valve 82. When the sealing valve 82 normally operates, fuel vapor of the fuel tank 84 flows into the pressure detection path 231. In this case, the pressure P1 changes in the positive direction. Accordingly, the differential pressure ΔP changes in the negative direction. When it is determined that the differential pressure ΔP has changed in the negative direction by an amount larger than or equal to the predetermined value within the predetermined time, the process proceeds to S619. When the sealing valve 82 does not normally operate, the differential pressure ΔP does not considerably change. When it is determined that a change of the differential pressure ΔP in the negative direction by an amount larger than or equal to the predetermined value has not been made within the predetermined time, the process proceeds to S626.

When it is determined in S618 that the differential pressure ΔP has changed in the negative direction by an amount larger than or equal to the predetermined value within the predetermined time, the ECU 83 in S619 determines that the sealing valve 82 is not stuck.

When it is determined in S618 that a change of the differential pressure ΔP in the negative direction by an amount larger than or equal to the predetermined value has not been made within the predetermined time, the ECU 83 in S626 determines that the sealing valve 82 is stuck in the off-state, i.e., a state of no communication between the inside of the fuel tank 84 and the inside of the canister 81 via the first purge path 111. Thereafter, the fuel vapor leak detection currently performed is ended.

When it is determined in S619 that the sealing valve 82 is not stuck, it is further determined in S620 whether the differential pressure ΔP is higher than the differential pressure ΔPref. The ECU 83 in S620 compares the magnitude of the differential pressure ΔP in S618 with the magnitude of the differential pressure ΔPref. When it is determined that the differential pressure ΔP in S618 is higher than the differential pressure ΔPref, the process proceeds to S621. When it is determined that the differential pressure ΔP in S618 is lower than or equal to the differential pressure ΔPref, the process proceeds to S627.

When it is determined in S620 that the differential pressure ΔP in S618 is higher than the differential pressure ΔPref, the ECU 83 in S621 determines absence of a leak from the entire system.

When it is determined in S620 that the differential pressure ΔP in S618 is lower than or equal to the differential pressure ΔPref, the ECU 83 in S627 determines that the second switching valve 333 is stuck in the off-state, or that a leak from the entire system is present. Thereafter, the fuel vapor leak detection currently performed is ended.

When absence of a leak from the entire system is determined in S621, abnormality diagnosis of the purge valve 14 is performed in S622. The abnormality diagnosis of the purge valve 14 in S622 is performed in a manner similar to the abnormality diagnosis of the fourth embodiment. Thereafter, the fuel vapor leak detection currently performed is ended.

As described above, fuel vapor leak detection and detection of abnormality of the units performed by the fuel vapor processing device 5 are achievable even when the sealing valve 82 is disposed in the canister connection pipe 19. In addition, fuel vapor leak detection and abnormality detection of the units are achievable even when the pump 27 of the fuel vapor processing device 5 is a pressurizing pump.

The present disclosure is not limited to the embodiments described herein, but may be practiced in various other modes without departing from the subject matters of the present disclosure.

What is claimed is:

1. A fuel vapor processing device configured to recover fuel vapor generated in a fuel tank that stores fuel of an internal combustion engine, the fuel vapor processing device comprising:
   a canister that includes an absorbent configured to absorb fuel vapor generated in the fuel tank;
   a fuel vapor path member that forms a fuel vapor path that communicatively connects the canister and the fuel tank;
   a canister path member that forms a canister path that communicates with the canister;
   an atmosphere path member that forms an atmosphere path that communicates with an atmosphere;
   a pressure detection path member that forms a pressure detection path configured to communicate with the canister path;
   a first switching valve configured to switch between communication between the canister path and the pressure detection path and communication between the canister path and the atmosphere path;
   a pressurizing/depressurizing unit configured to depressurize or pressurize an inside of the canister when the first switching valve communicatively connects the canister path and the pressure detection path;
   a bypass path member that forms a switching valve bypass path that bypasses the first switching valve, and communicatively connects the canister path and the pressure detection path;
   a narrowing portion disposed in the bypass path member;
   a differential pressure detection path connected to the fuel vapor path member and the pressure detection path member to conduct pressure in the fuel vapor path and pressure in the pressure detection path;

a differential pressure detection unit provided to the differential pressure detection path and configured to detect a difference between a pressure inside the fuel tank or an atmospheric pressure and a pressure of the pressure detection path, and output a signal indicating the difference;

a sealing valve disposed in the fuel vapor path member or the canister path member, and configured to isolate the fuel tank from the canister, or isolate the canister from the pressurizing/depressurizing unit; and a control unit that electrically connects with the first switching valve, the pressurizing/depressurizing unit, the sealing valve, and the differential pressure detection unit, and is configured to determine presence or absence of a fuel vapor leak while controlling operations of the first switching valve, the pressurizing/depressurizing unit, and the sealing valve, based on a signal output from the differential pressure detection unit.

2. The fuel vapor processing device according to claim 1, wherein the control unit is configured to calculate the pressure inside the fuel tank, based on a signal output from the differential pressure detection unit when the pressure of the pressure detection path is the atmospheric pressure.

3. The fuel vapor processing device according to claim 1, wherein:

the control unit is configured to calculate a base difference value, based on a signal output from the differential pressure detection unit when isolation between the fuel tank and the canister via the sealing valve, and communication between the canister path and the atmosphere path via the first switching valve are both achieved in a stopping state of the pressurizing/depressurizing unit, the control unit is configured to calculate a reference difference value based on a signal output from the differential pressure detection unit when isolation between the fuel tank and the canister via the sealing valve, and communication between the canister path and the atmosphere path via the first switching valve are both achieved in an operating state of the pressurizing/depressurizing unit, the control unit is configured to calculate a determination difference value based on a signal output from the differential pressure detection unit when isolation between the fuel tank and the canister via the sealing valve, and communication between the canister path and the pressure detection path via the first switching valve are both achieved in the operating state of the pressurizing/depressurizing unit, and the control unit is configured to determine presence or absence of a leak from the canister based on a magnitude relationship between a reference value that is a difference between the reference difference value and the base difference value, and a determination value that is a difference between the determination difference value and the base difference value.

4. The fuel vapor processing device according to claim 3, wherein:

the control unit calculates an end value that is a pressure inside the fuel tank before determination of presence or absence of a leak from the canister based on the magnitude relationship between the reference value and the determination value, and the control unit compares the base difference value and the end value.

5. The fuel vapor processing device according to claim 1, wherein:

the control unit is configured to calculate a base difference value based on a signal output from the differential pressure detection unit when isolation between the fuel tank and the canister via the sealing valve, and communication between the canister path and the atmosphere path via the first switching valve are both achieved in a stopping state of the pressurizing/depressurizing unit, the control unit is configured to calculate a reference difference value based on a signal output from the differential pressure detection unit when isolation between the fuel tank and the canister via the sealing valve, and communication between the canister path and the atmosphere path via the first switching valve are both achieved in an operating state of the pressurizing/depressurizing unit, the control unit is configured to calculate a differential maximum value based on a signal output from the differential pressure detection unit when the pressurizing/depressurizing unit is stopped after sequential achievement of communication between the fuel tank and the canister via the sealing valve, isolation between the fuel tank and the canister via the sealing valve, and communication between the canister path and the atmosphere path via the first switching valve after the isolation between the fuel tank and the canister via the sealing valve in the operating state of the pressurizing/depressurizing unit, and the control unit is configured to determine presence or absence of a fuel vapor leak based on a magnitude relationship between a reference value that is a difference between the reference difference value and the base difference value, and the differential maximum value.

6. The fuel vapor processing device according to claim 1, further comprising a purge valve disposed between an intake system of the internal combustion engine and the canister, electrically connected to the control unit, and configured to isolate the intake system from the canister, wherein the control unit is configured to control an operation of the purge valve, and the control unit is configured to determine states of the purge valve and the sealing valve based on a signal output from the differential pressure detection unit.

7. The fuel vapor processing device according to claim 1, wherein the control unit controls opening and closing of the sealing valve, based on a signal output from the differential pressure detection unit during refueling of the fuel tank.

8. The fuel vapor processing device according to claim 7, wherein the control unit causes the sealing valve to close when a difference that is a difference between a pressure of the fuel vapor path and a pressure of the pressure detection path and that is calculated based on a signal output from the differential pressure detection unit falls within a predetermined range including "0".

9. The fuel vapor processing device according to claim 8, wherein after closure of the sealing valve achieved when the difference that is the difference between the pressure of the fuel vapor path and the pressure of the pressure detection path and that is calculated based on the signal output from the differential pressure detection unit falls within the a predetermined range including "0", and subsequently, a predetermined time has elapsed, the control unit causes the sealing valve to open when the difference that is the difference between the pressure of the fuel vapor path and the pressure of the pressure detection path and that is calculated based on the signal output from the differential pressure detection unit falls within the predetermined range including "0".

10. A fuel vapor processing device configured to recover fuel vapor generated in a fuel tank that stores fuel of an internal combustion engine, the fuel vapor processing device comprising:
- a canister that includes an absorbent configured to absorb fuel vapor generated in the fuel tank;
- a fuel vapor path member that forms a fuel vapor path that communicatively connects the canister and the fuel tank;
- a canister path member that forms a canister path that communicates with the canister;
- an atmosphere path member that forms an atmosphere path that communicates with an atmosphere;
- a pressure detection path member that forms a pressure detection path configured to communicate with the canister path;
- a first switching valve configured to switch between communication between the canister path and the pressure detection path and communication between the canister path and the atmosphere path;
- a pressurizing/depressurizing unit configured to depressurize or pressurize an inside of the canister when the first switching valve communicatively connects the canister path and the pressure detection path;
- a bypass path member that forms a switching valve bypass path that bypasses the first switching valve, and communicatively connects the canister path and the pressure detection path;
- a narrowing portion disposed in the bypass path member;
- a differential pressure detection unit configured to detect a difference between a pressure inside the fuel tank or an atmospheric pressure and a pressure of the pressure detection path, and output a signal indicating the difference;
- a sealing valve disposed in the fuel vapor path member or the canister path member, and configured to isolate the fuel tank from the canister, or isolate the canister from the pressurizing/depressurizing unit; and
- a control unit that electrically connects with the first switching valve, the pressurizing/depressurizing unit, the sealing valve, and the differential pressure detection unit, and is configured to determine presence or absence of a fuel vapor leak while controlling operations of the first switching valve, the pressurizing/depressurizing unit, and the sealing valve, based on a signal output from the differential pressure detection unit; and
- a second switching valve configured to switch between a state of the inside of the differential pressure detection unit communicating with the inside of the fuel tank and the fuel vapor path on the fuel tank side with respect to the sealing valve, and a state of the inside of the differential pressure detection unit communicating with the atmosphere, wherein the control unit is electrically connected to the second switching valve, and configured to control an operation of the second switching valve.

11. The fuel vapor processing device according to claim 10, wherein
the control unit is configured to calculate a reference differential pressure, based on a signal output from the differential pressure detection unit when communication between the canister path and the atmosphere path via the first switching valve, and communication between the atmosphere and the inside of the differential pressure detection unit via the second switching valve are both achieved in an operating state of the pressurizing/depressurizing unit, and
the control unit is configured to determine presence or absence of a leak from the canister based on a magnitude relationship between the reference differential pressure and a differential pressure calculated based on a signal output from the differential pressure detection unit when isolation between the fuel tank and the canister via the sealing valve, communication between the canister path and the pressure detection path via the first switching valve, and communication between the atmosphere and the inside of the differential pressure detection unit via the second switching valve are all achieved in the operating state of pressurizing/depressurizing unit.

12. The fuel vapor processing device according to claim 11, wherein
the control unit is configured to determine presence or absence of a fuel vapor leak from the fuel tank based on a magnitude relationship between the reference differential pressure and a differential pressure calculated based on a signal output from the differential pressure detection unit when communication between the inside of the fuel tank and the inside of the canister via the sealing valve, communication between the canister path and the pressure detection path via the first switching valve, and communication between the atmosphere and the inside of the differential pressure detection unit via the second switching valve are all achieved in the operating state of pressurizing/depressurizing unit.

13. The fuel vapor processing device according to claim 11, wherein
the control unit is configured to determine presence or absence of a fuel vapor leak from the fuel tank based on a signal output from the differential pressure detection unit when communication between the canister path and the atmosphere path via the first switching valve, and communication between the fuel tank and the inside of the differential pressure detection unit via the second switching valve are both achieved in the operating state of the pressurizing/depressurizing unit.

14. The fuel vapor processing device according to claim 10, further comprising:
a purge valve disposed between an intake system of the internal combustion engine and the canister, electrically connected to the control unit, and configured to isolate the intake system from the canister, wherein
the control unit is configured to control an operation of the purge valve; and
the control unit is configured to determine a state of the purge valve based on a signal output from the differential pressure detection unit.

* * * * *